US012775149B2

(12) United States Patent
Chuang et al.

(10) Patent No.: US 12,775,149 B2
(45) Date of Patent: Oct. 27, 2026

(54) PHOTOGRAPHING OPTICAL LENS SYSTEM, IMAGING APPARATUS AND ELECTRONIC DEVICE

(71) Applicant: LARGAN PRECISION CO., LTD., Taichung (TW)

(72) Inventors: Yi-Hsiang Chuang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 169 days.

(21) Appl. No.: 18/923,861

(22) Filed: Oct. 23, 2024

(65) Prior Publication Data

US 2025/0044552 A1 Feb. 6, 2025

Related U.S. Application Data

(63) Continuation of application No. 17/540,753, filed on Dec. 2, 2021, now Pat. No. 12,181,730.

(30) Foreign Application Priority Data

Jun. 3, 2021 (TW) ................................ 110120183

(51) Int. Cl.
*G02B 9/60* (2006.01)
*G02B 13/00* (2006.01)

(52) U.S. Cl.
CPC ........... *G02B 9/60* (2013.01); *G02B 13/0045* (2013.01); *G02B 13/0065* (2013.01)

(58) Field of Classification Search
CPC ...... G02B 13/0045; G02B 9/60; G02B 13/18; G02B 13/00; G02B 13/0065; G02B 13/02;
(Continued)

(56) References Cited

U.S. PATENT DOCUMENTS 3,887,269 A 6/1975 Nakagawa
4,037,935 A 7/1977 Momiyama
(Continued)

FOREIGN PATENT DOCUMENTS

CN 102879889 A 1/2013
CN 107589524 A 1/2018
(Continued)

*Primary Examiner* — Matthew Y Lee
(74) *Attorney, Agent, or Firm* — Troutman Pepper Locke LLP; Tim Tingkang Xia, Esq.

(57) ABSTRACT

A photographing optical lens system includes five lens elements being, in order from an object side to an image side along an optical path, a first lens element, a second lens element, a third lens element, a fourth lens element and a fifth lens element. Each lens element has an object-side surface facing the object side and an image-side surface facing the image side. The first lens element has positive refractive power and the object-side surface being convex in a paraxial region thereof. The image-side surface of the third lens element is convex in a paraxial region thereof. The object-side surface of the fourth lens element is convex in a paraxial region thereof. The fifth lens element has negative refractive power, the object-side surface being convex, and the image-side surface being concave in a paraxial region thereof.

24 Claims, 37 Drawing Sheets

19

(58) Field of Classification Search
CPC .... G02B 27/0025; G02B 5/005; G02B 1/041; G02B 13/009; G02B 13/06; G02B 13/146; G02B 15/1421; G02B 15/143; G02B 15/173; G02B 2003/0093; G02B 3/02; G02B 5/04; G02B 5/20; G02B 5/208; G02B 9/04; G02B 9/64; G02B 27/00; G02B 13/14; G02B 15/14; G02B 27/64; G02B 7/02; G02B 7/04; G02B 9/62; G02B 13/007; G03B 2205/0046; G03B 30/00
See application file for complete search history.

(56) References Cited

U.S. PATENT DOCUMENTS

| | | | | |
|---|---|---|---|---|
| 7,911,711 | B1 | 3/2011 | Tang et al. | |
| 8,743,478 | B2 | 6/2014 | Tsai et al. | |
| 10,379,322 | B2 | 8/2019 | Wu et al. | |
| 2015/0253647 | A1* | 9/2015 | Mercado .............. | G02B 13/007 359/708 |
| 2021/0063688 | A1 | 3/2021 | Shin et al. | |
| 2022/0026682 | A1* | 1/2022 | Wu .................... | G02B 27/0025 |
| 2024/0134169 | A1* | 4/2024 | Lu ...................... | G02B 13/0065 |

FOREIGN PATENT DOCUMENTS

| | | | | | |
|---|---|---|---|---|---|
| CN | 108693630 | A | | 10/2018 | |
| CN | 109254387 | A | | 1/2019 | |
| CN | 109946823 | A | | 6/2019 | |
| CN | 110187478 | A | | 8/2019 | |
| CN | 110208927 | A | | 9/2019 | |
| CN | 110275279 | A | | 9/2019 | |
| CN | 209992746 | U | | 1/2020 | |
| CN | 110780422 | A | * | 2/2020 | ......... G02B 13/0065 |
| CN | 111308672 | A | | 6/2020 | |
| CN | 111505799 | A | | 8/2020 | |
| CN | 111679407 | A | | 9/2020 | |
| CN | 112526730 | A | | 3/2021 | |
| JP | 01147514 | A | | 6/1989 | |
| JP | 01147515 | A | | 6/1989 | |
| JP | 2010175652 | A | | 8/2010 | |
| TW | 201137430 | A1 | | 11/2011 | |
| WO | 2021223562 | A1 | | 11/2021 | |
| WO | 2022183447 | A1 | | 9/2022 | |
| WO | WO-2022226957 | A1 | * | 11/2022 | .......... G02B 13/007 |

* cited by examiner

PHOTOGRAPHING OPTICAL LENS SYSTEM, IMAGING APPARATUS AND ELECTRONIC DEVICE

RELATED APPLICATIONS

This application is a continuation application of U.S. application Ser. No. 17/540,753, filed on Dec. 2, 2021, now approved and claims priority to Taiwan Application Serial Number 110120183, filed on Jun. 3, 2021, which is incorporated by reference herein in its entirety.

BACKGROUND

Technical Field

The present disclosure relates to a photographing optical lens system and an imaging apparatus, and more particularly, to a photographing optical lens system and an imaging apparatus applicable to electronic devices.

Description of Related Art

As the application of photographing modules has become more and more extensive, applying photographing modules in various products such as smart electronic products, car electronics, identification systems, entertainment devices, sports devices, and home intelligent auxiliary systems is a major trend in the development of technological products. To provide more diversified application modes, smart devices equipped with one, two, or even more than three photographing lens systems have gradually become the mainstream on the market, and photographing lens systems with different characteristics have been developed to meet different application requirements.

Moreover, as electronic products are becoming thinner and lighter in these years, it is difficult for conventional photographing lens systems to meet the needs for a high specification and miniaturization at the same time. In particular, miniature lens systems with large apertures and telephoto features are hard to find. However, as the standards for optical zoom have become higher (such as requiring a greater zoom range), existing photographing lens systems with telephoto features can barely fulfill the requirements due to their greater total track lengths, smaller apertures, poor image quality or difficulty in achieving smaller sizes.

SUMMARY

According to one aspect of the present disclosure, a photographing optical lens system comprises five lens elements. The five lens elements in order from an object side to an image side along an optical path are a first lens element, a second lens element, a third lens element, a fourth lens element and a fifth lens element. Each of the five lens elements has an object-side surface facing the object side and an image-side surface facing the image side.

The first lens element has positive refractive power, and the object-side surface of the first lens element is convex in a paraxial region thereof. The image-side surface of the third lens element is convex in a paraxial region thereof. The object-side surface of the fourth lens element is convex in a paraxial region thereof. The fifth lens element has negative refractive power, and the object-side surface of the fifth lens element is convex in a paraxial region thereof while the image-side surface of the fifth lens element is concave in a paraxial region thereof.

A curvature radius of the object-side surface of the first lens element is R1, a curvature radius of the image-side surface of the first lens element is R2, a curvature radius of the object-side surface of the second lens element is R3, a curvature radius of the image-side surface of the second lens element is R4, an axial distance between the object-side surface of the first lens element and the image-side surface of the fifth lens element along the optical path is Td, an axial distance between the image-side surface of the fifth lens element and an image surface along the optical path is BL, a focal length of the photographing optical lens system is f, a curvature radius of the object-side surface of the fifth lens element is R9, a curvature radius of the image-side surface of the fifth lens element is R10, and the following conditions are satisfied:

$$-0.80 < (R1 + R2)/(R1 - R2);$$

$$0 < (R3 + R4)/(R3 - R4);$$

$$Td/BL < 2.0;$$

and $$3.50 < (f/R9) + (f/R10).$$

According to one aspect of the present disclosure, an imaging apparatus comprises the aforementioned photographing optical lens system and an image sensor.

According to another aspect of the present disclosure, an electronic device comprises the aforementioned imaging apparatuses.

DETAILED DESCRIPTION

Figure 1A:
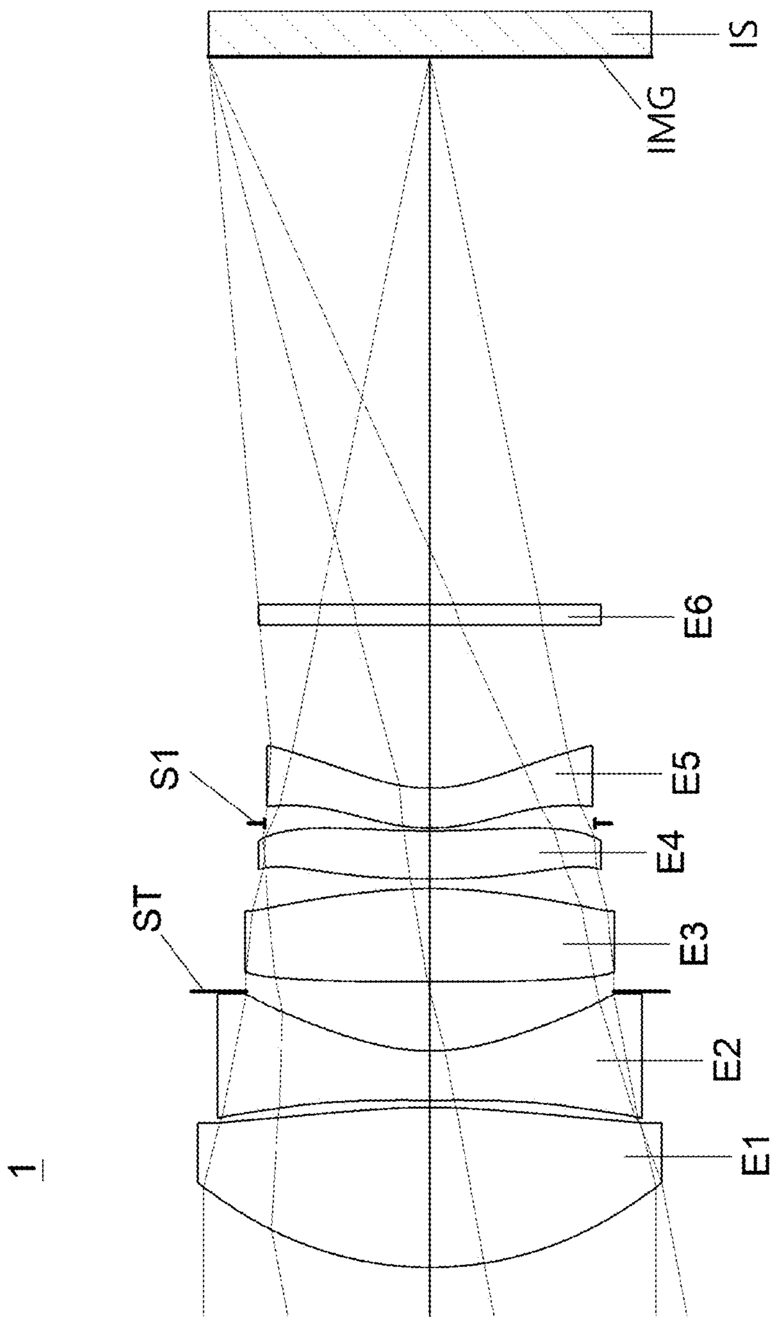
FIG. 1A is a schematic view of an imaging apparatus according to the 1st embodiment of the present disclosure.

The present disclosure provides a photographing optical lens system including five lens elements. The five lens elements, in order from an object side to an image side along an optical path, are a first lens element, a second lens element, a third lens element, a fourth lens element and a fifth lens element. Each of the five lens elements has an object-side surface facing the object side and an image-side surface facing the image side.

The first lens element has positive refractive power to provide significant converging capability so as to reduce the size of the photographing optical lens system effectively and meet the miniaturization requirement. The object-side surface of the first lens element is convex in a paraxial region thereof so as to correct spherical aberration.

The image-side surface of the third lens element is convex in a paraxial region thereof so as to correct spherical aberration and enhance the quality of light convergence. The third lens element has at least one critical point in an off-axis region thereof so as to correct off-axis aberrations.

The object-side surface of the fourth lens element is convex in a paraxial region thereof, which is favorable for correcting astigmatism. The image-side surface of the fourth lens element may be concave in a paraxial region thereof and may have at least one convex critical point in an off-axis region thereof to correct field curvature and distortion, so that the Petzval surface can be further flattened.

The fifth lens element has negative refractive power and can further correct aberrations when configured with the fourth lens element. The object-side surface of the fifth lens element may be convex in a paraxial region thereof, so as to enhance astigmatism corrections. The image-side surface of the fifth lens element may be concave in a paraxial region thereof to effectively control the back focal length of the photographing optical lens system and adjust the incident angle of the chief ray on an image surface. The object-side surface of the fifth lens element has at least one inflection point in an off-axis region to correct distortion at the image periphery. The object-side surface of the fifth lens element may have at least one concave critical point in an off-axis region thereof to further correct off-axis aberrations.

A curvature radius of the object-side surface of the first lens element is R1, and a curvature radius of the image-side surface of the first lens element is R2. When the following condition is satisfied: $-0.80<(R1+R2)/(R1-R2)$, the structure and refractive power of the first lens element can be enhanced, thereby improving the productivity in manufacturing the photographing optical lens system. Moreover, the following condition can be satisfied: $-0.60<(R1+R2)/(R1-R2)$. Moreover, the following condition can be satisfied: $-0.50<(R1+R2)/(R1-R2)<0.50$.

A curvature radius of the object-side surface of the second lens element is R3, and a curvature radius of the image-side surface of the second lens element is R4. When the following condition is satisfied: $0<(R3+R4)/(R3-R4)$, it is favorable for ensuring that the second lens element with sufficient refractive power while the first lens element has stronger positive refractive power so as to further correct aberrations. Moreover, the following condition can be satisfied: $0.40<(R3+R4)/(R3-R4)<2.50$.

An axial distance between the object-side surface of the first lens element and the image-side surface of the fifth lens element along the optical path is Td, and an axial distance between the image-side surface of the fifth lens element and the image surface along the optical path is BL. When the following condition is satisfied: $Td/BL<2.0$, it is favorable for achieving a balance between fully utilizing the relatively limited module space of the lens system and providing sufficient space between the photographing optical lens system and the image surface. Moreover, the following condition can be satisfied: $0.40<Td/BL<1.50$.

A focal length of the photographing optical lens system is f, a curvature radius of the object-side surface of the fifth lens element is R9, and a curvature radius of the image-side surface of the fifth lens element is R10. When the following condition is satisfied: $3.50<(f/R9)+(f/R10)$, the peripheral region of the fifth lens element can have a prominent aspheric shape so as to correct aberrations at the image periphery. Moreover, the following condition can be satisfied: $8.0<(f/R9)+(f/R10)$. Moreover, the following condition can be satisfied: $10<(f/R9)+(f/R10)$.

A focal length of the second lens element is f2, and a focal length of the fifth lens element is f5. When the following condition is satisfied: $|f2/f5|<0.50$, it is favorable for ensuring the second lens element with sufficient refractive power while the first lens element has stronger positive refractive power so as to further correct aberrations. Moreover, the following condition can be satisfied: $|f2/f5|<0.30$.

A minimum among Abbe numbers of the lens elements of the photographing optical lens system is Vmin. When the following condition is satisfied: $Vmin<20$, chromatic aberration can be favorably corrected.

A focal length of the first lens element is f1, and the focal length of the second lens element is f2. When the following condition is satisfied: $-1.20<f2/f1<0$, it is favorable for ensuring stronger positive refractive power from the first lens element with sufficient refractive power from the second lens element so as to further correct aberrations. Moreover, the following condition can be satisfied: $-1.0<f2/f1<-0.50$.

A maximum effective radius on the object-side surface of the first lens element is Y11, and a maximum effective radius on the image-side surface of the fifth lens element is Y52. When the following condition is satisfied: $0.50<Y52/Y11<1.0$, it is favorable for controlling the beam size and preventing an excessively large effective radius of a single lens element so as to provide miniaturization of the photographing optical lens system.

An Abbe number of the second lens element is V2, and an Abbe number of the fourth lens element is V4. When the following condition is satisfied: $V2+V4\leq 50$, the correction of chromatic aberration can be enhanced favorably.

The focal length of the photographing optical lens system is f, and a maximal image height of the photographing optical lens system is ImgH. When the following condition is satisfied: $4.0<f/ImgH$, a configuration for a small field of view can be favorably achieved. Moreover, the following condition can be satisfied: $4.50<f/ImgH<10$.

A central thickness of the first lens element along the optical path is CT1, and an axial distance between the object-side surface of the fourth lens element and the image-side surface of the fifth lens element along the optical path is Dr7r10. When the following condition is satisfied: $1.0<CT1/Dr7r10$, the structural strength of the first lens element can be enhanced, thereby improving the productivity in manufacturing the photographing optical lens system. Moreover, the following condition can be satisfied:

$$1.25<CT1/Dr7r10<3.50.$$

The maximal image height of the photographing optical lens system is ImgH, and an entrance pupil diameter of the photographing optical lens system is EPD. When the following condition is satisfied: $0.30<ImgH/EPD<0.80$, it is favorable for controlling the beam size and preventing an excessively large effective radius of a single lens element so as to provide miniaturization of the photographing optical lens system. Moreover, the following condition can be satisfied: $0.40<ImgH/EPD<0.70$.

Half of the maximal field of view of the photographing optical lens system is HFOV. When the following condition is satisfied: $\tan(HFOV)<0.30$, the photographing optical lens system can have proper fields of view for different applications. Moreover, the following condition can be satisfied: $\tan(HFOV)<0.22$.

An Abbe number of a lens element is Vi, and a refractive index of said lens element is Ni. When the following condition is satisfied: $5.0<Vi/Ni<12.0$, the correction of chromatic aberration can be favorably enhanced. Moreover, the following condition can be satisfied by at least one lens element: $6.0<Vi/Ni<11.0$.

The present disclosure further provides an imaging apparatus comprising the aforementioned photographing optical lens system and an image sensor disposed on or near the image surface.

The present disclosure further provides an electronic device comprising three or more imaging apparatuses, wherein the three or more imaging apparatuses include the aforementioned imaging apparatus and face the same direction, so that telephoto and wide-angle features can be provided.

At least one of the aforementioned three or more imaging apparatuses may comprise two reflective elements. Alternatively, at least two of the aforementioned three or more imaging apparatuses may comprise at least one reflective element respectively to allow directional changes of the optical path, so that the imaging apparatuses can be arranged in a more flexible manner.

Moreover, due to the limited thickness of an electronic device, non-optical effective portions of a lens barrel or a lens element in an optical lens assembly may be removed, so that the size of the optical lens system in one direction can be reduced. Additionally, reflective elements may be used in the optical lens system to further reduce thicknesses of the lens elements and to provide the optical lens system with a sufficient total track length so as to achieve the telephoto configuration.

At least one lens element of the photographing optical lens system includes at least two cut edges on the outer diameter thereof. Please refer to FIG. 11A, where a lens element E', for example, can include two opposite cut edges on the outer diameter thereof in one axial direction (such as the x-axis). Further, please refer to FIG. 11B, where a lens element E, for example, can include two opposite cut edges on the outer diameter thereof respectively in two axial directions (such as the x-axis and the y-axis).

Figure 11A:
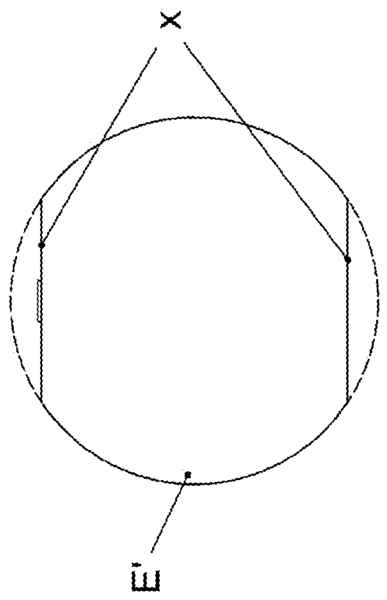
FIGS. 11A-11C are schematic views illustrating the outer diameter of a lens element with cut edges and related parameters according to the present disclosure.
Figure 11B:
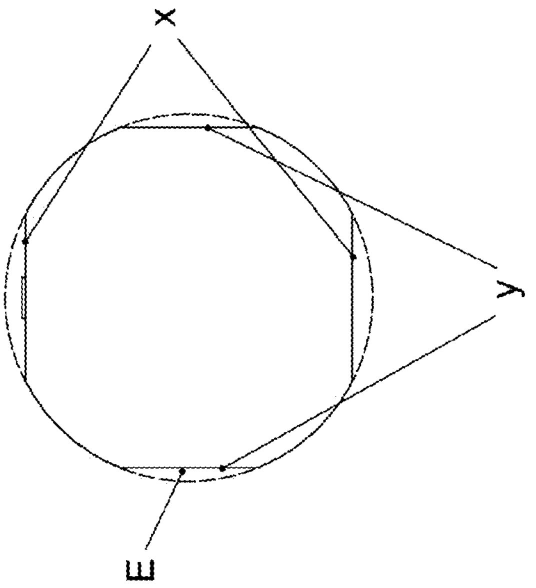
Figure 11C:
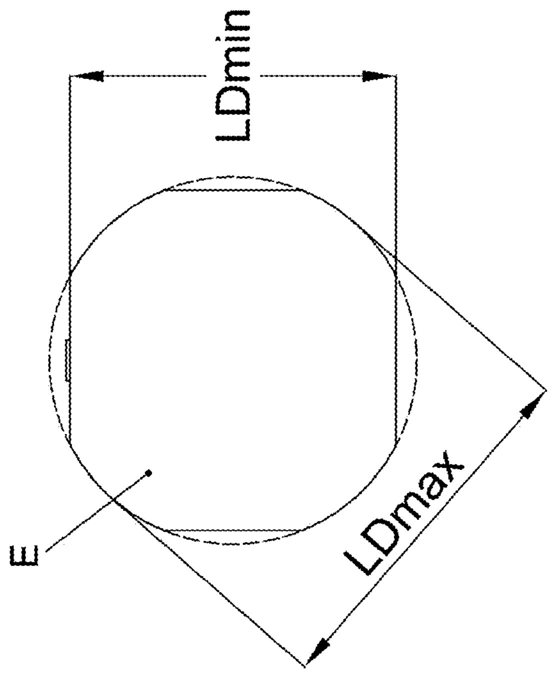

Please refer to FIG. 11C. The minimum outer diameter distance of the lens element E is LDmin, and the maximum outer diameter distance of the lens element E is LDmax. When the following condition is satisfied: $0.30<LDmin/LDmax<0.90$, the size of the photographing optical lens system in a single axial direction can be favorably reduced so as to further miniaturize imaging apparatuses. Moreover, the following condition can be satisfied: $0.50<LDmin/LDmax<0.85$.

The photographing optical lens system comprises a lens barrel including at least two cut edges on the outer diameter thereof, so that a dimension of the photographing optical lens system in a single axial direction can be favorably reduced with enhanced miniaturization.

Figure 12A:
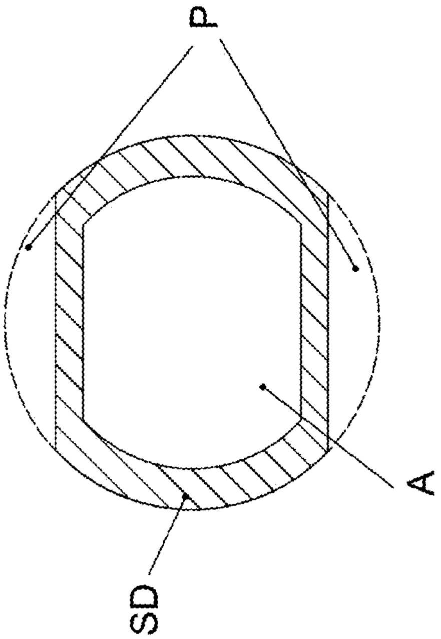
FIG. 12A is a schematic view of a light blocking sheet applicable to an imaging apparatus according to the present disclosure.

Please refer to FIG. 12A. The photographing optical lens system according to the present disclosure may comprise a light blocking sheet SD having a non-circular opening A.

Figure 12B:
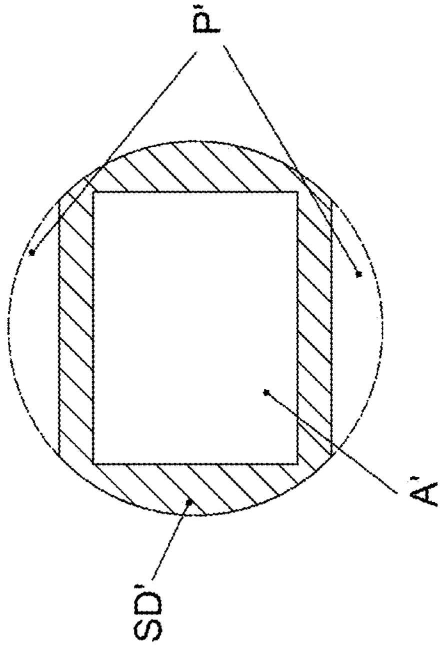
FIG. 12B is a schematic view of another light blocking sheet applicable to an imaging apparatus according to the present disclosure.

Moreover, the light blocking sheet SD includes two cut edges at the removed outer diameter portions P. Please refer to FIG. 12B. The photographing optical lens system according to the present disclosure may comprise a light blocking sheet SD' having a rectangular opening A'. Moreover, the light blocking sheet SD' includes two cut edges on the removed outer diameter portions P'. By cutting the edges of a lens element and the edges of a corresponding light blocking sheet, the overall outer diameter of the photographing optical lens system can be reduced so as to decrease thicknesses of the corresponding imaging apparatus and electronic device.

Figure 13:
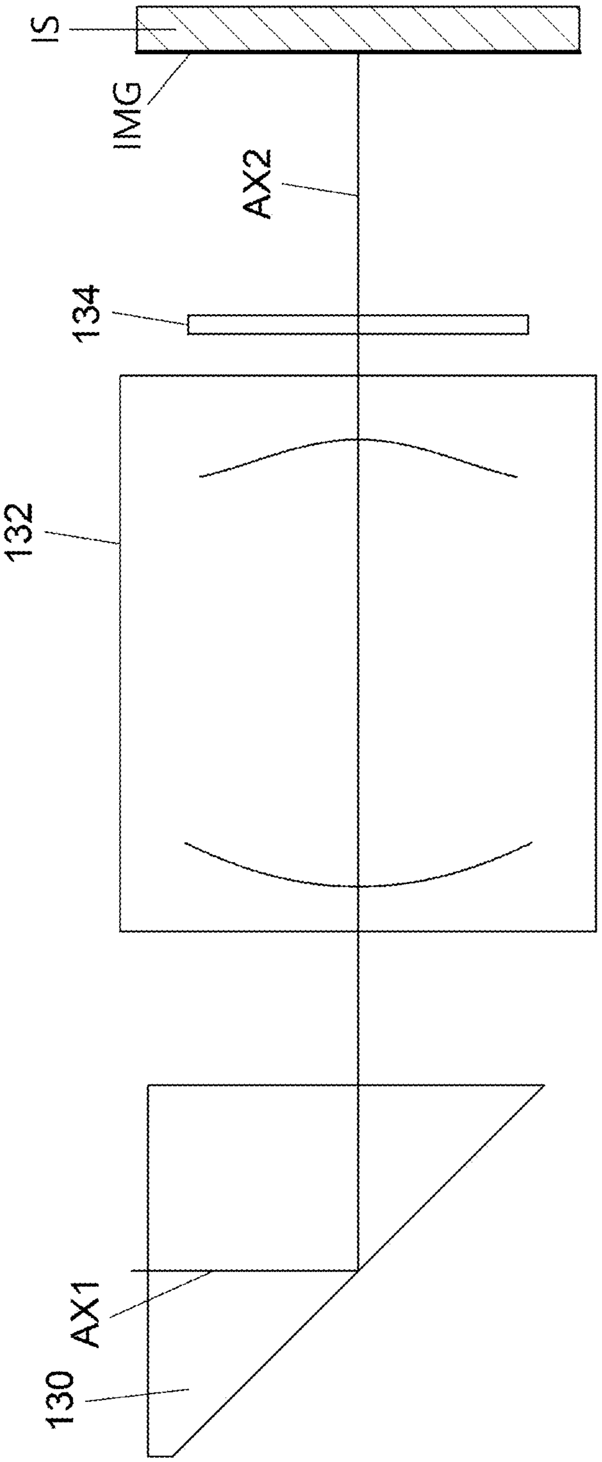
FIG. 13 is a schematic view of an imaging apparatus according to the 16th embodiment of the present disclosure, where the imaging apparatus includes a reflective element.

FIG. 13 is a schematic view of an imaging apparatus according to the 16th embodiment of the present disclosure, where the imaging apparatus includes a reflective element on the object side. As FIG. 13 shows, the reflective element 130 is disposed on the object side of the optical path of the photographing optical lens system 132. The reflective element 130 is a prism with a flat surface facing the imaged object, which creates a 90-degree angle between the optical axis AX1 and the optical axis AX2.

Figure 14:
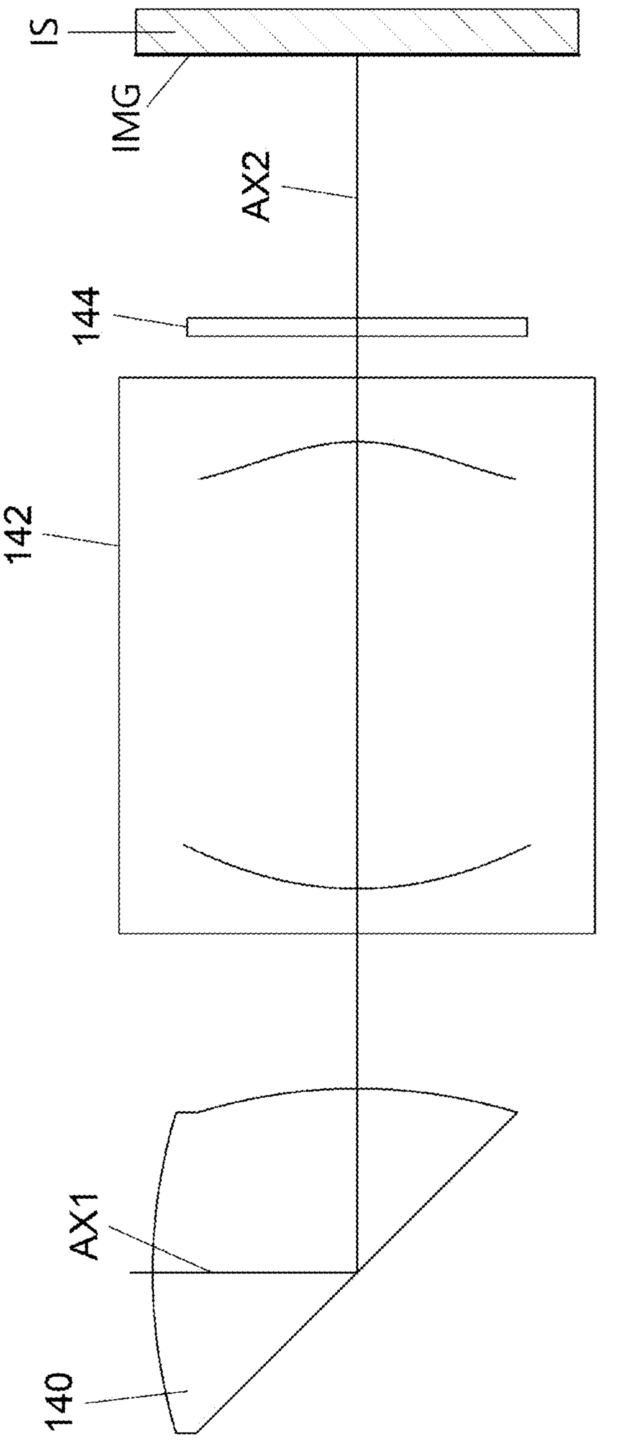
FIG. 14 is a schematic view of an imaging apparatus according to the 17th embodiment of the present disclosure, where the imaging apparatus includes a reflective element.

FIG. 14 is a schematic view of an imaging apparatus according to the 17th embodiment of the present disclosure, where the imaging apparatus includes a reflective element on the object side. As FIG. 14 shows, the reflective element 140 is disposed on the object side of the optical path of the photographing optical lens system 142. The reflective element 140 is a prism with refractive power and has a surface being convex in a paraxial region thereof facing the imaged object, which creates a 90-degree angle between the optical axis AX1 and the optical axis AX2, which is favorable for further controlling the field of view and the total track length.

Figure 15:
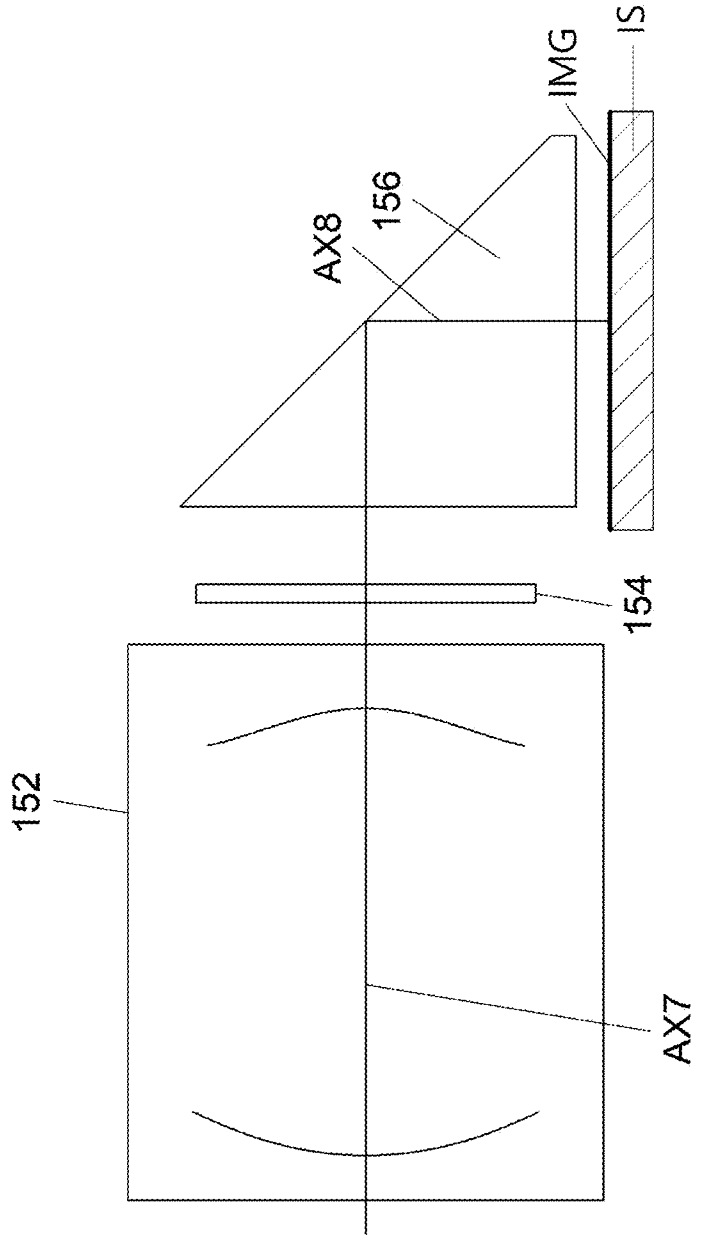
FIG. 15 is a schematic view of an imaging apparatus according to the 18th embodiment of the present disclosure, where the imaging apparatus includes a reflective element.

FIG. 15 is a schematic view of an imaging apparatus according to the 18th embodiment of the present disclosure, where the imaging apparatus includes a reflective element on the image side. As FIG. 15 shows, the reflective element 156 is disposed on the image side of the optical path of the photographing optical lens system 152. The reflective element 156 is a prism having a flat surface facing the image surface IMG, which creates a 90-degree angle between the optical axis AX7 and the optical axis AX8.

Figure 16:
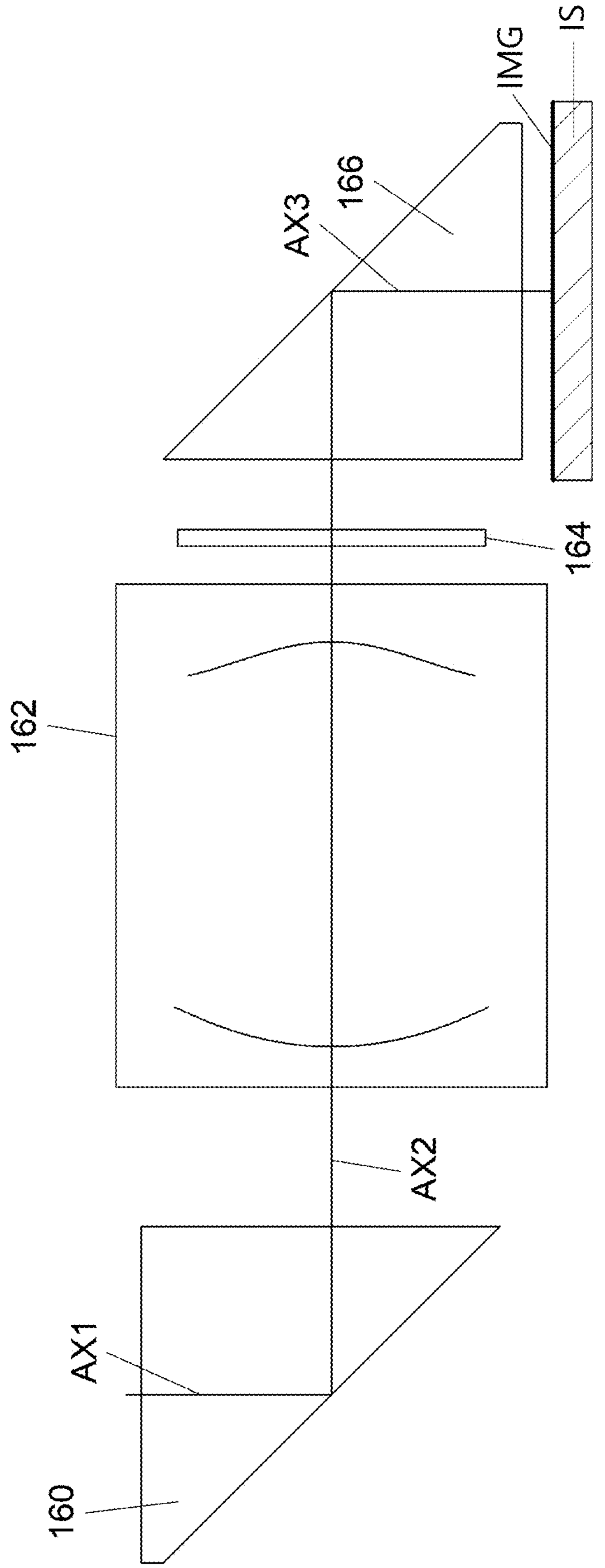
FIG. 16 is a schematic view of an imaging apparatus according to the 19th embodiment of the present disclosure, where the imaging apparatus includes two reflective elements.

FIG. 16 is a schematic view of an imaging apparatus according to the 19th embodiment of the present disclosure, where the imaging apparatus includes two reflective elements on both the object side and the image side. As FIG. 16 shows, the reflective element 160 is disposed on the object side of the optical path of the photographing optical lens system 162. The reflective element 160 is a prism having a flat surface facing the imaged object, which creates a 90-degree angle between the optical axis AX1 and the optical axis AX2. The other reflective element 166 is disposed on the image side of the optical path of the photographing optical lens system 162. The reflective element 166 is a prism having a flat surface facing the image surface IMG, which creates a 90-degree angle between the optical axis AX2 and the optical axis AX3.

Figure 17:
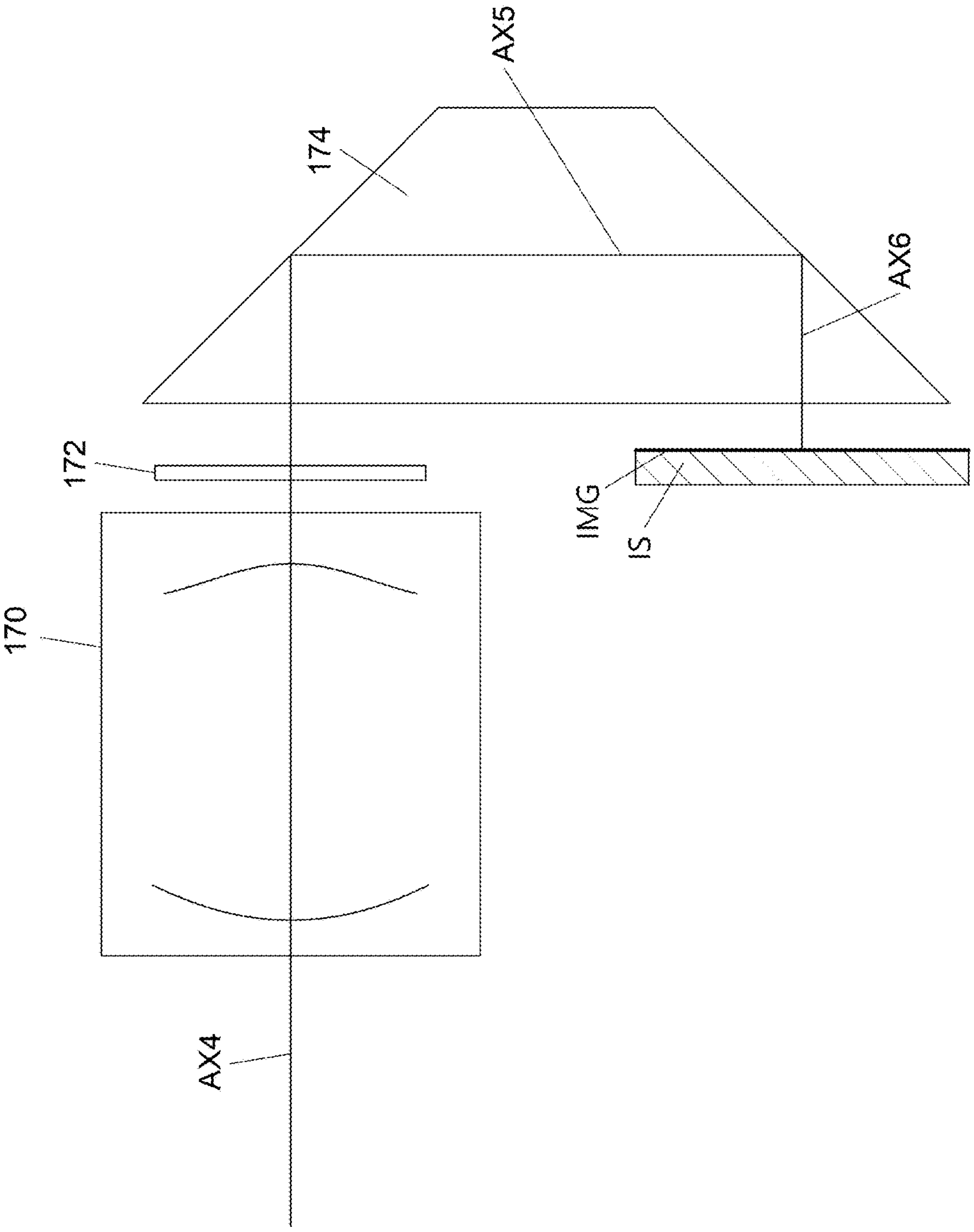
FIG. 17 is a schematic view of an imaging apparatus according to the 20th embodiment of the present disclosure, where the imaging apparatus includes a reflective element with two reflective surfaces.

FIG. 17 is a schematic view of an imaging apparatus according to the 20th embodiment of the present disclosure, where the imaging apparatus includes a reflective element, which has two reflective surfaces, on the image side. The reflective element 174 is disposed on the image side of the optical path of the photographing optical lens system 170. The reflective element 174 includes two reflective surfaces, which creates a 90-degree angle between the optical axis AX4 and the optical axis AX5 and a 90-degree angle between the optical axis AX5 and the optical axis AX6.

The aforementioned features of the photographing optical lens system can be utilized in numerous combinations so as to achieve corresponding effects.

According to the photographing optical lens system of the present disclosure, the lens elements thereof can be made of glass or plastic material. When the lens elements are made of glass material, the distribution of the refractive power of the photographing optical system may be more flexible to design and the effect of external environmental temperature on imaging can be reduced. Technologies such as grinding or molding can be used for producing glass lens elements. When the lens elements are made of plastic material, manufacturing costs can be effectively reduced. Furthermore, surfaces of each lens element can be arranged to be spherical or aspheric (ASP). Arranging the spherical surfaces can simplify manufacturing while arranging the aspheric surfaces can provide more control variables for eliminating aberrations and to further decrease the required quantity of lens elements; also, the total track length of the photographing optical lens system can be effectively reduced. Processes such as plastic injection molding or glass molding can be used for making the aspheric surfaces.

According to the photographing optical lens system of the present disclosure, if a surface of a lens element is aspheric, it means that the surface has an aspheric shape throughout its optical effective area, or a portion(s) thereof.

According to the photographing optical lens system of the present disclosure, additives may be selectively added to the material of any one (or more) lens element to change the transmittance of said lens element in a particular wavelength range of light, so as to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the lens elements. Thus, additives can prevent unwanted light in particular wavelength ranges affecting the final image. In addition, additives may be evenly mixed in the plastic material for manufacturing lens elements with an injection molding process.

According to the photographing optical lens system of the present disclosure, the photographing optical lens system can include at least one stop, such as an aperture stop, a glare stop or a field stop so as to favorably reduce the amount of stray light and thereby improve the image quality.

According to the photographing optical lens system of the present disclosure, an aperture stop can be configured as a front stop or a middle stop. The front stop disposed between an imaged object and the first lens element can provide a longer distance between an exit pupil of the photographing optical lens system and the image surface, so that the generated telecentric effect can improve the image-sensing efficiency of an image sensor, such as a CCD or CMOS sensor. The middle stop disposed between the first lens element and the image surface is favorable for enlarging the field of view of the photographing optical lens system, thereby providing the photographing optical lens system with the advantage of a wide-angle lens.

An aperture control unit may be disposed in the photographing optical lens system of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the photographing optical lens system.

According to the photographing optical lens system of the present disclosure, when the lens element has a convex surface and the region of convex shape is not specified, it indicates that the surface can be convex in the paraxial region thereof. When the lens element has a concave surface and the region of concave shape is not specified, it indicates that the surface can be concave in the paraxial region thereof. Likewise, when the region of refractive power or focal length of a lens element is not specified, it indicates that the region of refractive power or focal length of the lens element can be in the paraxial region thereof.

According to the photographing optical lens system of the present disclosure, the image surface of the photographing optical lens system, based on the corresponding image sensor, can be a plane or a curved surface with an arbitrary curvature, especially a curved surface being concave facing the object side. Meanwhile, the photographing optical lens system of the present disclosure may optionally include one or more image correction components (such as a field flattener) between the image surface and the lens element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and arranged near the image surface.

In the photographing optical lens system according to the present disclosure, at least one reflective element capable of altering the optical path, such as a prism or a reflective mirror, can be optionally provided on the imaging optical path between the imaged object and the image surface. Then, the photographing optical lens system can be provided with more flexibility for its space arrangement, so that minimization of electronic devices is not limited by the total track length of the photographing optical lens system.

According to the above description of the present disclosure, the following specific embodiments are provided for further explanation.

1st Embodiment

Figure 1B:
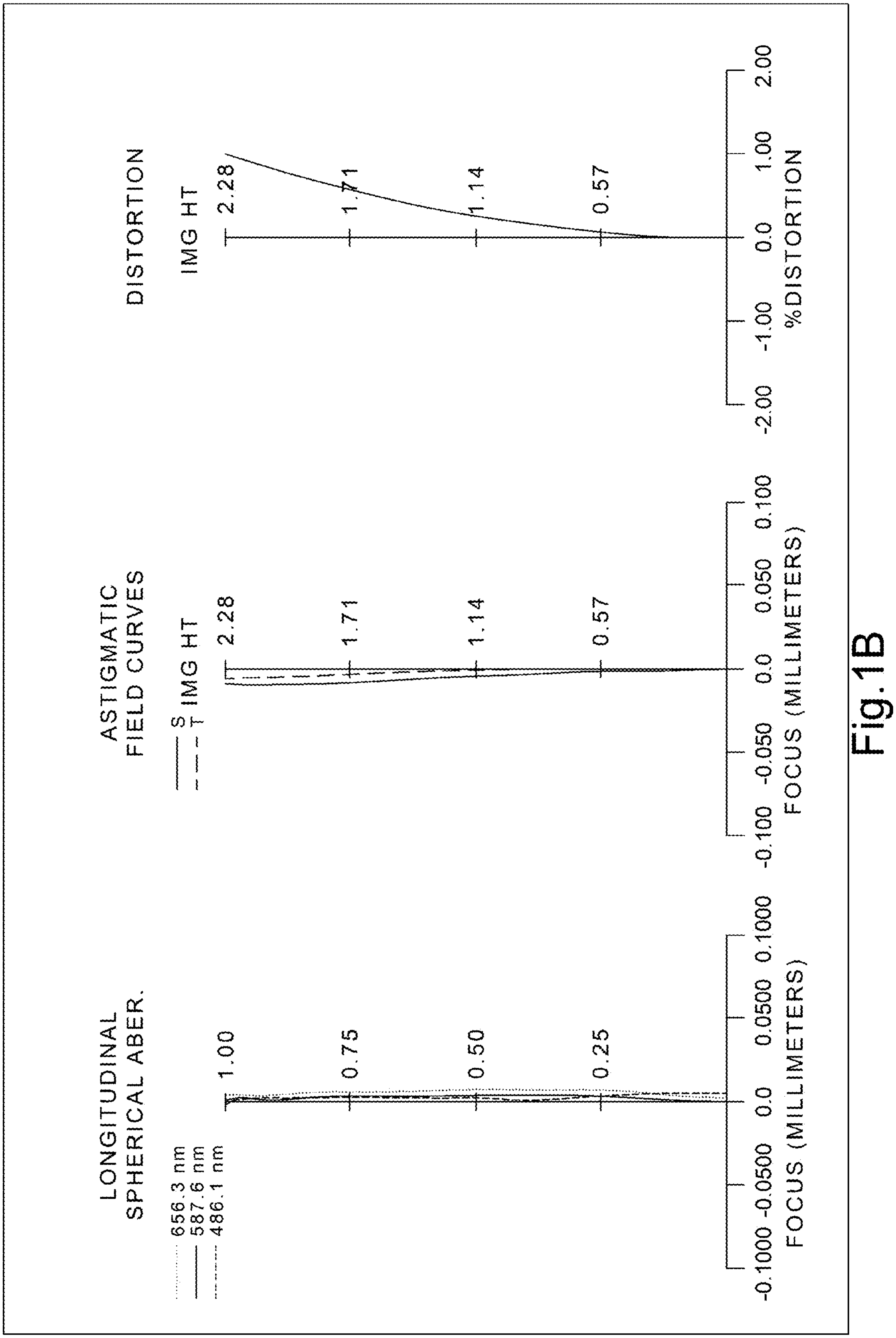
FIG. 1B shows longitudinal spherical aberration curves, astigmatic field curves and a distortion curve of the imaging apparatus according to the 1st embodiment.

FIG. 1A is a schematic view of an imaging apparatus according to the 1st embodiment of the present disclosure. FIG. 1B shows, in order from left to right, longitudinal spherical aberration curves, astigmatic field curves and a distortion curve of the imaging apparatus according to the 1st embodiment.

In FIG. 1A, the imaging apparatus includes a photographing optical lens system 1 of the present disclosure and an image sensor IS. The photographing optical lens system 1 includes, in order from an object side to an image side along an optical path, a first lens element E1, a second lens element E2, an aperture stop ST, a third lens element E3, a fourth lens element E4, a stop S1, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has negative refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 1. The image sensor IS is disposed on or near the image surface IMG.

The detailed optical data of the 1st embodiment are shown in TABLE 1, wherein the units of the curvature radius, the thickness and the focal length are expressed in mm, f is a focal length of the photographing optical lens system, Fno is an f-number of the photographing optical lens system, HFOV is half of the maximal field of view, and surfaces #0 to #15 refer to the surfaces in order from the object side to the image side. The aspheric surface data are shown in TABLE 2, wherein k is the conic coefficient in the equation of the aspheric surface profiles, and A4-A16 refer to the 4th to 16th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment. Explanations in this regard will not be provided again.

TABLE 1

| (1st Embodiment) f = 11.89 mm, Fno = 2.55, HFOV = 10.8 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 3.6020 | (ASP) | 1.648 | Plastic | 1.534 | 55.9 | 4.88 |
| 2 | | −7.9100 | (ASP) | 0.074 | | | | |
| 3 | Lens 2 | 100.0000 | (ASP) | 0.511 | Plastic | 1.584 | 30.2 | −3.80 |
| 4 | | 2.1690 | (ASP) | 0.612 | | | | |
| 5 | Ape. Stop | Plano | | 0.104 | | | | |
| 6 | Lens 3 | −37.4080 | (ASP) | 0.958 | Plastic | 1.548 | 46.0 | 10.28 |
| 7 | | −4.9390 | (ASP) | 0.100 | | | | |
| 8 | Lens 4 | 11.2110 | (ASP) | 0.495 | Plastic | 1.686 | 18.4 | −399.54 |
| 9 | | 10.5770 | (ASP) | 0.078 | | | | |
| 10 | Stop | Plano | | −0.048 | | | | |
| 11 | Lens 5 | 1.8250 | (ASP) | 0.412 | Plastic | 1.642 | 22.5 | −392.66 |
| 12 | | 1.6520 | (ASP) | 1.680 | | | | |
| 13 | Filter | Plano | | 0.210 | Glass | 1.517 | 64.2 | — |
| 14 | | Plano | | 5.651 | | | | |
| 15 | Image Surface | Plano | | — | | | | |

Remark: Reference wavelength is d-line 587.6 nm.
*The effective radius of Surface 1 is 2.390 mm.
*The effective radius of Surface 10 (Stop) is 1.700 mm.

TABLE 2

| Aspheric Coefficient | | | | | |
|---|---|---|---|---|---|
| Surface # | 1 | 2 | 3 | 4 | 6 |
| k= | 2.89030E−01 | 0.00000E+00 | −9.00000E+01 | −6.03360E−01 | 0.00000E+00 |
| A4= | −1.05570E−03 | 1.42720E−02 | −2.89520E−02 | −3.84790E−02 | 3.36150E−02 |
| A6= | −8.85090E−06 | −3.22610E−03 | 7.29510E−03 | 1.70850E−03 | −1.73400E−02 |
| A8= | −1.84800E−05 | 4.90030E−04 | −8.06450E−04 | 2.02150E−03 | 5.03120E−03 |
| A10= | −4.40330E−06 | −2.15560E−05 | 5.32460E−05 | −7.79490E−04 | −1.08410E−03 |
| A12= | | −2.11510E−06 | −5.20810E−06 | 1.66490E−04 | 2.35700E−04 |
| A14= | | | 1.80790E−07 | −1.64340E−05 | −2.35750E−05 |
| Surface # | 7 | 8 | 9 | 11 | 12 |
| k= | −2.13640E+00 | 2.83500E+01 | 2.73430E+01 | −3.66970E−01 | −1.08490E+00 |
| A4= | 3.43850E−02 | 3.79090E−02 | −1.53410E−02 | −1.05850E−01 | −6.94260E−02 |
| A6= | −2.49250E−02 | −3.43750E−02 | −1.17820E−02 | −4.06170E−03 | −6.95480E−03 |
| A8= | 1.19370E−02 | 1.60420E−02 | 8.27250E−03 | 8.95000E−03 | 1.35370E−02 |
| A10= | −3.73740E−03 | −4.88940E−03 | −3.73200E−03 | −2.91140E−03 | −5.06520E−03 |
| A12= | 6.91770E−04 | 6.15880E−04 | 7.46130E−04 | 4.03670E−04 | 9.29740E−04 |
| A14= | −5.37020E−05 | 3.51720E−06 | −4.55590E−05 | 8.34190E−06 | −7.16700E−05 |
| A16= | | −7.27560E−06 | −3.42360E−06 | −6.13530E−06 | |

The equation of the aspheric surface profiles is expressed as follows:

$$X(Y) = (Y^2/R)/(1 + sqrt(1 - (1+k)*(Y/R)^2) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, half of the maximal field of view of the photographing optical lens system 1 is HFOV, and the following condition is satisfied: tan (HFOV)=0.19.

In the 1st embodiment, the Abbe number of the second lens element E2 is V2, the Abbe number of the fourth lens element E4 is V4, and the following condition is satisfied: V2+V=48.6.

In the 1st embodiment, the Abbe number of the first lens element 1 is V1, the refractive index of the first lens element E1 is N1, and the following condition is satisfied: V1/N1=36.46.

In the 1st embodiment, the Abbe number of the second lens element E2 is V2, the refractive index of the second lens element E2 is N2, and the following condition is satisfied: V2/N2=19.07.

In the 1st embodiment, the Abbe number of the third lens element E3 is V3, the refractive index of the third lens element E3 is N3, and the following condition is satisfied: V3/N3=29.72.

In the 1st embodiment, the Abbe number of the fourth lens element E4 is V4, the refractive index of the fourth lens element E4 is N4, and the following condition is satisfied: V4/N4=10.90.

In the 1st embodiment, the Abbe number of the fifth lens element E5 is V5, the refractive index of the fifth lens element E5 is N5, and the following condition is satisfied: V5/N5=13.70.

In the 1st embodiment, the minimum among Abbe numbers of the lens elements of the photographing optical lens system 1 is Vmin, and the following condition is satisfied: Vmin=18.38.

In the 1st embodiment, the central thickness of the first lens element E1 along the optical path is CT1, the axial distance between the object-side surface of the fourth lens element E4 and the image-side surface of the fifth lens element E5 along the optical path is Dr7r10, and the following condition is satisfied: CT1/Dr7r10=1.76.

In the 1st embodiment, the axial distance between the object-side surface of the first lens element E1 and the image-side surface of the fifth lens element E5 along the optical path is Td, the axial distance between the image-side surface of the fifth lens element E5 and the image surface IMG along the optical path is BL, and the following condition is satisfied: Td/BL=0.66.

In the 1st embodiment, the maximal image height of the photographing optical lens system 1 is ImgH, the entrance pupil diameter of the photographing optical lens system 1 is EPD, and the following condition is satisfied: ImgH/EPD=0.49.

In the 1st embodiment, the curvature radius of the object-side surface of the first lens element E1 is R1, the curvature radius of the image-side surface of the first lens element E1 is R2, and the following condition is satisfied: (R1+R2)/(R1−R2)=−0.37.

In the 1st embodiment, the curvature radius of the object-side surface of the second lens element E2 is R3, the curvature radius of the image-side surface of the second lens element E2 is R4, and the following condition is satisfied: (R3+R4)/(R3−R4)=1.04.

In the 1st embodiment, the focal length of the photographing optical lens system 1 is f, the curvature radius of the object-side surface of the fifth lens element E5 is R9, the curvature radius of the image-side surface of the fifth lens element E5 is R10, and the following condition is satisfied: (f/R9)+(f/R10)=13.71.

In the 1st embodiment, the focal length of the second lens element E2 is f2, the focal length of the fifth lens element E5 is f5, and the following condition is satisfied: |f2/f5|=0.01.

In the 1st embodiment, the focal length of the first lens element E1 is f1, the focal length of the second lens element E2 is f2, and the following condition is satisfied: f2/f1=−0.78.

In the 1st embodiment, the focal length of the photographing optical lens system 1 is f, the maximal image height of the photographing optical lens system 1 is ImgH, and the following condition is satisfied: f/ImgH=5.21.

In the 1st embodiment, the maximum effective radius on the object-side surface of the first lens element E1 is Y11, the maximum effective radius on the image-side surface of the fifth lens element E5 is Y52, and the following condition is satisfied: Y52/Y11=0.69.

2nd Embodiment

Figure 2A:
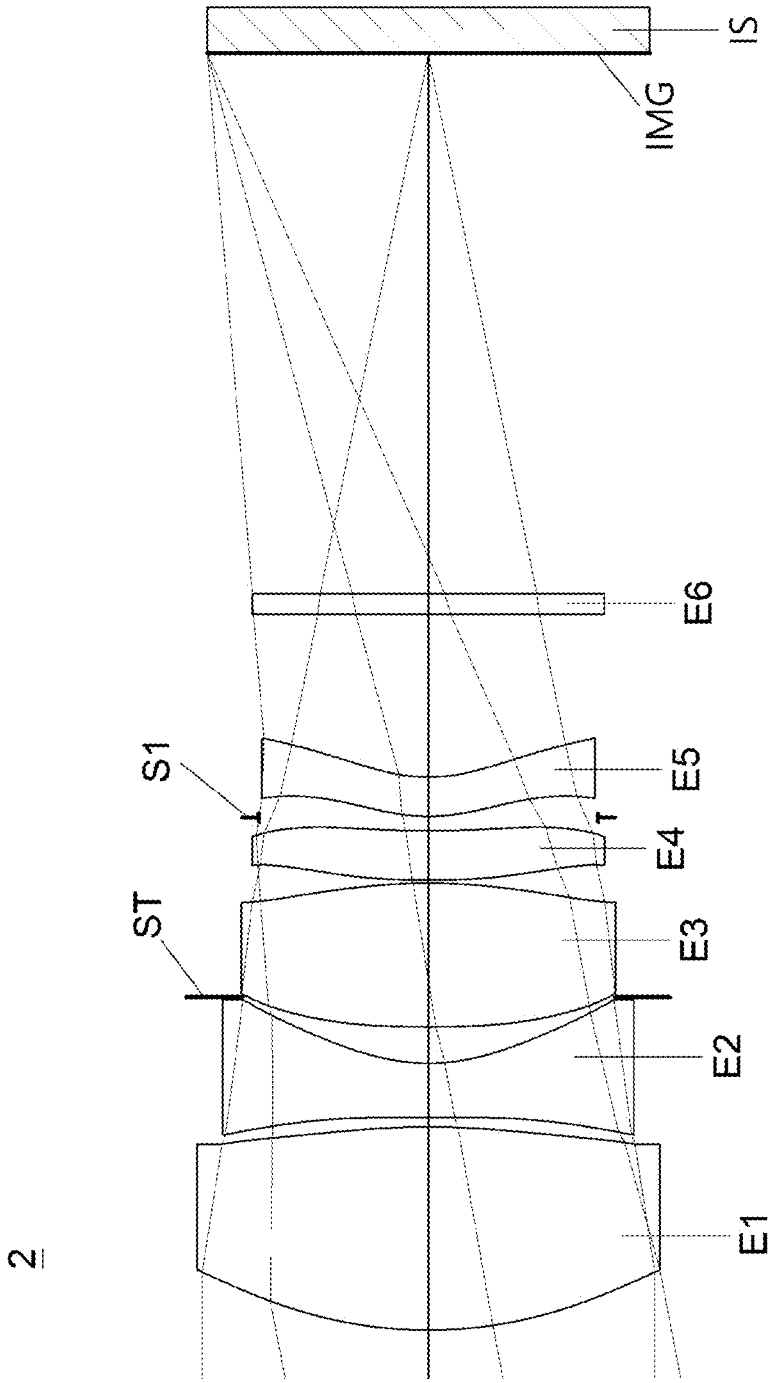
FIG. 2A is a schematic view of an imaging apparatus according to the 2nd embodiment of the present disclosure.
Figure 2B:
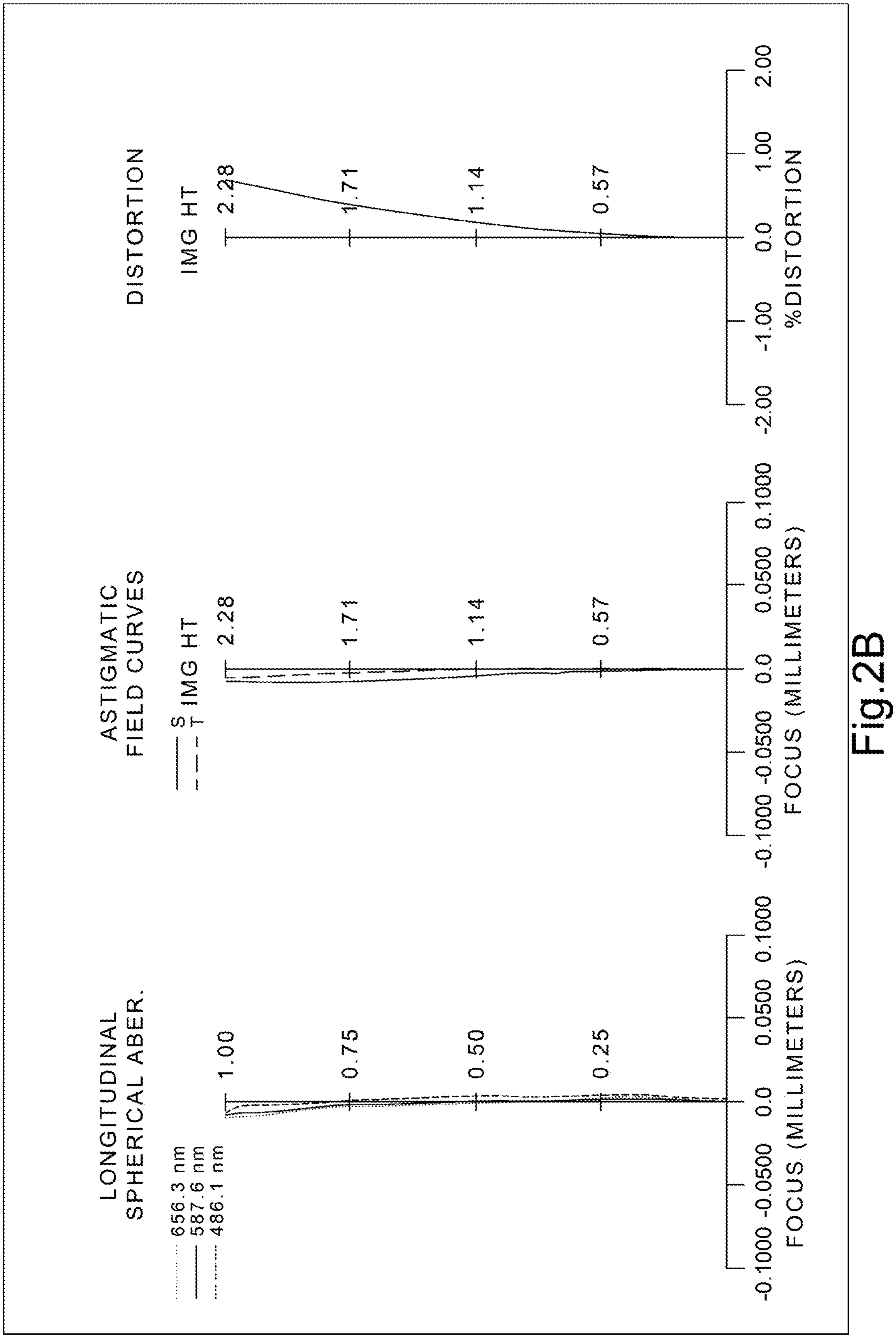
FIG. 2B shows longitudinal spherical aberration curves, astigmatic field curves and a distortion curve of the imaging apparatus according to the 2nd embodiment.

FIG. 2A is a schematic view of an imaging apparatus according to the 2nd embodiment of the present disclosure. FIG. 2B shows, in order from left to right, longitudinal spherical aberration curves, astigmatic field curves and a distortion curve of the imaging apparatus according to the 2nd embodiment.

In FIG. 2A, the imaging apparatus includes a photographing optical lens system 2 of the present disclosure and an image sensor IS. The photographing optical lens system 2 includes, in order from an object side to an image side along an optical path, a first lens element E1, a second lens element E2, an aperture stop ST, a third lens element E3, a fourth lens element E4, a stop S1, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 2. The image sensor IS is disposed on or near the image surface IMG.

The detailed optical data of the 2nd embodiment are shown in TABLE 3, and the aspheric surface data are shown in TABLE 4.

TABLE 3

| (2nd Embodiment) f = 11.91 mm, Fno = 2.55, HFOV = 10.8 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.4530 | (ASP) | 2.100 | Plastic | 1.544 | 55.9 | 5.48 |
| 2 | | −7.4890 | (ASP) | 0.097 | | | | |
| 3 | Lens 2 | 65.6780 | (ASP) | 0.560 | Plastic | 1.583 | 30.2 | −3.48 |
| 4 | | 1.9590 | (ASP) | 0.683 | | | | |
| 5 | Ape. Stop | Plano | | −0.309 | | | | |
| 6 | Lens 3 | 11.8010 | (ASP) | 1.487 | Plastic | 1.544 | 55.9 | 7.35 |
| 7 | | −5.7730 | (ASP) | 0.030 | | | | |
| 8 | Lens 4 | 8.6200 | (ASP) | 0.510 | Plastic | 1.704 | 14.0 | 92.15 |
| 9 | | 9.6980 | (ASP) | 0.138 | | | | |
| 10 | Stop | Plano | | 0.013 | | | | |
| 11 | Lens 5 | 1.8760 | (ASP) | 0.405 | Plastic | 1.679 | 18.4 | −89.63 |
| 12 | | 1.6610 | (ASP) | 1.680 | | | | |
| 13 | Filter | Plano | | 0.210 | Glass | 1.517 | 64.2 | — |
| 14 | | Plano | | 5.591 | | | | |
| 15 | Image Surface | Plano | | — | | | | |

Remark: Reference wavelength is d-line 587.6 nm.
*The effective radius of Surface 1 is 2.390 mm.
*The effective radius of Surface 10 (Stop) is 1.750 mm.

TABLE 4

| Aspheric Coefficient | | | | | |
|---|---|---|---|---|---|
| Surface # | 1 | 2 | 3 | 4 | 6 |
| k= | 1.83660E−01 | 0.00000E+00 | −6.93860E+01 | −8.12410E−01 | 0.00000E+00 |
| A4= | −1.14390E−03 | 1.35490E−02 | −3.69810E−02 | −4.59680E−02 | 2.51100E−02 |
| A6= | −1.09340E−04 | −2.41780E−03 | 1.33180E−02 | 1.03830E−02 | −6.55120E−03 |
| A8= | −6.96410E−06 | 4.74600E−04 | −2.80060E−03 | −2.09880E−03 | 7.48280E−04 |
| A10= | −2.93430E−06 | −1.03910E−04 | 3.54760E−04 | 3.63130E−04 | 1.02870E−04 |
| A12= | | 9.05070E−06 | −2.92910E−05 | −4.85610E−05 | −2.00200E−05 |
| A14= | | | 1.52700E−06 | 4.40610E−06 | 1.74410E−06 |
| Surface # | 7 | 8 | 9 | 11 | 12 |
| k= | −1.12000E+00 | 1.41310E+01 | 2.16230E+01 | −3.63130E−01 | −1.22920E+00 |
| A4= | 1.28360E−02 | 3.00910E−02 | −8.41460E−03 | −1.14320E−01 | −8.75170E−02 |
| A6= | −4.88020E−03 | −2.78750E−02 | −1.76720E−02 | −1.10490E−03 | 3.63110E−03 |
| A8= | 2.10560E−03 | 1.21920E−02 | 9.28760E−03 | 8.11730E−03 | 1.29640E−02 |
| A10= | −7.34130E−04 | −4.49590E−03 | −3.41210E−03 | −7.04460E−04 | −6.20300E−03 |
| A12= | 1.93750E−04 | 1.09660E−03 | 9.01670E−04 | −8.16260E−04 | 1.24800E−03 |
| A14= | −2.00140E−05 | −1.32250E−04 | −1.46710E−04 | 2.43750E−04 | −9.59610E−05 |
| A16= | | 3.10930E−06 | 9.04090E−06 | −2.05690E−05 | |

In the 2nd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 3 and TABLE 4 and satisfy the conditions stated in the table below.

| 2nd Embodiment | | | |
|---|---|---|---|
| f [mm] | 11.91 | CT1/Dr7r10 | 1.97 |
| Fno | 2.55 | Td/BL | 0.76 |
| HFOV [deg.] | 10.8 | ImgH/EPD | 0.49 |
| tan(HFOV) | 0.19 | (R1+ R2)/(R1 − R2) | −0.25 |
| V2 + V4 | 44.2 | (R3 + R4)/(R3 − R4) | 1.06 |
| V1/N1 | 36.23 | (f/R9) + (f/R10) | 13.52 |

-continued

| 2nd Embodiment | | | |
|---|---|---|---|
| V2/N2 | 19.11 | \|f2/f5\| | 0.04 |
| V3/N3 | 36.23 | f2/f1 | −0.64 |
| V4/N4 | 8.22 | f/ImgH | 5.22 |
| V5/N5 | 10.98 | Y52/Y11 | 0.71 |
| Vmin | 14.00 | | |

3rd Embodiment

Figure 3A:
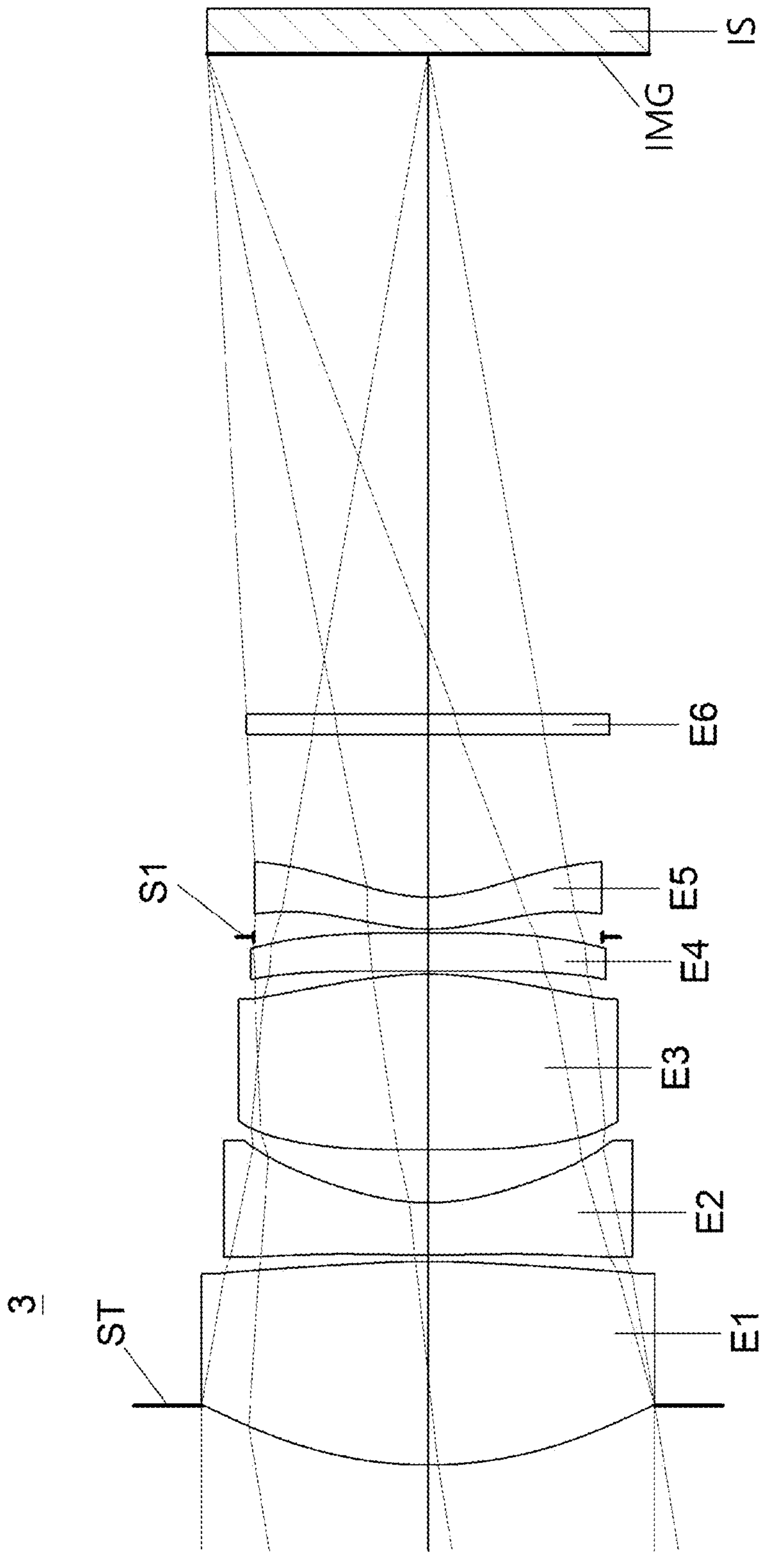
FIG. 3A is a schematic view of an imaging apparatus according to the 3rd embodiment of the present disclosure.
Figure 3B:
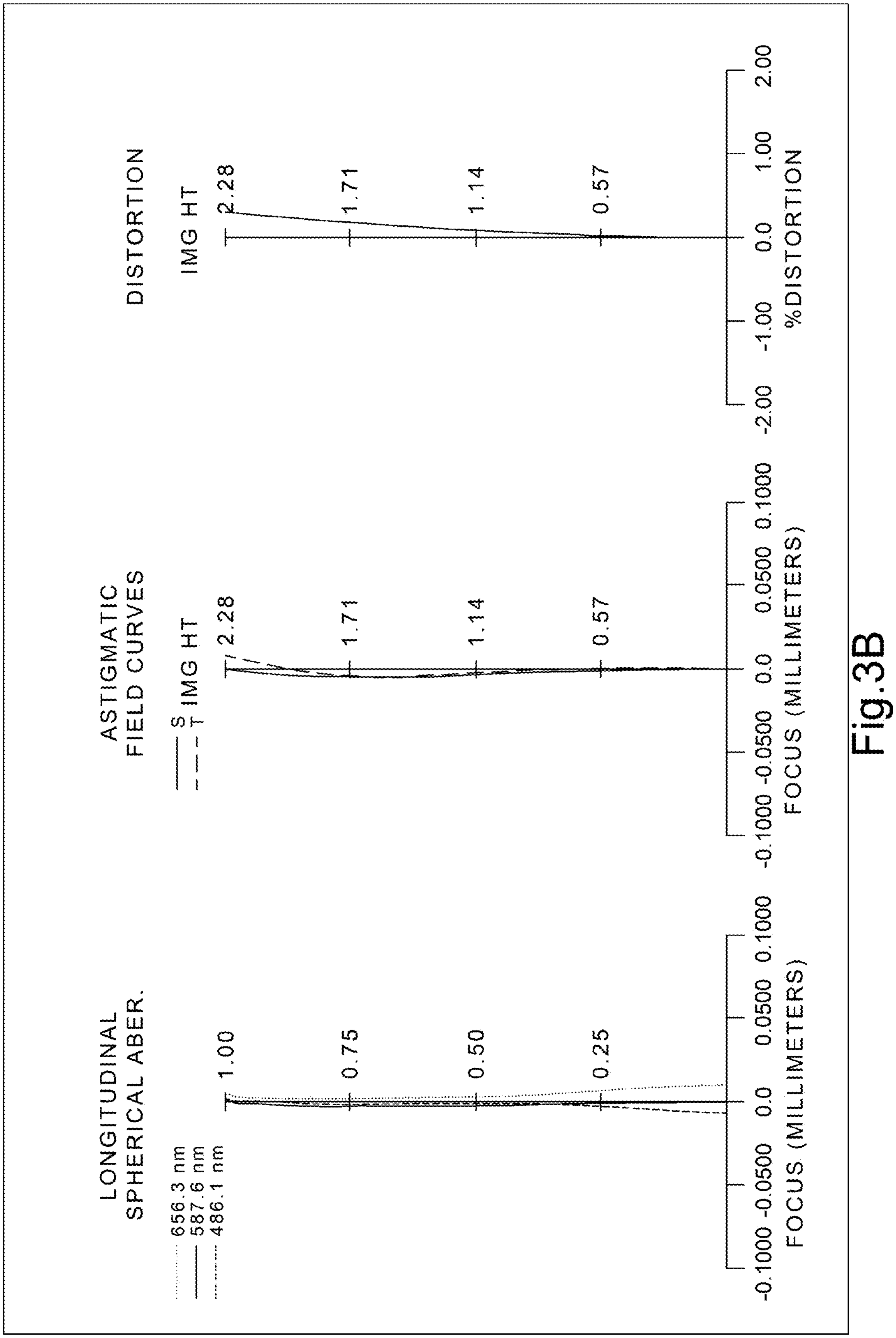
FIG. 3B shows longitudinal spherical aberration curves, astigmatic field curves and a distortion curve of the imaging apparatus according to the 3rd embodiment.

FIG. 3A is a schematic view of an imaging apparatus according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus includes a photographing optical lens system 3 of the present disclosure and an image sensor IS. The photographing optical lens system 3 includes, in order from an object side to an image side along an optical path, an aperture stop ST, a first lens element E1, a second lens element E2, a third lens element E3, a fourth lens element E4, a stop S1, a fifth lens element E5, a filter E6, and an image surface IMG.

The first lens element E1 has positive refractive power and is made of glass material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of glass material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 3. The image sensor IS is disposed on or near the image surface IMG.

The detailed optical data of the 3rd embodiment are shown in TABLE 5, and the aspheric surface data are shown in TABLE 6.

TABLE 5

| (3rd Embodiment) f = 13.79 mm, Fno = 2.95, HFOV = 9.4 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.615 | | | | |
| 2 | Lens 1 | 4.3780 (ASP) | 2.100 | Glass | 1.613 | 59.0 | 5.38 |
| 3 | | −10.9200 (ASP) | 0.068 | | | | |
| 4 | Lens 2 | 16.2190 (ASP) | 0.542 | Glass | 1.693 | 33.7 | −3.99 |
| 5 | | 2.3310 (ASP) | 0.545 | | | | |
| 6 | Lens 3 | 82.0480 (ASP) | 1.815 | Plastic | 1.559 | 40.4 | 6.78 |
| 7 | | −3.9380 (ASP) | 0.030 | | | | |
| 8 | Lens 4 | 94.8260 (ASP) | 0.396 | Plastic | 1.697 | 16.3 | 71.39 |
| 9 | | −104.5860 (ASP) | −0.042 | | | | |
| 10 | Stop | Plano | 0.081 | | | | |
| 11 | Lens 5 | 2.1710 (ASP) | 0.330 | Plastic | 1.607 | 26.6 | −12.18 |
| 12 | | 1.5820 (ASP) | 1.680 | | | | |
| 13 | Filter | Plano | 0.210 | Glass | 1.517 | 64.2 | — |
| 14 | | Plano | 6.820 | | | | |
| 15 | Image Surface | Plano | — | | | | |

Remark: Reference wavelength is d-line 587.6 nm.
*The effective radius of Surface 10 (Stop) is 1.800 mm.

TABLE 6

| Aspheric Coefficient | | | | | |
|---|---|---|---|---|---|
| Surface # | 2 | 3 | 4 | 5 | 6 |
| k= | 2.24300E−01 | 0.00000E+00 | 9.22740E+00 | −2.48400E−01 | 0.00000E+00 |
| A4= | −6.20170E−04 | 9.63930E−03 | −2.67180E−02 | −3.27850E−02 | 3.59630E−02 |
| A6= | −1.63050E−04 | −2.01270E−03 | 5.25810E−03 | 1.29570E−03 | −1.20710E−02 |
| A8= | 3.59950E−06 | 5.21130E−04 | 3.86790E−04 | 4.65150E−04 | 1.77580E−03 |
| A10= | −5.02860E−06 | −1.14400E−04 | −2.66090E−04 | 3.22160E−04 | 3.24880E−04 |
| A12= | | 9.05210E−06 | 3.09220E−05 | −1.21950E−04 | −9.98520E−05 |
| A14= | | | −8.03500E−07 | 1.18100E−05 | 7.31850E−06 |
| Surface # | 7 | 8 | 9 | 11 | 12 |
| k= | −1.46670E+00 | −9.00000E+01 | −9.00000E+01 | −2.22690E−03 | −2.33100E+00 |
| A4= | 2.39390E−02 | −5.35590E−03 | −2.04700E−02 | −1.26810E−01 | −9.85250E−02 |
| A6= | −7.12680E−03 | −1.33560E−02 | −6.73020E−03 | 2.69020E−02 | 4.17880E−02 |
| A8= | 4.21970E−03 | 1.50780E−02 | 1.47680E−02 | 2.01900E−03 | −1.30880E−02 |
| A10= | −2.28090E−03 | −7.36870E−03 | −8.54730E−03 | −5.41010E−03 | 2.51160E−03 |

TABLE 6-continued

| Aspheric Coefficient | | | | | |
|---|---|---|---|---|---|
| A12= | 6.24550E−04 | 1.52620E−03 | 2.18140E−03 | 1.87540E−03 | −2.29780E−04 |
| A14= | −6.18590E−05 | −6.83460E−05 | −2.27510E−04 | −2.61150E−04 | 5.05030E−06 |
| A16= | | −1.03770E−05 | 4.93920E−06 | 1.11350E−05 | |

In the 3rd embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 5 and TABLE 6 and satisfy the conditions stated in the table below.

| 3rd Embodiment | | | |
|---|---|---|---|
| f [mm] | 13.79 | CT1/Dr7r10 | 2.75 |
| Fno | 2.95 | Td/BL | 0.67 |
| HFOV [deg.] | 9.4 | ImgH/EPD | 0.49 |
| tan(HFOV) | 0.17 | (R1 + R2)/(R1 − R2) | −0.43 |
| V2 + V4 | 50.0 | (R3 + R4)/(R3 − R4) | 1.34 |
| V1/N1 | 36.57 | (f/R9) + (f/R10) | 15.07 |
| V2/N2 | 19.93 | [f2/f5] | 0.33 |
| V3/N3 | 25.95 | f2/f1 | −0.74 |
| V4/N4 | 9.59 | f/ImgH | 6.04 |
| V5/N5 | 16.57 | Y52/Y11 | 0.77 |
| Vmin | 16.27 | | |

4th Embodiment

Figure 4A:
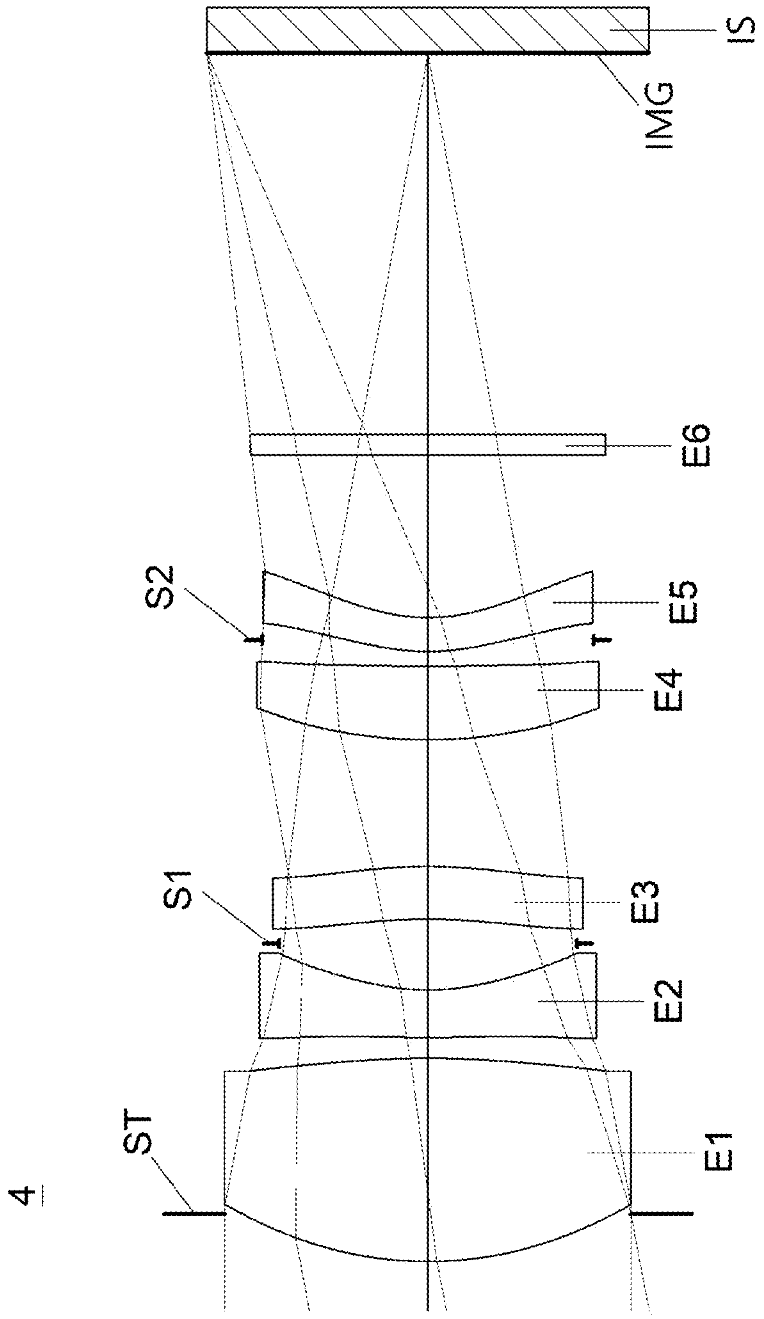
FIG. 4A is a schematic view of an imaging apparatus according to the 4th embodiment of the present disclosure.
Figure 4B:
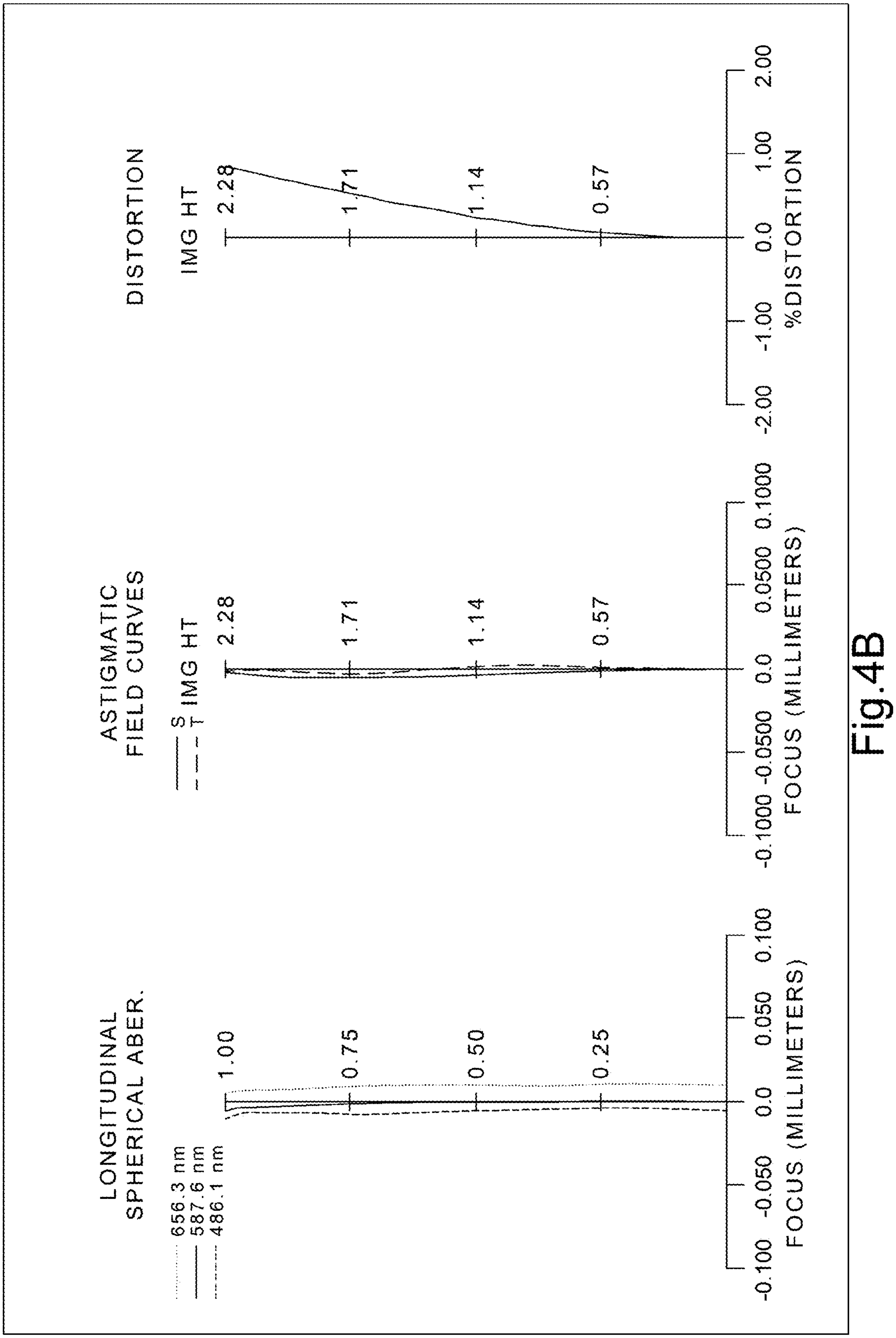
FIG. 4B shows longitudinal spherical aberration curves, astigmatic field curves and a distortion curve of the imaging apparatus according to the 4th embodiment.

FIG. 4A is a schematic view of an imaging apparatus according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus includes a photographing optical lens system 4 of the present disclosure and an image sensor IS. The photographing optical lens system 4 includes, in order from an object side to an image side along an optical path, an aperture stop ST, a first lens element E1, a second lens element E2, a stop S1, a third lens element E3, a fourth lens element E4, a stop S2, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric. Meanwhile, the first lens element E1 may be replaced with a lens element E' as shown in FIG. 11A. The lens element E' includes two cut edges in the x-axis direction on the outer diameter thereof to reduce the size of the lens element in the x-axis direction.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 4. The image sensor IS is disposed on or near the image surface IMG.

The detailed optical data of the 4th embodiment are shown in TABLE 7, and the aspheric surface data are shown in TABLE 8.

TABLE 7

| (4th Embodiment) f = 11.91mm, Fno = 2.84, HFOV= 10.8 deg. | | | | | | | | | |
|---|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.489 | | | | |
| 2 | Lens 1 | 3.9030 | (ASP) | 2.100 | Plastic | 1.545 | 56.1 | 5.34 |
| 3 | | −9.2880 | (ASP) | 0.214 | | | | |
| 4 | Lens 2 | 14.2230 | (ASP) | 0.492 | Plastic | 1.587 | 28.3 | |
| 5 | | 2.3590 | (ASP) | 0.481 | | | | |
| 6 | Stop | Plano | | 0.250 | | | | |
| 7 | Lens 3 | −5.7680 | (ASP) | 0.545 | Plastic | 1.544 | 56.0 | 81.24 |
| 8 | | −5.2720 | (ASP) | 1.310 | | | | |

TABLE 7-continued

| (4th Embodiment) f = 11.91mm, Fno = 2.84, HFOV= 10.8 deg. | | | | | | | | |
|---|---|---|---|---|---|---|---|---|
| Surface # | | Curvature Radius | | Thickness | Material | Index | Abbe # | Focal Length |
| 9 | Lens 4 | 4.9150 | (ASP) | 0.759 | Plastic | 1.566 | 37.4 | 12.40 |
| 10 | | 15.4860 | (ASP) | 0.271 | | | | |
| 11 | Stop | Plano | | −0.117 | | | | |
| 12 | Lens 5 | 2.2670 | (ASP) | 0.350 | Plastic | 1.534 | 56.0 | −22.60 |
| 13 | | 1.8060 | (ASP) | 1.680 | | | | |
| 14 | Filter | Plano | | 0.210 | Glass | 1.517 | 64.2 | — |
| 15 | | Plano | | 3.947 | | | | |
| 16 | Image Surface | Plano | | — | | | | |

Remark: Reference wavelength is d-line 587.6 nm.
*The effective radius of Surface 6 (Stop) is 1.540 mm.
*The effective radius of Surface 11 (Stop) is 1.710 nun.

TABLE 8

| Aspheric Coefficient | | | | | |
|---|---|---|---|---|---|
| Surface # | 2 | 3 | 4 | 5 | 7 |
| k = | 2.28290E−01 | 0.00000E+00 | 3.67880E+01 | −2.72370E−01 | 0.00000E+00 |
| A4 = | −6.27880E−04 | 7.92920E−03 | −4.00130E−02 | −5.69760E−02 | 3.15040E−02 |
| A6 = | −1.70810E−04 | −2.41440E−04 | 1.69200E−02 | 1.72530E−02 | −1.64130E−02 |
| A8 = | 5.88620E−06 | −5.82100E−04 | −5.27920E−03 | −4.86970E−03 | 9.65360E−03 |
| A10 = | −7.15170E−06 | 1.50490E−04 | 1.19010E−03 | 1.70680E−03 | −2.53670E−03 |
| A12 = | | −1.26730E−05 | −1.48790E−04 | −3.38830E−04 | 1.94340E−04 |
| A14 = | | | 7.05230E−06 | 2.14570E−05 | 1.21390E−06 |
| Surface # | 8 | 9 | 10 | 12 | 13 |
| k = | −1.55680E+01 | 3.90660E+00 | 0.00000E+00 | 2.28010E−01 | −1.06310E+00 |
| A4 = | 1.38410E−02 | −4.29490E−03 | −3.40400E−02 | −1.00250E−01 | −6.11800E−02 |
| A6 = | −7.15750E−03 | −6.99090E−03 | 2.09850E−02 | 2.98610E−02 | 1.01350E−02 |
| A8 = | 5.86000E−03 | 6.88520E−03 | −5.60410E−03 | −7.63280E−03 | 2.83670E−03 |
| A10 = | −1.49290E−03 | −2.83980E−03 | 1.35870E−03 | 1.47390E−03 | −2.59810E−03 |
| A12 = | −6.24750E−05 | 6.24200E−04 | −3.60730E−04 | −6.86810E−04 | 6.70300E−04 |
| A14 = | 3.86180E−05 | −8.47720E−05 | 3.46710E−05 | 2.03560E−04 | −6.41720E−05 |
| A16 = | | 4.69770E−06 | | −2.51410E−05 | |

In the 4th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 7 and TABLE 8 and satisfy the conditions stated in the table below.

| 4th Embodiment | | | |
|---|---|---|---|
| f [mm] | 11.91 | CT1/Dr7r10 | 1.66 |
| Fno | 2.84 | Td/BL | 1.14 |
| HFOV [deg.] | 10.8 | ImgH/EPD | 0.54 |
| tan(HFOV) | 0.19 | (R1 + R2)/(R1 − R2) | −0.41 |
| V2 + V4 | 65.7 | (R3 + R4)/(R3 − R4) | 1.40 |
| V1/N1 | 36.30 | (f/R9) + (f/R10) | 11.85 |
| V2/N2 | 17.83 | [f2/f5] | 0.22 |
| V3/N3 | 36.26 | f2/f1 | −0.92 |
| V4/N4 | 23.91 | f/ImgH | 5.22 |
| V5/N5 | 36.48 | Y52/Y11 | 0.80 |
| Vmin | 28.30 | | |

5th Embodiment

Figure 5A:
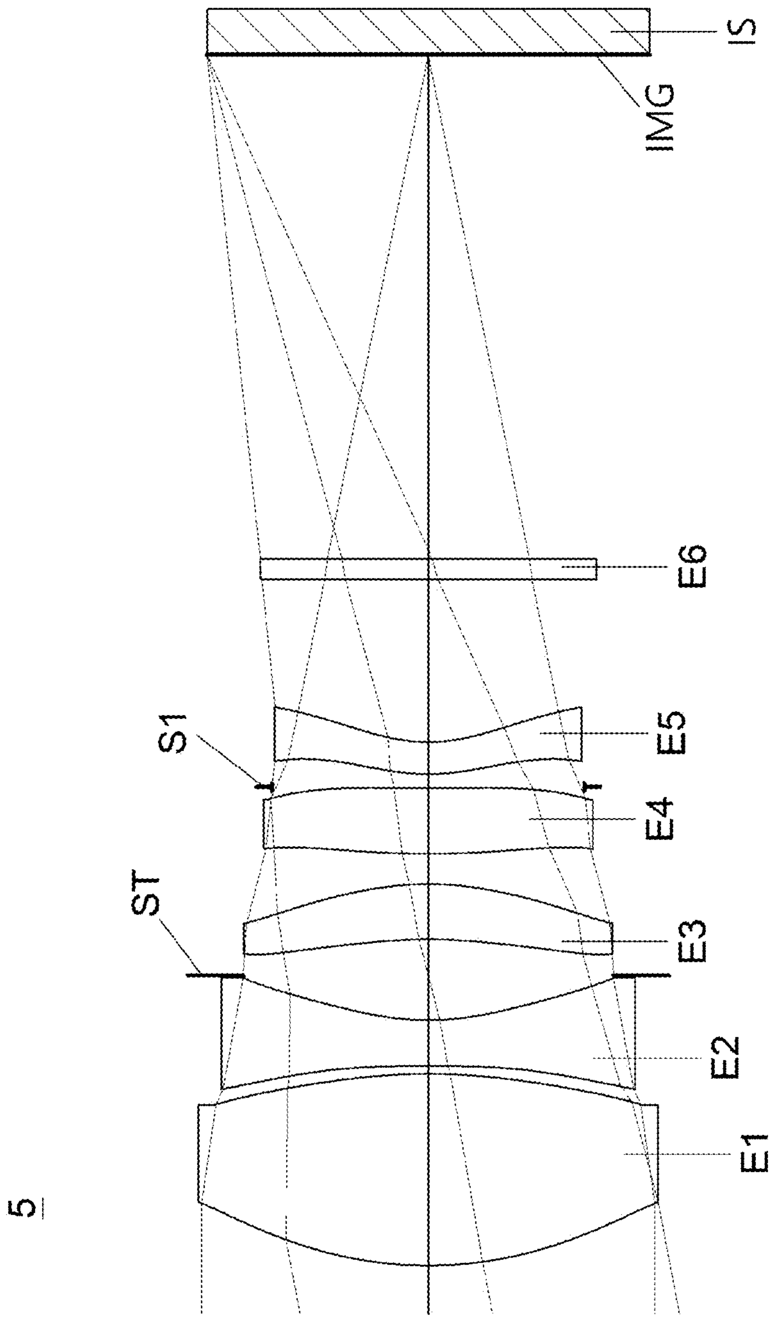
FIG. 5A is a schematic view of an imaging apparatus according to the 5th embodiment of the present disclosure.
Figure 5B:
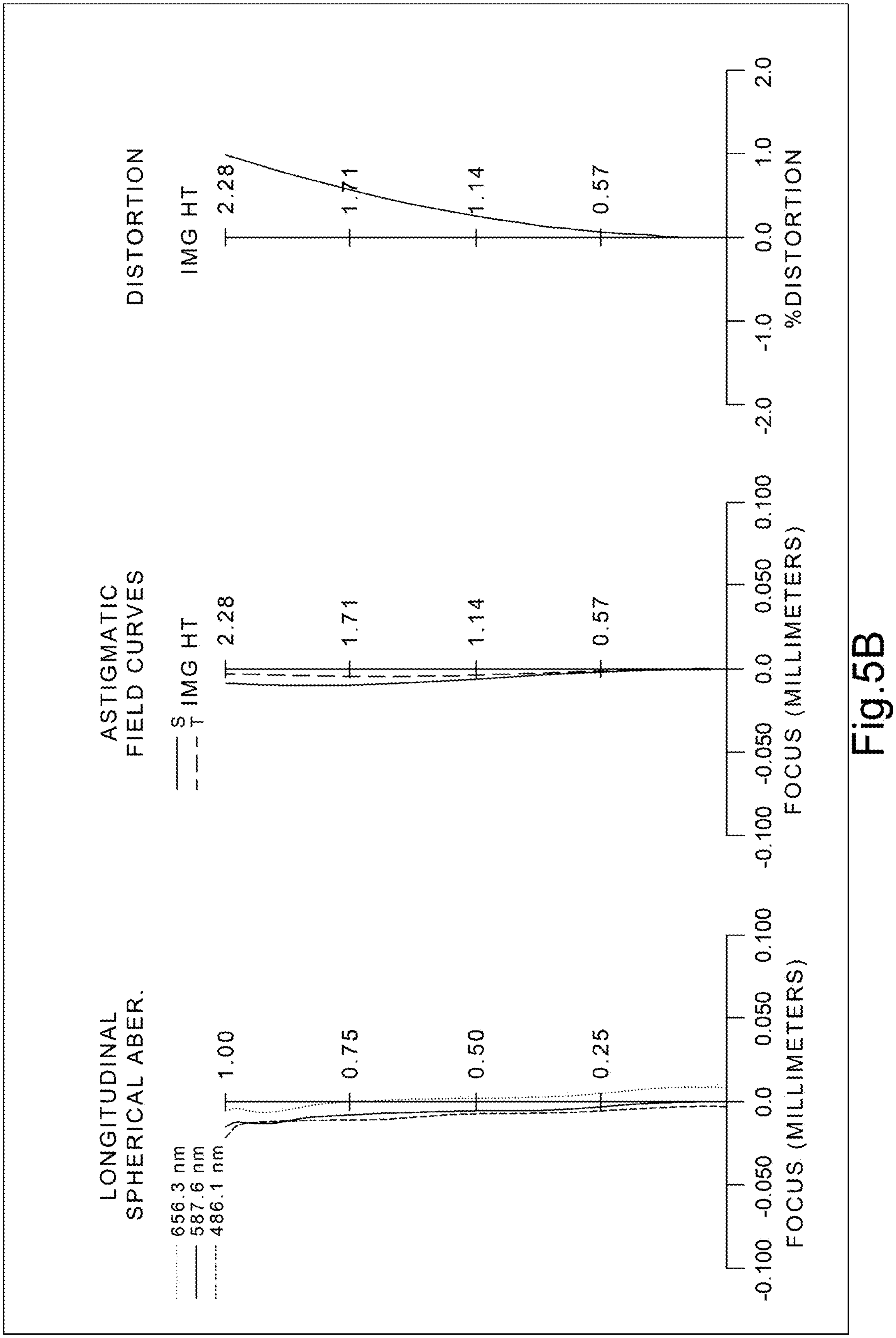
FIG. 5B shows longitudinal spherical aberration curves, astigmatic field curves and a distortion curve of the imaging apparatus according to the 5th embodiment.

FIG. 5A is a schematic view of an imaging apparatus according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus includes a photographing optical lens system 5 of the present disclosure and an image sensor IS. The photographing optical lens system 5 includes, in order from an object side to an image side along an optical path, a first lens element E1, a second lens element E2, an aperture stop ST, a third lens element E3, a fourth lens element E4, a stop S1, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being concave in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 5. The image sensor IS is disposed on or near the image surface IMG.

The detailed optical data of the 5th embodiment are shown in TABLE 9, and the aspheric surface data are shown in TABLE 10.

TABLE 9

| (5th Embodiment) f = 11.91 mm, Fno = 2.55, HFOV = 10.8 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.0920 | (ASP) | 1.978 | Plastic | 1.544 | 56.0 | 4.77 |
| 2 | | −5.8900 | (ASP) | 0.080 | | | | |
| 3 | Lens 2 | −28.3640 | (ASP) | 0.473 | Plastic | 1.580 | 30.2 | −4.19 |
| 4 | | 2.6710 | (ASP) | 0.460 | | | | |
| 5 | Ape. Stop | Plano | | 0.374 | | | | |
| 6 | Lens 3 | −4.9430 | (ASP) | 0.571 | Plastic | 1.544 | 56.0 | 13.11 |
| 7 | | −3.0380 | (ASP) | 0.312 | | | | |
| 8 | Lens 4 | 9.2560 | (ASP) | 0.676 | Plastic | 1.686 | 18.4 | 21.97 |
| 9 | | 23.2780 | (ASP) | 0.013 | | | | |
| 10 | Stop | Plano | | 0.134 | | | | |
| 11 | Lens 5 | 2.1160 | (ASP) | 0.330 | Plastic | 1.602 | 25.9 | −15.61 |
| 12 | | 1.6260 | (ASP) | 1.680 | | | | |
| 13 | Filter | Plano | | 0.210 | Glass | 1.517 | 64.2 | — |
| 14 | | Plano | | 5.204 | | | | |
| 15 | Image Surface | Plano | | — | | | | |

Remark: Reference wavelength is d-line 587.6 nm.

*The effective radius of Surface 1 is 2.370 mm.

*The effective radius of Surface 10 (Stop) is 1.610 mm.

TABLE 10

| Aspheric Coefficient | | | | | |
|---|---|---|---|---|---|
| Surface # | 1 | 2 | 3 | 4 | 6 |
| k = | 1.25260E−01 | 0.00000E+00 | 8.58970E+01 | −4.06450E−01 | 0.00000E+00 |
| A4 = | −1.24930E−03 | 1.00860E−02 | −3.08850E−02 | −4.24490E−02 | 4.29160E−02 |
| A6 = | −1.10980E−04 | −1.39760E−03 | 1.07090E−02 | 6.54570E−03 | −1.95650E−02 |
| A8 = | −1.03550E−05 | 3.38880E−05 | −1.99400E−03 | −4.48920E−04 | 5.23050E−03 |
| A10 = | −7.41110E−06 | 6.08400E−06 | 2.59660E−04 | 4.52010E−05 | −7.28020E−04 |
| A12 = | | −5.04290E−07 | −2.44270E−05 | 1.73840E−06 | 9.87300E−05 |
| A14 = | | | 1.23220E−06 | −1.70520E−06 | −8.59230E−06 |
| Surface # | 7 | 8 | 9 | 11 | 12 |
| k = | −1.19900E+00 | −6.09210E+01 | 8.96790E+01 | −1.34450E−01 | −2.13630E+00 |
| A4 = | 3.32830E−02 | 9.34610E−03 | −3.47070E−02 | −1.29020E−01 | −7.68120E−02 |
| A6 = | −1.61200E−02 | −1.54280E−02 | 6.17860E−03 | 1.35550E−02 | 8.05540E−03 |
| A8 = | 5.94400E−03 | 8.35220E−03 | −1.32830E−03 | 6.62770E−03 | 1.27620E−02 |
| A10 = | −1.52090E−03 | −3.08880E−03 | 1.03550E−03 | −1.99870E−03 | −8.07810E−03 |
| A12 = | 2.61750E−04 | 6.88870E−04 | −6.78220E−04 | −9.13980E−04 | 2.01870E−03 |
| A14 = | −1.93780E−05 | −9.64390E−05 | 1.71310E−04 | 4.62420E−04 | −1.89660E−04 |
| A16 = | | 6.50870E−06 | −1.50110E−05 | −5.48950E−05 | |

In the 5th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 9 and TABLE 10 and satisfy the conditions stated in the table below.

| 5th Embodiment | | | |
|---|---|---|---|
| f [mm] | 11.91 | CT1/Dr7r10 | 1.72 |
| Fno | 2.55 | Td/BL | 0.76 |
| HFOV [deg.] | 10.8 | ImgH/EPD | 0.49 |
| tan(HFOV) | 0.19 | (R1 + R2)/(R1 − R2) | −0.18 |
| V2 + V4 | 48.6 | (R3 + R4)/(R3 − R4) | 0.83 |
| V1/N1 | 36.27 | (f/R9) + (f/R10) | 12.96 |
| V2/N2 | 19.11 | [f2/f5] | 0.27 |
| V3/N3 | 36.27 | f2/f1 | −0.88 |
| V4/N4 | 10.90 | f/ImgH | 5.22 |
| V5/N5 | 16.17 | Y52/Y11 | 0.67 |
| Vmin | 18.38 | | |

6th Embodiment

Figure 6A:
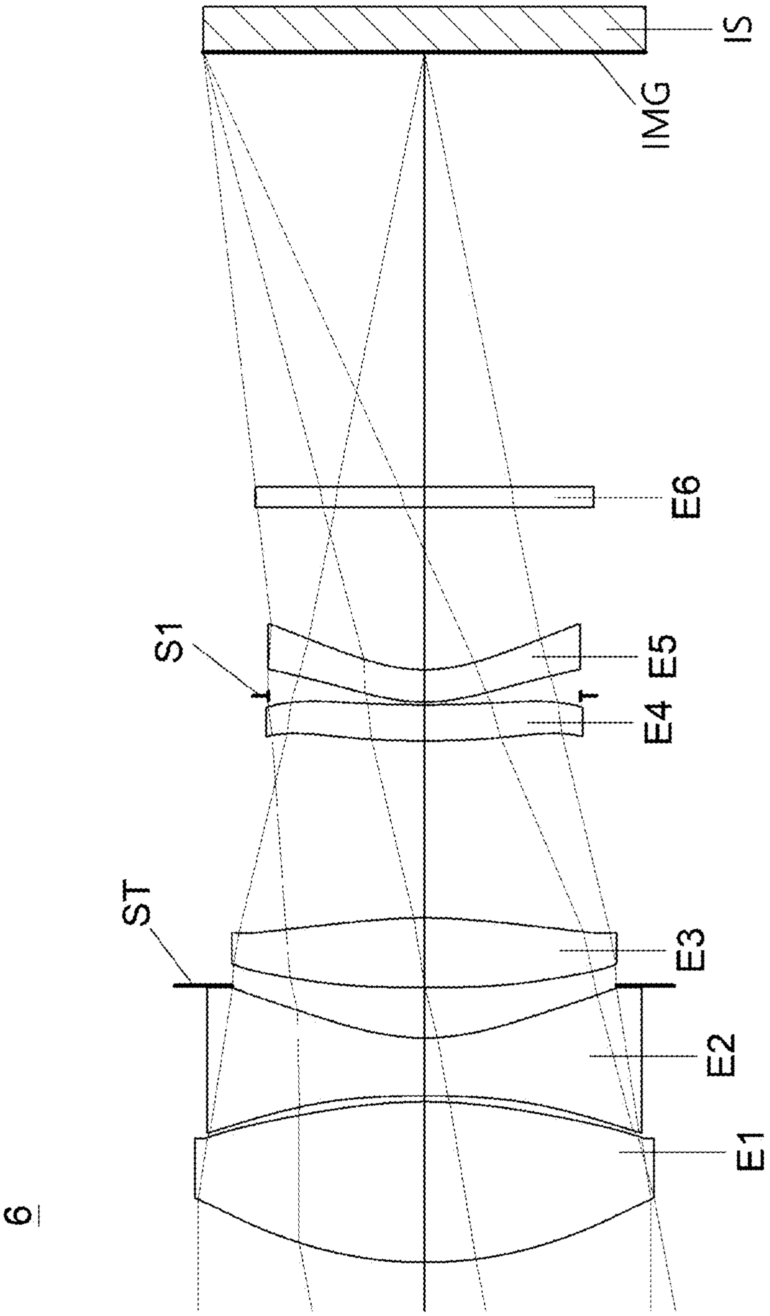
FIG. 6A is a schematic view of an imaging apparatus according to the 6th embodiment of the present disclosure.
Figure 6B:
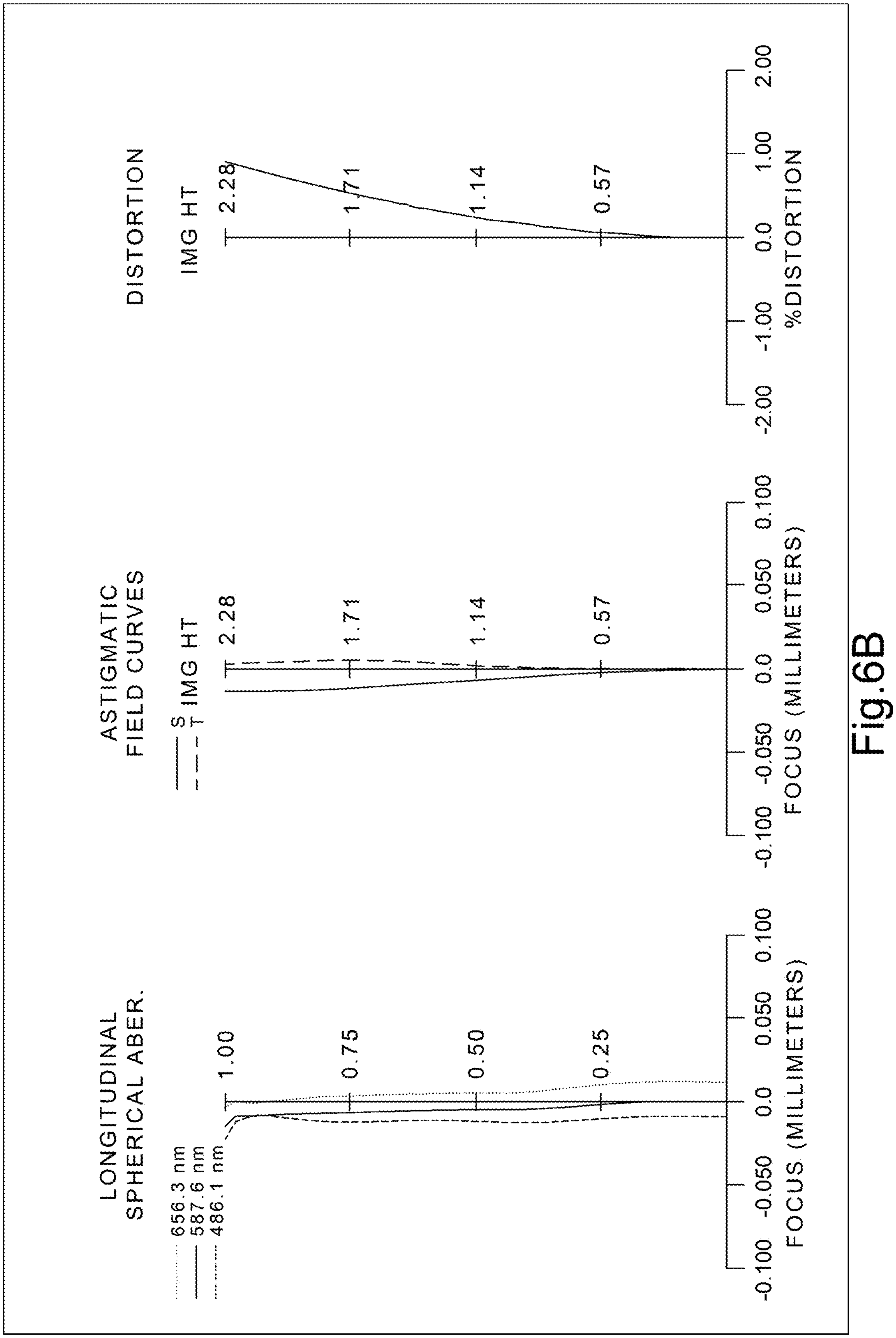
FIG. 6B shows longitudinal spherical aberration curves, astigmatic field curves and a distortion curve of the imaging apparatus according to the 6th embodiment.

FIG. 6A is a schematic view of an imaging apparatus according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus includes a photographing optical lens system 6 of the present disclosure and an image sensor IS. The photographing optical lens system 6 includes, in order from an object side to an image side along an optical path, a first lens element E1, a second lens element E2, an aperture stop ST, a third lens element E3, a fourth lens element E4, a stop S1, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being concave in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being convex in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 6. The image sensor IS is disposed on or near the image surface IMG.

The detailed optical data of the 6th embodiment are shown in TABLE 11, and the aspheric surface data are shown in TABLE 12.

TABLE 11

| (6th Embodiment) f = 11.91 mm, Fno = 2.55, HFOV = 10.8 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | 4.1727 | (ASP) | 1.658 | Plastic | 1.545 | 56.1 | 4.48 |
| 2 | | −5.0507 | (ASP) | 0.061 | | | | |
| 3 | Lens 2 | −13.9574 | (ASP) | 0.599 | Plastic | 1.566 | 37.4 | −3.43 |
| 4 | | 2.2864 | (ASP) | 0.540 | | | | |
| 5 | Ape. Stop | Plano | | −0.019 | | | | |
| 6 | Lens 3 | 26.7816 | (ASP) | 0.717 | Plastic | 1.534 | 56.0 | 9.06 |
| 7 | | −5.8499 | (ASP) | 1.830 | | | | |
| 8 | Lens 4 | 11.5215 | (ASP) | 0.371 | Plastic | 1.686 | 18.4 | 10950.48 |
| 9 | | 11.3880 | (ASP) | 0.091 | | | | |
| 10 | Stop | Plano | | −0.061 | | | | |
| 11 | Lens 5 | 1.7893 | (ASP) | 0.334 | Plastic | 1.587 | 28.3 | −86.12 |
| 12 | | 1.6088 | (ASP) | 1.680 | | | | |
| 13 | Filter | Plano | | 0.210 | Glass | 1.517 | 64.2 | — |
| 14 | | Plano | | 4.485 | | | | |
| 15 | Image Surface | Plano | | — | | | | |

Remark: Reference wavelength is d-line 587.6 nm.

*The effective radius of Surface 1 is 2.370 mm.

*The effective radius of Surface 10 (Stop) is 1.610 mm.

TABLE 12

| Aspheric Coefficient | | | | | |
|---|---|---|---|---|---|
| Surface # | 1 | 2 | 3 | 4 | 6 |
| k = | 2.82964E−01 | 0.00000E+00 | 2.19778E+01 | −7.09377E−01 | 0.00000E+00 |
| A4 = | −1.24762E−03 | 1.05959E−02 | −3.40465E−02 | −3.89721E−02 | 3.36137E−02 |
| A6 = | −1.07747E−05 | 3.18904E−04 | 1.21132E−02 | 4.23708E−03 | −7.98139E−03 |
| A8 = | 2.73037E−05 | −4.96513E−04 | −2.31822E−03 | −1.38304E−03 | −1.08397E−03 |
| A10 = | −1.47820E−05 | 6.17940E−05 | 2.96249E−04 | 6.30298E−04 | 4.40145E−04 |
| A12 = | | −2.07453E−06 | −2.57401E−05 | −9.86577E−05 | 3.46861E−05 |
| A14 = | | | 1.24610E−06 | 3.53038E−06 | −1.00945E−05 |
| Surface # | 7 | 8 | 9 | 11 | 12 |
| k = | −1.96229E+00 | −1.77868E+01 | 3.74083E+01 | −2.09922E−01 | −1.01112E+00 |
| A4 = | 1.63811E−02 | 3.56380E−02 | −6.72356E−03 | −1.25097E−01 | −8.04085E−02 |
| A6 = | 2.72507E−04 | −3.47930E−02 | −1.43087E−02 | 1.18355E−02 | −4.95460E−03 |
| A8 = | −1.10061E−03 | 1.93941E−02 | 1.49777E−02 | 1.58508E−02 | 2.82013E−02 |
| A10 = | −1.01720E−04 | −9.85966E−03 | −1.30727E−02 | −1.09936E−02 | −1.63713E−02 |
| A12 = | 1.16701E−04 | 2.47565E−03 | 5.44822E−03 | 2.82514E−03 | 4.28259E−03 |
| A14 = | −1.12494E−05 | −1.20691E−04 | −1.02344E−03 | −2.24189E−04 | −4.50455E−04 |
| A16 = | | −3.26040E−05 | 6.28661E−05 | −2.04440E−05 | |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 11 and TABLE 12 and satisfy the conditions stated in the table below.

| 6th Embodiment | | | |
|---|---|---|---|
| f [mm] | 11.91 | CT1/Dr7r10 | 2.26 |
| Fno | 2.55 | Td/BL | 0.96 |
| HFOV [deg.] | 10.8 | ImgH/EPD | 0.49 |
| tan(HFOV) | 0.19 | (R1 + R2)/(R1 − R2) | −0.10 |
| V2 + V4 | 55.8 | (R3 + R4)/(R3 − R4) | 0.72 |
| V1/N1 | 36.30 | (f/R9) + (f/R10) | 14.06 |
| V2/N2 | 23.91 | [f2/f5] | 0.04 |
| V3/N3 | 36.48 | f2/f1 | −0.77 |
| V4/N4 | 10.90 | f/ImgH | 5.22 |
| V5/N5 | 17.83 | Y52/Y11 | 0.67 |
| Vmin | 18.38 | | |

7th Embodiment

Figure 7A:
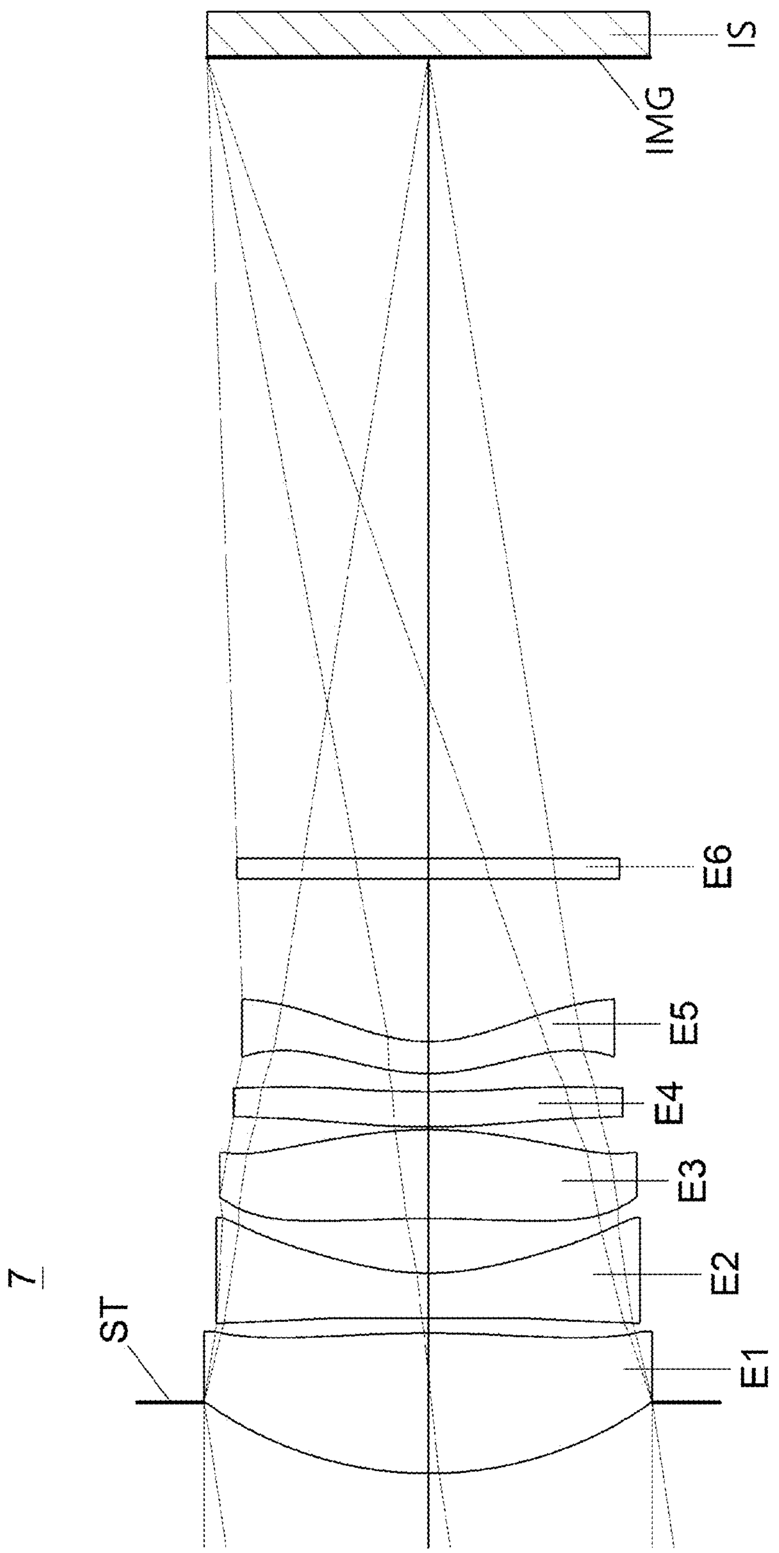
FIG. 7A is a schematic view of an imaging apparatus according to the 7th embodiment of the present disclosure.
Figure 7B:
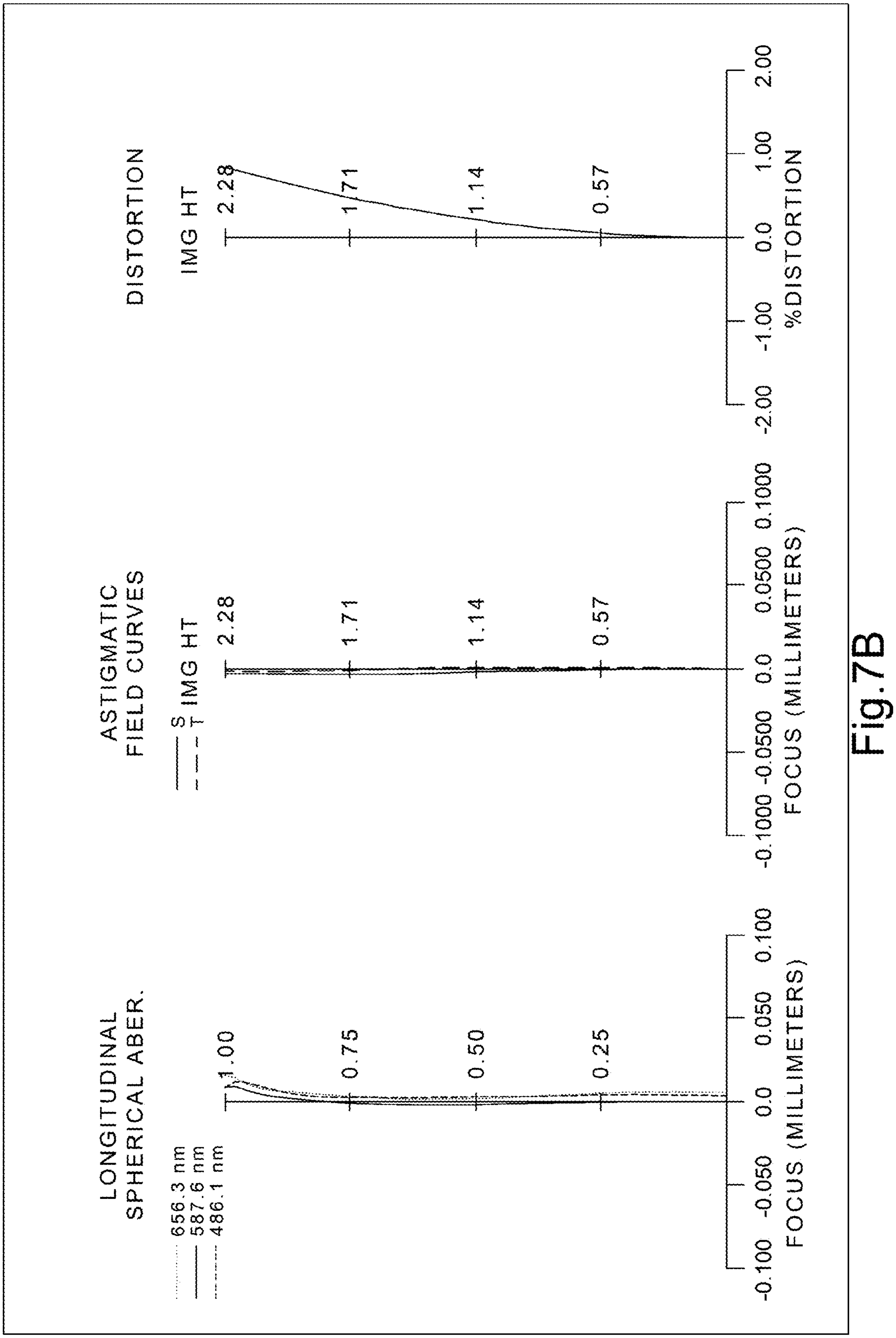
FIG. 7B shows longitudinal spherical aberration curves, astigmatic field curves and a distortion curve of the imaging apparatus according to the 7th embodiment.

FIG. 7A is a schematic view of an imaging apparatus according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus includes a photographing optical lens system 7 of the present disclosure and an image sensor IS. The photographing optical lens system 7 includes, in order from an object side to an image side along an optical path, an aperture stop ST, a first lens element E1, a second lens element E2, a third lens element E3, a fourth lens element E4, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 7. The image sensor IS is disposed on or near the image surface IMG.

The detailed optical data of the 7th embodiment are shown in TABLE 13, and the aspheric surface data are shown in TABLE 14.

TABLE 13

| (7th Embodiment) f = 15.01 mm, Fno = 3.25, HFOV = 8.6 deg. | | | | | | | |
|---|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.731 | | | | |
| 2 | Lens 1 | 3.9900 (ASP) | 1.446 | Plastic | 1.544 | 56.0 | 5.76 |
| 3 | | −12.7280 (ASP) | 0.152 | | | | |
| 4 | Lens 2 | 22.2320 (ASP) | 0.468 | Plastic | 1.584 | 28.2 | −5.15 |
| 5 | | 2.6290 (ASP) | 0.563 | | | | |
| 6 | Lens 3 | −11.3140 (ASP) | 0.918 | Plastic | 1.544 | 56.0 | 11.84 |
| 7 | | −4.2210 (ASP) | 0.030 | | | | |
| 8 | Lens 4 | 8.4970 (ASP) | 0.361 | Plastic | 1.713 | 12.4 | 62.23 |
| 9 | | 10.3230 (ASP) | 0.188 | | | | |
| 10 | Lens 5 | 2.0810 (ASP) | 0.330 | Plastic | 1.544 | 56.0 | −18.83 |
| 11 | | 1.6330 (ASP) | 1.680 | | | | |
| 12 | Filter | Plano | 0.210 | Glass | 1.517 | 64.2 | — |
| 13 | | Plano | 8.264 | | | | |
| 14 | Image Surface | Plano | — | | | | |

Remark: Reference wavelength is d-line 587.6 nm.

TABLE 14

| Aspheric Coefficient | | | | | |
|---|---|---|---|---|---|
| Surface # | 2 | 3 | 4 | 5 | 6 |
| k = | 8.92930E−01 | 0.00000E+00 | 7.79720E+01 | −5.37910E−01 | 0.00000E+00 |
| A4 = | −1.67960E−03 | 9.74310E−03 | −3.02020E−02 | −4.10940E−02 | 2.87680E−02 |
| A6 = | −1.89160E−04 | −1.74700E−03 | 7.84800E−03 | 6.39550E−03 | −1.06400E−02 |
| A8 = | −4.96120E−06 | 7.52150E−04 | −1.05530E−04 | 3.75500E−04 | 3.25930E−03 |
| A10 = | −2.54450E−06 | −1.32320E−04 | −3.01540E−04 | −1.41080E−04 | −3.46670E−04 |
| A12 = | | 9.00120E−06 | 5.10740E−05 | −8.55660E−08 | 1.47470E−05 |
| A14 = | | | −2.87270E−06 | −1.15790E−07 | −7.64600E−07 |
| Surface # | 7 | 8 | 9 | 10 | 11 |
| k = | 3.79930E−01 | −1.63990E+01 | 2.13700E+01 | −1.75380E−01 | −1.90620E+00 |
| A4 = | 2.59020E−02 | 4.58550E−03 | −5.76830E−03 | −9.08930E−02 | −7.24590E−02 |
| A6 = | −7.66960E−03 | −1.03180E−02 | −1.08600E−02 | 9.80310E−03 | 2.55190E−02 |
| A8 = | 2.02840E−03 | 2.89620E−03 | 4.73060E−03 | 3.00320E−04 | −9.32480E−03 |
| A10 = | −2.68880E−04 | −4.89780E−04 | −1.23260E−03 | −1.44690E−03 | 2.44830E−03 |
| A12 = | 3.32690E−05 | 1.91750E−04 | 2.68550E−04 | 5.18430E−04 | −3.64670E−04 |
| A14 = | −2.01300E−06 | −4.46510E−05 | −3.46720E−05 | −7.99690E−05 | 2.28860E−05 |
| A16 = | | 2.97140E−06 | 9.61110E−07 | 3.98500E−06 | |

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 13 and TABLE 14 and satisfy the conditions stated in the table below.

| 7th Embodiment | | | |
|---|---|---|---|
| f [mm] | 15.01 | CT1/Dr7r10 | 1.65 |
| Fno | 3.25 | Td/BL | 0.44 |
| HFOV [deg.] | 8.6 | ImgH/EPD | 0.49 |
| tan(HFOV) | 0.15 | (R1 + R2)/(R1 − R2) | −0.52 |
| V2 + V4 | 40.6 | (R3 + R4)/(R3 − R4) | 1.27 |
| V1/N1 | 36.26 | (f/R9) + (f/R10) | 16.41 |
| V2/N2 | 17.83 | [f2/f5] | 0.27 |
| V3/N3 | 36.26 | f2/f1 | −0.89 |
| V4/N4 | 7.21 | f/ImgH | 6.58 |

-continued

| 7th Embodiment | | | |
|---|---|---|---|
| V5/N5 | 36.26 | Y52/Y11 | 0.83 |
| Vmin | 12.36 | | |

8th Embodiment

Figure 8A:
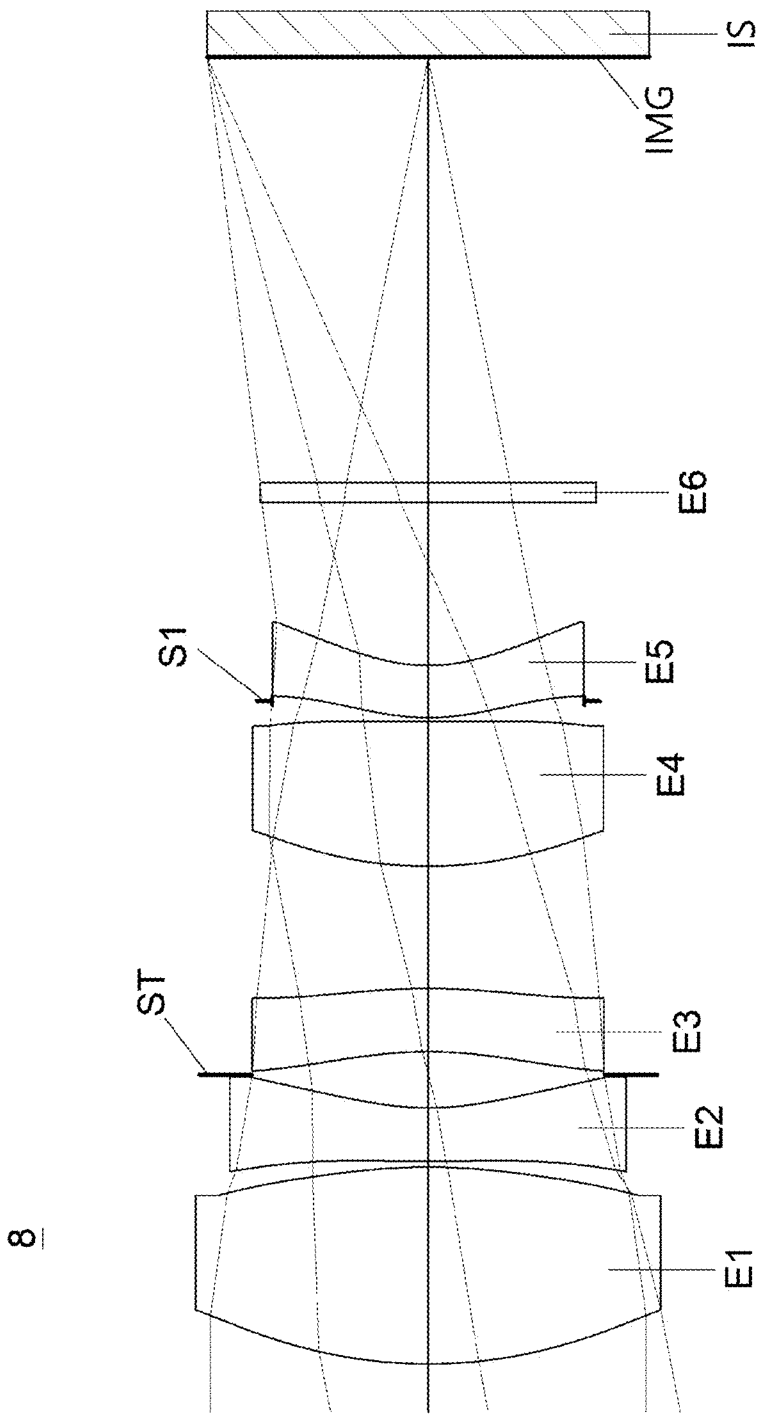
FIG. 8A is a schematic view of an imaging apparatus according to the 8th embodiment of the present disclosure.
Figure 8B:
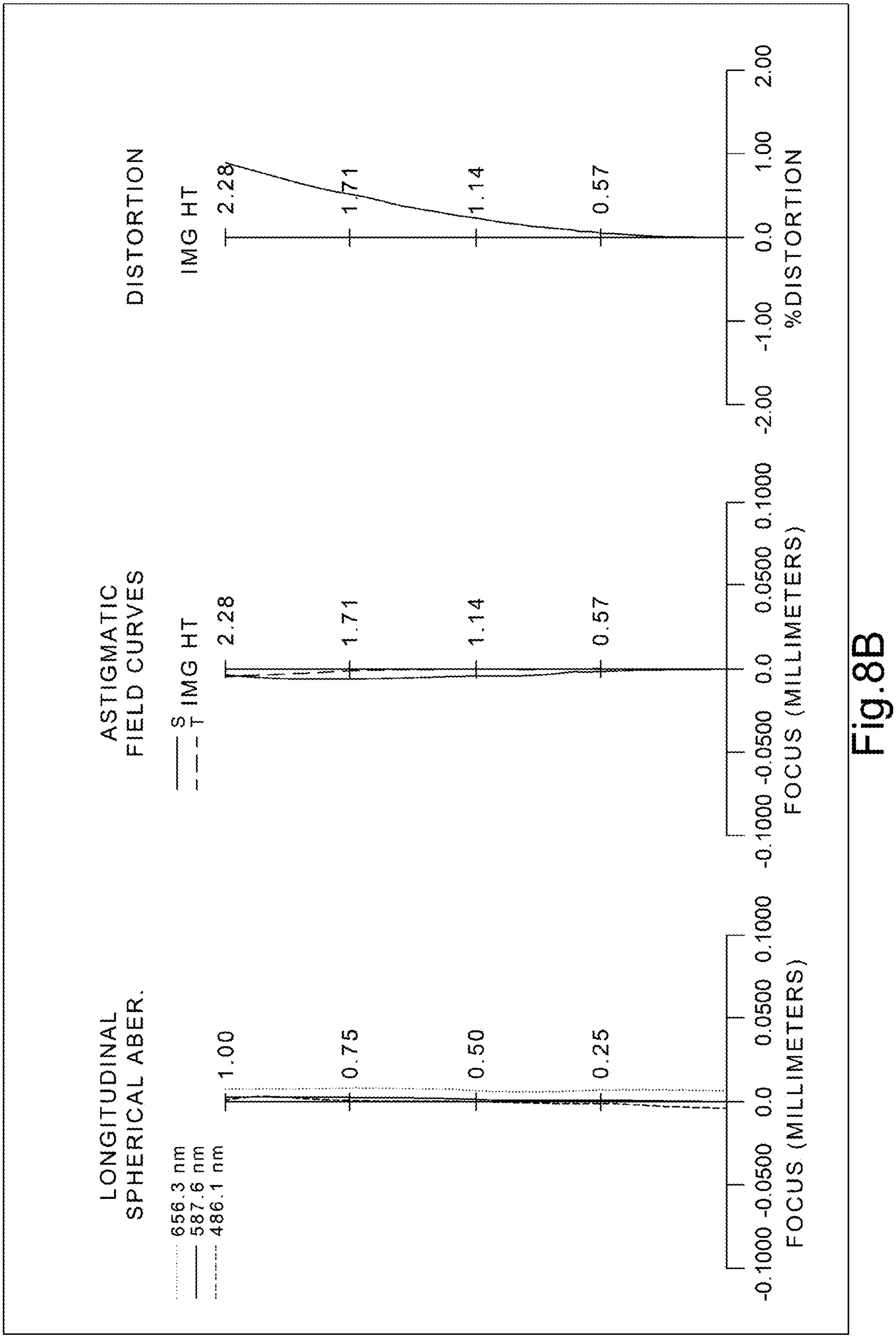
FIG. 8B shows longitudinal spherical aberration curves, astigmatic field curves and a distortion curve of the imaging apparatus according to the 8th embodiment.

FIG. 8A is a schematic view of an imaging apparatus according to the 8th embodiment of the present disclosure. FIG. 8B shows, in order from left to right, longitudinal spherical aberration curves, astigmatic field curves and a distortion curve of the imaging apparatus according to the 8th embodiment.

In FIG. 8A, the imaging apparatus includes a photographing optical lens system 8 of the present disclosure and an image sensor IS. The photographing optical lens system 8 includes, in order from an object side to an image side along an optical path, a first lens element E1, a second lens element E2, an aperture stop ST, a third lens element E3, a fourth lens element E4, a stop S1, a fifth lens element E5, a filter E6, and an image surface IMG.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has negative refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 8. The image sensor IS is disposed on or near the image surface IMG.

The detailed optical data of the 8th embodiment are shown in TABLE 15, and the aspheric surface data are shown in TABLE 16.

TABLE 15

(8th Embodiment)
f = 11.91 mm, Fno = 2.65, HFOV = 10.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 4.9610 | (ASP) | 2.033 | Plastic | 1.544 | 56.0 | 5.40 |
| 2 | | −6.1600 | (ASP) | 0.058 | | | | |
| 3 | Lens 2 | 17.4310 | (ASP) | 0.554 | Plastic | 1.575 | 32.1 | −5.95 |
| 4 | | 2.8280 | (ASP) | 0.341 | | | | |
| 5 | Ape. Stop | Plano | | 0.239 | | | | |
| 6 | Lens 3 | −4.3180 | (ASP) | 0.653 | Plastic | 1.566 | 37.4 | −26.67 |
| 7 | | −6.3780 | (ASP) | 1.263 | | | | |
| 8 | Lens 4 | 4.5240 | (ASP) | 1.490 | Plastic | 1.544 | 56.0 | 9.69 |
| 9 | | 28.2460 | (ASP) | 0.217 | | | | |
| 10 | Stop | Plano | | −0.173 | | | | |
| 11 | Lens 5 | 2.3410 | (ASP) | 0.538 | Plastic | 1.544 | 56.0 | −21.31 |
| 12 | | 1.7900 | (ASP) | 1.680 | | | | |
| 13 | Filter | Plano | | 0.210 | Glass | 1.517 | 64.2 | — |
| 14 | | Plano | | 4.395 | | | | |
| 15 | Image Surface | Plano | | — | | | | |

Remark: Reference wavelength is d-line 587.6 nm.
*The effective radius of Surface 1 is 2,400 mm.
*The effective radius of Surface 10 (Stop) is 1.610 mm.

TABLE 16

Aspheric Coefficient

| Surface # | 1 | 2 | 3 | 4 | 6 |
|---|---|---|---|---|---|
| k = | 2.09700E−01 | 0.00000E+00 | −7.98310E+01 | −7.19380E−01 | 0.00000E+00 |
| A4 = | −5.69270E−04 | 1.03320E−02 | −3.28380E−02 | −5.69210E−02 | 2.15250E−02 |
| A6 = | −1.34910E−04 | −8.44970E−04 | 1.24780E−02 | 1.75990E−02 | −4.67450E−04 |
| A8 = | −3.51160E−07 | −3.29730E−04 | −3.32490E−03 | −4.43760E−03 | −5.01600E−04 |
| A10 = | −3.70780E−06 | 7.57420E−05 | 5.09130E−04 | 1.01870E−03 | 3.61910E−04 |
| A12 = | | −4.76400E−06 | −3.48900E−05 | −1.89020E−04 | −1.20590E−04 |
| A14 = | | | 6.10400E−07 | 1.70250E−05 | 1.35190E−05 |

| Surface # | 7 | 8 | 9 | 11 | 12 |
|---|---|---|---|---|---|
| k = | −1.59190E+01 | 2.78540E+00 | 0.00000E+00 | 1.49880E−01 | −1.04340E+00 |
| A4 = | 1.24230E−02 | 4.84750E−03 | −1.90990E−02 | −8.02980E−02 | −5.17090E−02 |
| A6 = | 2.26730E−04 | −5.59750E−03 | 6.55790E−03 | 4.07740E−03 | −3.27640E−03 |

TABLE 16-continued

| Aspheric Coefficient | | | | | |
|---|---|---|---|---|---|
| A8 = | −6.86430E−04 | 1.31820E−03 | −3.09390E−03 | 1.75100E−03 | 1.02860E−02 |
| A10 = | 1.70510E−04 | −3.54550E−04 | 1.19700E−03 | 2.75800E−04 | −4.58240E−03 |
| A12 = | −2.09350E−05 | 5.85740E−05 | −2.86400E−04 | −5.52740E−04 | 9.50100E−04 |
| A14 = | 9.07230E−07 | −4.26580E−06 | 2.48650E−05 | 1.41920E−04 | −8.07900E−05 |
| A16 = | | −4.71400E−07 | | −1.30800E−05 | |

In the 8th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 8th embodiment, so an explanation in this regard will not be provided again.

Moreover, these parameters can be calculated from TABLE 15 and TABLE 16 and satisfy the conditions stated in the table below.

| 8th Embodiment | | | |
|---|---|---|---|
| f [mm] | 11.91 | CT1/Dr7r10 | 0.98 |
| Fno | 2.65 | Td/BL | 1.15 |
| HFOV [deg.] | 10.8 | ImgH/EPD | 0.51 |
| tan(HFOV) | 0.19 | (R1 + R2)/(R1 − R2) | −0.11 |
| V2 + V4 | 88.1 | (R3 + R4)/(R3 − R4) | 1.39 |
| V1/N1 | 36.26 | (f/R9) + (f/R10) | 11.74 |
| V2/N2 | 20.38 | \|f2/f5\| | 0.28 |
| V3/N3 | 23.91 | f2/f1 | −1.10 |
| V4/N4 | 36.26 | f/ImgH | 5.22 |
| V5/N5 | 36.26 | Y52/Y11 | 0.65 |
| Vmin | 32.10 | | |

9th Embodiment

Figure 9A:
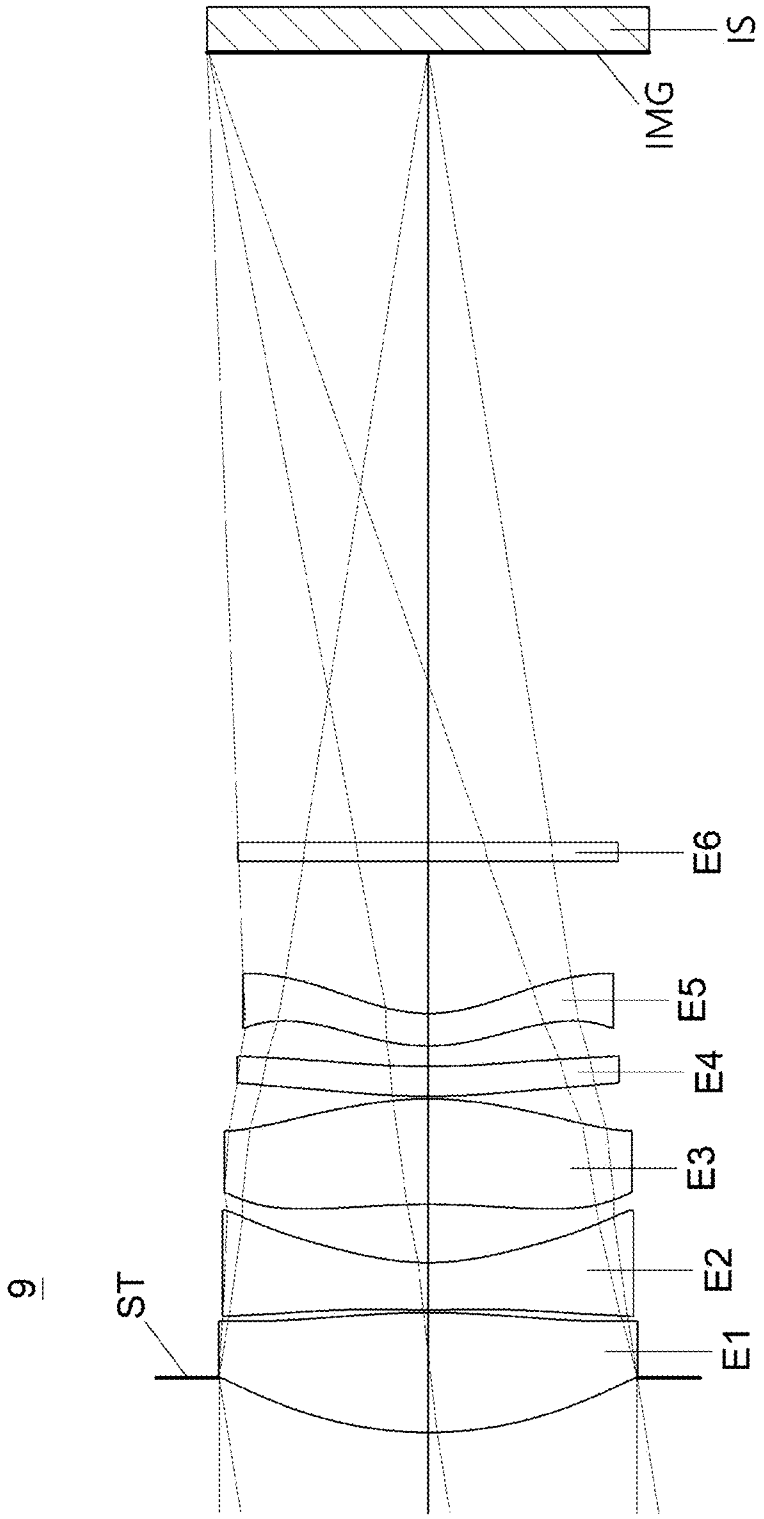
FIG. 9A is a schematic view of an imaging apparatus according to the 9th embodiment of the present disclosure.
Figure 9B:
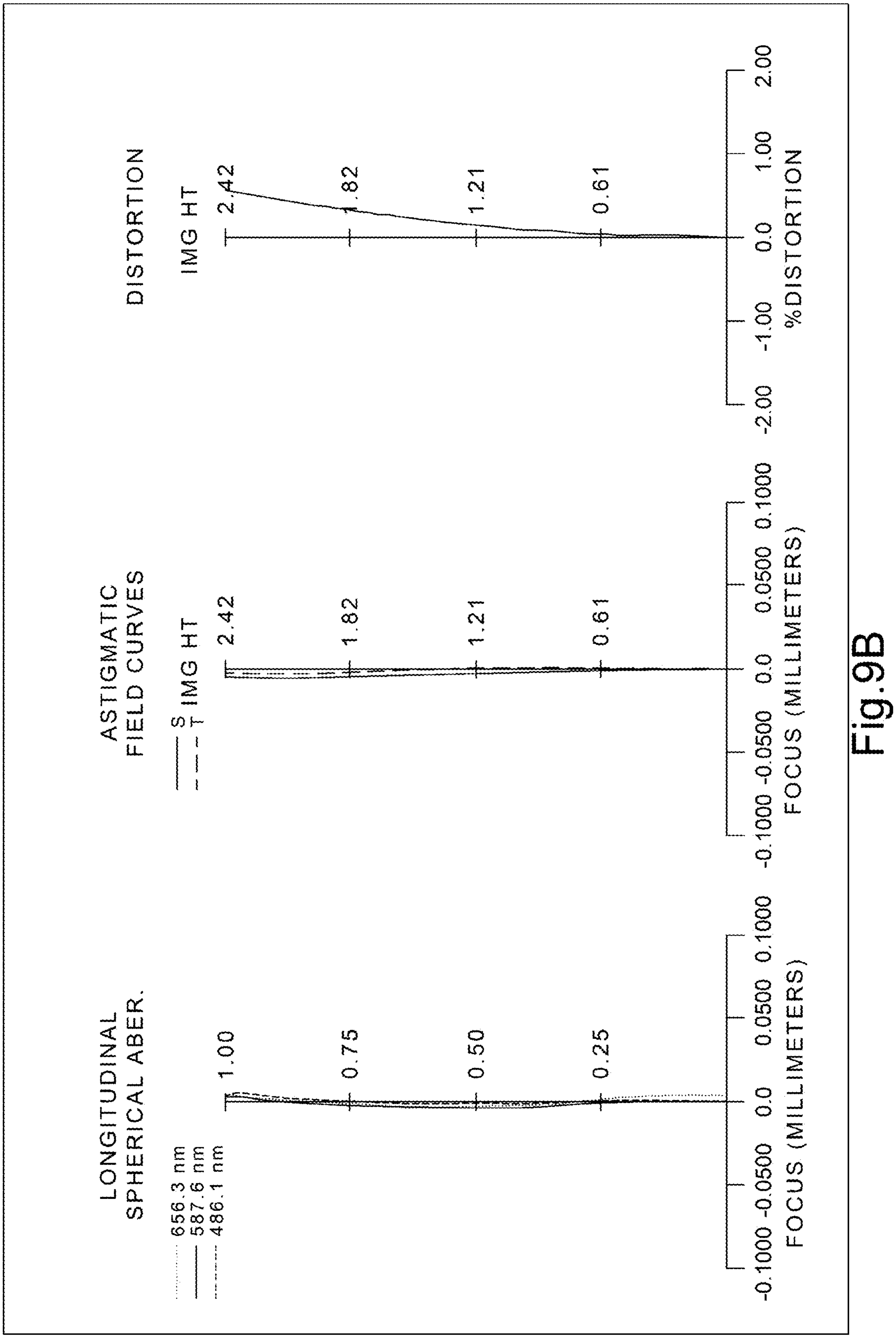
FIG. 9B shows longitudinal spherical aberration curves, astigmatic field curves and a distortion curve of the imaging apparatus according to the 9th embodiment.

FIG. 9A is a schematic view of an imaging apparatus according to the 9th embodiment of the present disclosure. FIG. 9B shows, in order from left to right, longitudinal spherical aberration curves, astigmatic field curves and a distortion curve of the imaging apparatus according to the 9th embodiment.

In FIG. 9A, the imaging apparatus includes a photographing optical lens system 9 of the present disclosure and an image sensor IS. The photographing optical lens system 9 includes, in order from an object side to an image side along an optical path, an aperture stop ST, a first lens element E1, a second lens element E2, a third lens element E3, a fourth lens element E4, a fifth lens element E5, a filter E6, and an image surface IMG.

The first lens element E1 has positive refractive power and is made of plastic material. The first lens element E1 has an object-side surface being convex in a paraxial region thereof, and an image-side surface being concave in a paraxial region thereof. Both the object-side surface and the image-side surface are aspheric.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 9. The image sensor IS is disposed on or near the image surface IMG.

The detailed optical data of the 9th embodiment are shown in TABLE 17, and the aspheric surface data are shown in TABLE 18.

TABLE 17

| (9th Embodiment) f = 15.02 mm, Fno = 3.25, HFOV = 9.1 deg. | | | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Ape. Stop | Plano | | −0.603 | | | | |
| 2 | Lens 1 | 4.3520 | (ASP) | 1.323 | Plastic | 1.544 | 56.0 | 5.63 |
| 3 | | −9.2500 | (ASP) | 0.030 | | | | |
| 4 | Lens 2 | 26.5070 | (ASP) | 0.523 | Plastic | 1.575 | 32.1 | −5.41 |
| 5 | | 2.7660 | (ASP) | 0.644 | | | | |
| 6 | Lens 3 | −8.1640 | (ASP) | 1.166 | Plastic | 1.544 | 56.0 | 12.42 |
| 7 | | −3.8830 | (ASP) | 0.030 | | | | |
| 8 | Lens 4 | 8.6340 | (ASP) | 0.329 | Plastic | 1.713 | 12.4 | 286.45 |

TABLE 17-continued

| (9th Embodiment) f = 15.02 mm, Fno = 3.25, HFOV = 9.1 deg. | | | | | | | | |
|---|---|---|---|---|---|---|---|---|
| Surface # | | Curvature Radius | | Thickness | Material | Index | Abbe # | Focal Length |
| 9 | | 8.8720 | (ASP) | 0.226 | | | | |
| 10 | Lens 5 | 1.9980 | (ASP) | 0.359 | Plastic | 1.544 | 56.0 | −23.55 |
| 11 | | 1.6190 | (ASP) | 1.680 | | | | |
| 12 | Filter | Plano | | 0.210 | Glass | 1.517 | 64.2 | — |
| 13 | | Plano | | 8.734 | | | | |
| 14 | Image Surface | Plano | | — | | | | |

Remark: Reference wavelength is d-line 587.6 nm.

TABLE 18

| Aspheric Coefficient | | | | | |
|---|---|---|---|---|---|
| Surface # | 2 | 3 | 4 | 5 | 6 |
| k = | 7.55930E−01 | 0.00000E+00 | 8.90580E+01 | −2.64820E−01 | 0.00000E+00 |
| A4 = | −1.35840E−03 | 1.00200E−02 | −2.76320E−02 | −3.92870E−02 | 2.96270E−02 |
| A6 = | −1.64270E−04 | −1.06020E−03 | 7.44100E−03 | 5.65140E−03 | −1.07990E−02 |
| A8 = | −1.36990E−05 | 2.34500E−04 | −7.78500E−04 | −7.23800E−05 | 3.64950E−03 |
| A10 = | −6.56240E−06 | −2.74960E−05 | 7.40150E−06 | 7.52810E−06 | −6.33870E−04 |
| A12 = | | 1.27140E−07 | 4.04700E−06 | −1.50830E−05 | 6.92470E−05 |
| A14 = | | | −3.13640E−07 | 8.11020E−07 | −4.26360E−06 |
| Surface # | 7 | 8 | 9 | 10 | 11 |
| k = | 8.01800E−01 | 1.69120E+00 | 1.46180E+01 | −2.89540E−01 | −1.94130E+00 |
| A4 = | 2.40300E−02 | −1.35490E−04 | −6.74500E−03 | −8.68300E−02 | −6.84970E−02 |
| A6 = | −5.67510E−03 | −7.51040E−03 | −6.90880E−03 | 9.77960E−03 | 2.18850E−02 |
| A8 = | 1.83560E−03 | 3.83560E−03 | 3.94840E−03 | −2.11480E−04 | −7.12350E−03 |
| A10 = | −3.97500E−04 | −1.69530E−03 | −1.74300E−03 | −1.09680E−03 | 1.64810E−03 |
| A12 = | 6.33510E−05 | 5.68880E−04 | 5.50970E−04 | 4.12750E−04 | −2.17830E−04 |
| A14 = | −4.60200E−06 | −9.82070E−05 | −9.11030E−05 | −6.61460E−05 | 1.20910E−05 |
| A16 = | | 6.31860E−06 | 5.48760E−06 | 3.61530E−06 | |

In the 9th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 9th embodiment, so an explanation in this regard will not be provided again.

Moreover, these parameters can be calculated from TABLE 17 and TABLE 18 and satisfy the conditions stated in the table below.

| 9th Embodiment | | | |
|---|---|---|---|
| f [mm] | 15.02 | CT1/Dr7r10 | 1.45 |
| Fno | 3.25 | Td/BL | 0.44 |
| HFOV [deg.] | 9.1 | ImgH/EPD | 0.52 |
| tan(HFOV) | 0.16 | (R1 + R2)/(R1 − R2) | −0.36 |
| V2 + V4 | 44.5 | (R3 + R4)/(R3 − R4) | 1.23 |
| V1/N1 | 36.26 | (f/R9) + (f/R10) | 16.79 |
| V2/N2 | 20.38 | \|f2/f5\| | 0.23 |
| V3/N3 | 36.26 | f2/f1 | −0.96 |
| V4/N4 | 7.21 | f/ImgH | 6.19 |
| V5/N5 | 36.26 | Y52/Y11 | 0.88 |
| Vmin | 12.36 | | |

10th Embodiment

Figure 10A:
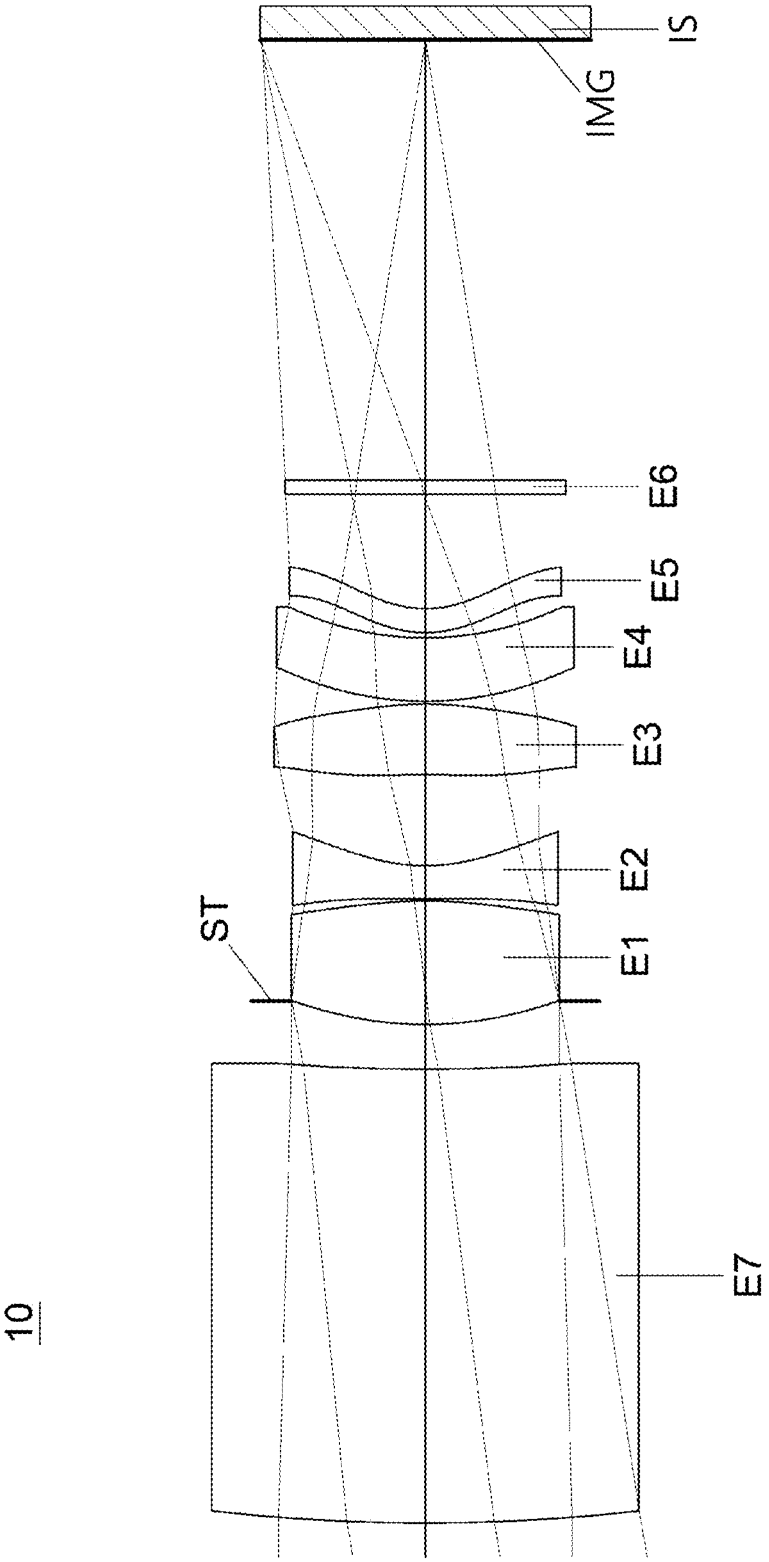
FIG. 10A is a schematic view of an imaging apparatus according to the 10th embodiment of the present disclosure.
Figure 10B:
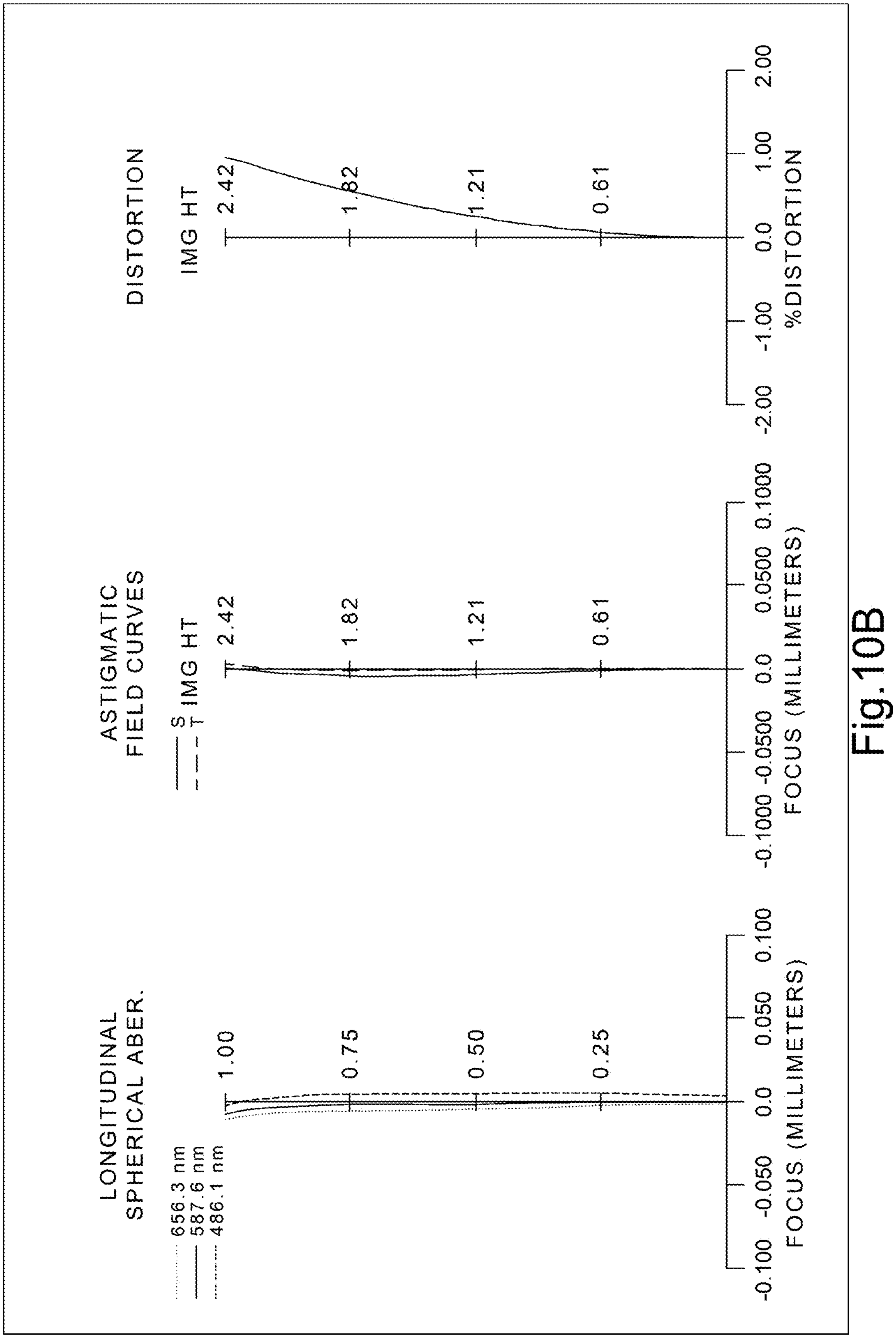
FIG. 10B shows longitudinal spherical aberration curves, astigmatic field curves and a distortion curve of the imaging apparatus according to the 10th embodiment.

FIG. 10A is a schematic view of an imaging apparatus according to the 10th embodiment of the present disclosure. FIG. 10B shows, in order from left to right, longitudinal spherical aberration curves, astigmatic field curves and a distortion curve of the imaging apparatus according to the 10th embodiment.

In FIG. 10A, the imaging apparatus includes a photographing optical lens system 10 of the present disclosure and an image sensor IS. The photographing optical lens system 10 includes, in order from an object side to an image side along an optical path, a prism E7, an aperture stop ST, a first lens element E1, a second lens element E2, a third lens element E3, a fourth lens element E4, a fifth lens element E5, a filter E6, and an image surface IMG.

The prism E7 has positive refractive power and is made of plastic material. The prism E7 has an object-side surface being convex in a paraxial region thereof, and an image-side surface being concave in a paraxial region thereof.

The first lens element E1 has positive refractive power and is made of plastic material. The first lens element E1 has an object-side surface being convex in a paraxial region thereof, and an image-side surface being convex in a paraxial region thereof. Both the object-side surface and the image-side surface are aspheric. Meanwhile, the first lens element E1 may be replaced with a lens element E as shown in FIG. 11B. The lens element E includes two cut edges respectively in both the x-axis and y-axis directions on the outer diameter thereof to reduce the size of the lens element in the x-axis and y-axis directions.

The second lens element E2 has negative refractive power and is made of plastic material. The second lens element E2 has an object-side surface being convex in a paraxial region thereof, and an image-side surface being concave in a paraxial region thereof. Both the object-side surface and the image-side surface are aspheric.

The third lens element E3 has positive refractive power and is made of plastic material. The third lens element E3 has an object-side surface being concave in a paraxial region thereof, and an image-side surface being convex in a paraxial region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being concave in a paraxial region thereof and having at least one convex critical point in an off-axis region thereof. Both the object-side surface and the image-side surface are aspheric.

The fifth lens element E5 has negative refractive power and is made of plastic material. The fifth lens element E5 has an object-side surface being convex in a paraxial region thereof and having at least one inflection point in an off-axis region thereof, and an image-side surface being concave in a paraxial region thereof. Both the object-side surface and the image-side surface are aspheric.

The filter E6 is disposed between the fifth lens element E5 and the image surface IMG. The filter E6 is made of glass material and does not affect the focal length of the photographing optical lens system 10. The image sensor IS is disposed on or near the image surface IMG.

The detailed optical data of the 10th embodiment are shown in TABLE 19, and the aspheric surface data are shown in TABLE 20.

TABLE 19

(10th Embodiment)
f = 14.00 mm, Fno = 3.25, HFOV = 9.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Prism | 27.4644 | | 6.672 | Plastic | 1.544 | 56.0 | 567.98 |
| 2 | | 27.5634 | | 1.000 | | | | |
| 3 | Ape. Stop | Plano | | −0.342 | | | | |
| 4 | Lens 1 | 5.3900 | (ASP) | 1.816 | Plastic | 1.544 | 56.0 | 5.77 |
| 5 | | −6.6230 | (ASP) | 0.030 | | | | |
| 6 | Lens 2 | 41.6050 | (ASP) | 0.487 | Plastic | 1.582 | 30.2 | −4.79 |
| 7 | | 2.6050 | (ASP) | 1.338 | | | | |
| 8 | Lens 3 | −13.0530 | (ASP) | 1.041 | Plastic | 1.544 | 56.0 | 12.36 |
| 9 | | −4.5630 | (ASP) | 0.039 | | | | |
| 10 | Lens 4 | 4.8700 | (ASP) | 0.932 | Plastic | 1.713 | 12.4 | −380.51 |
| 11 | | 4.4030 | (ASP) | 0.077 | | | | |
| 12 | Lens 5 | 1.7010 | (ASP) | 0.352 | Plastic | 1.534 | 56.0 | −478.96 |
| 13 | | 1.5680 | (ASP) | 1.680 | | | | |
| 14 | Filter | Plano | | 0.210 | Glass | 1.517 | 64.2 | — |
| 15 | | Plano | | 6.470 | | | | |
| 16 | Image Surface | Plano | | — | | | | |

Remark: Reference wavelength is d-line 587.6 nm.

TABLE 20

Aspheric Coefficient

| Surface # | 4 | 5 | 6 | 7 | 8 |
|---|---|---|---|---|---|
| k = | 7.20980E−01 | 0.00000E+00 | 8.99980E+01 | −3.27800E−01 | 0.00000E+00 |
| A4 = | −1.43550E−03 | 8.74280E−03 | −2.66450E−02 | −3.37300E−02 | 4.15580E−02 |
| A6 = | −1.73130E−04 | 1.04360E−03 | 1.26640E−02 | 1.17280E−02 | −1.07250E−02 |
| A8 = | 2.45990E−05 | −1.00910E−03 | −4.96770E−03 | −5.96370E−03 | 1.79790E−03 |
| A10 = | −5.21560E−06 | 2.35100E−04 | 1.20350E−03 | 1.74070E−03 | −3.68200E−04 |
| A12 = | | −2.12420E−05 | −1.49420E−04 | −2.56020E−04 | 7.07810E−05 |
| A14 = | | | 6.75540E−06 | 1.46270E−05 | −6.03050E−06 |

| Surface # | 9 | 10 | 11 | 12 | 13 |
|---|---|---|---|---|---|
| k = | 1.50610E+00 | 2.67310E+00 | 2.86500E+00 | −4.68090E−01 | −1.54380E+00 |
| A4 = | 3.52630E−02 | −5.21030E−03 | −1.35670E−02 | −3.84490E−02 | −1.99300E−02 |
| A6 = | −9.49490E−03 | 8.22900E−04 | 6.12330E−03 | −9.88010E−03 | −5.90770E−03 |
| A8 = | 1.98470E−03 | −2.73590E−04 | −2.84640E−03 | 9.19480E−04 | −1.44950E−03 |
| A10 = | −4.05880E−04 | 1.02950E−04 | 1.07160E−03 | −2.12590E−04 | 1.64680E−03 |
| A12 = | 6.77090E−05 | −6.28850E−05 | −4.30410E−04 | 1.71670E−04 | −3.76650E−04 |
| A14 = | −5.09310E−06 | 1.52120E−05 | 1.02830E−04 | −3.43900E−05 | 2.80890E−05 |
| A16 = | | −1.27780E−06 | −9.76910E−06 | 1.06820E−06 | |

In the 10th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 10th embodiment, so an explanation in this regard will not be provided again.

Moreover, these parameters can be calculated from TABLE 19 and TABLE 20 and satisfy the conditions stated in the table below.

| 10th Embodiment | | | |
|---|---|---|---|
| f [mm] | 14.00 | CT1/Dr7r10 | 1.33 |
| Fno | 3.25 | Td/BL | 1.61 |
| HFOV [deg.] | 9.7 | ImgH/EPD | 0.56 |
| tan(HFOV) | 0.17 | (R1 + R2)/(R1 − R2) | −0.10 |
| V2 + V4 | 42.6 | (R3 + R4)/(R3 − R4) | 1.13 |
| V1/N1 | 36.26 | (f/R9) + (f/R10) | 17.16 |
| V2/N2 | 19.11 | [f2/f5] | 0.01 |
| V3/N3 | 36.26 | f2/f1 | −0.83 |
| V4/N4 | 7.21 | f/ImgH | 5.77 |
| V5/N5 | 36.48 | Y52/Y11 | 1.01 |
| Vmin | 12.36 | | |

11th Embodiment

Figure 18:
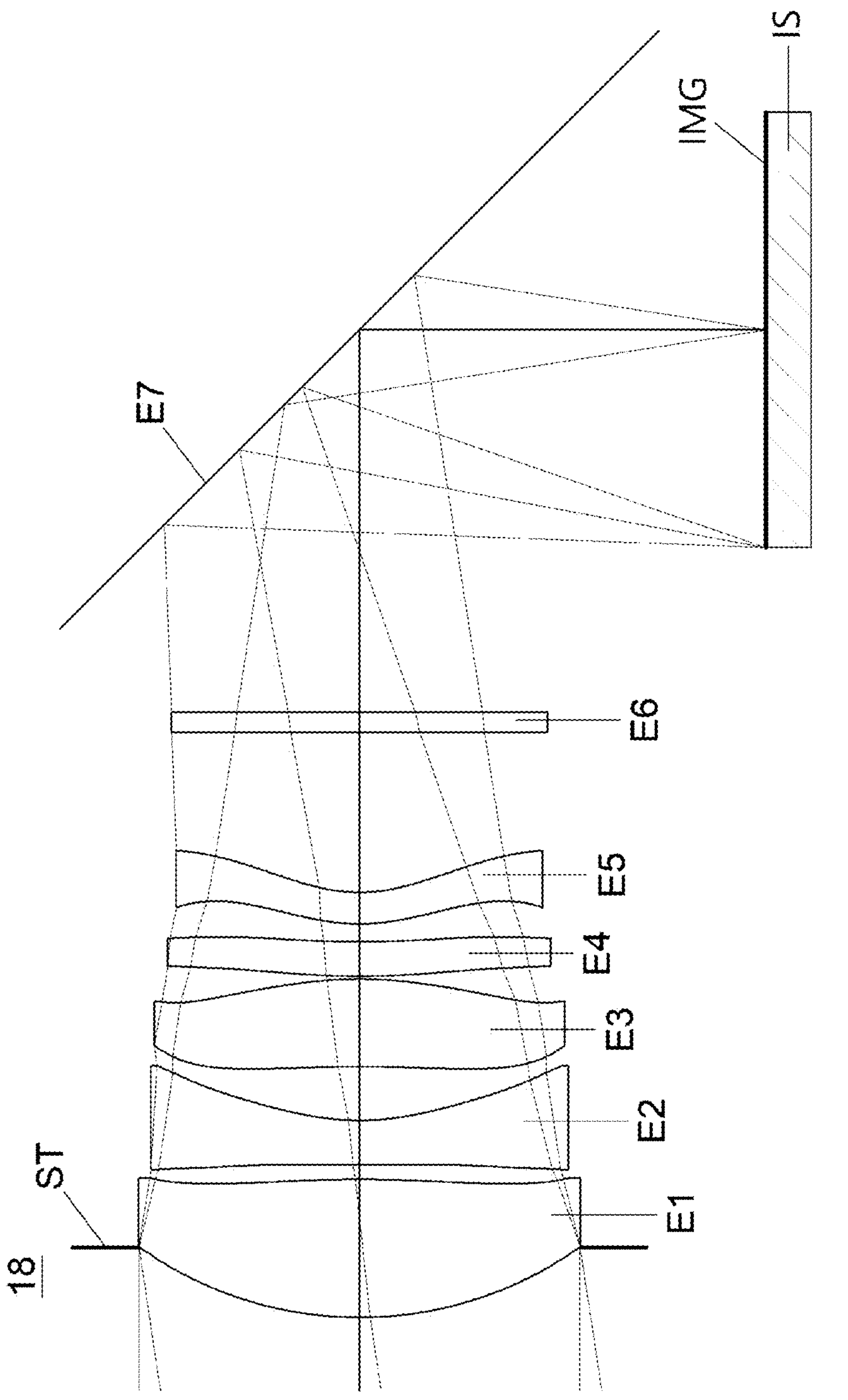
FIG. 18 is a schematic view of an imaging apparatus according to the 11th embodiment of the present disclosure, where the imaging apparatus includes a reflective element.

FIG. 18 shows an imaging apparatus according to the 11th embodiment of the present disclosure. In this embodiment, the imaging apparatus includes a photographing optical lens system 18 including a reflective element E7, such as a reflective mirror, disposed between a filter E6 and an image surface IMG. The rest of the configuration is the same as that in the 7th embodiment, and will not be repeated here. With the configuration shown in FIG. 18, the imaging apparatus can achieve effects equivalent to that of the 7th embodiment while having a folded optical axis.

12th Embodiment

Figure 19:
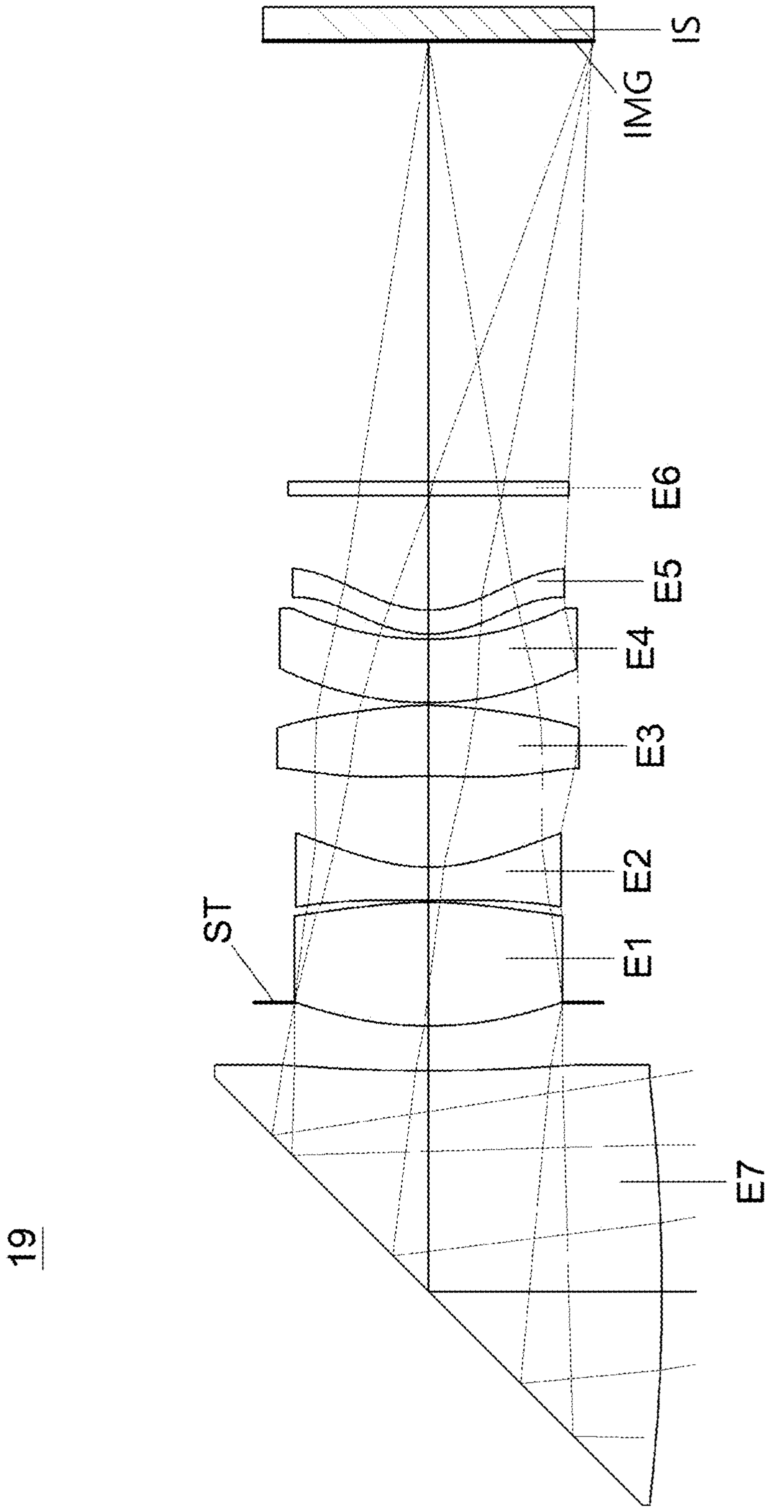
FIG. 19 is a schematic view of an imaging apparatus according to the 12th embodiment of the present disclosure, where the imaging apparatus includes a reflective element.

FIG. 19 shows an imaging apparatus according to the 12th embodiment of the present disclosure. In this embodiment, the imaging apparatus includes a photographing optical lens system 19 including a reflective element E7, which is a prism having a convex surface facing the imaged object. Except for the reflective element E7, the rest of the configuration in the 12th embodiment is the same as that in the 10th embodiment, and will not be repeated here. With the configuration shown in FIG. 19, the imaging apparatus can achieve effects equivalent to that of the 10th embodiment while having a folded optical axis.

13th Embodiment

Figure 20:
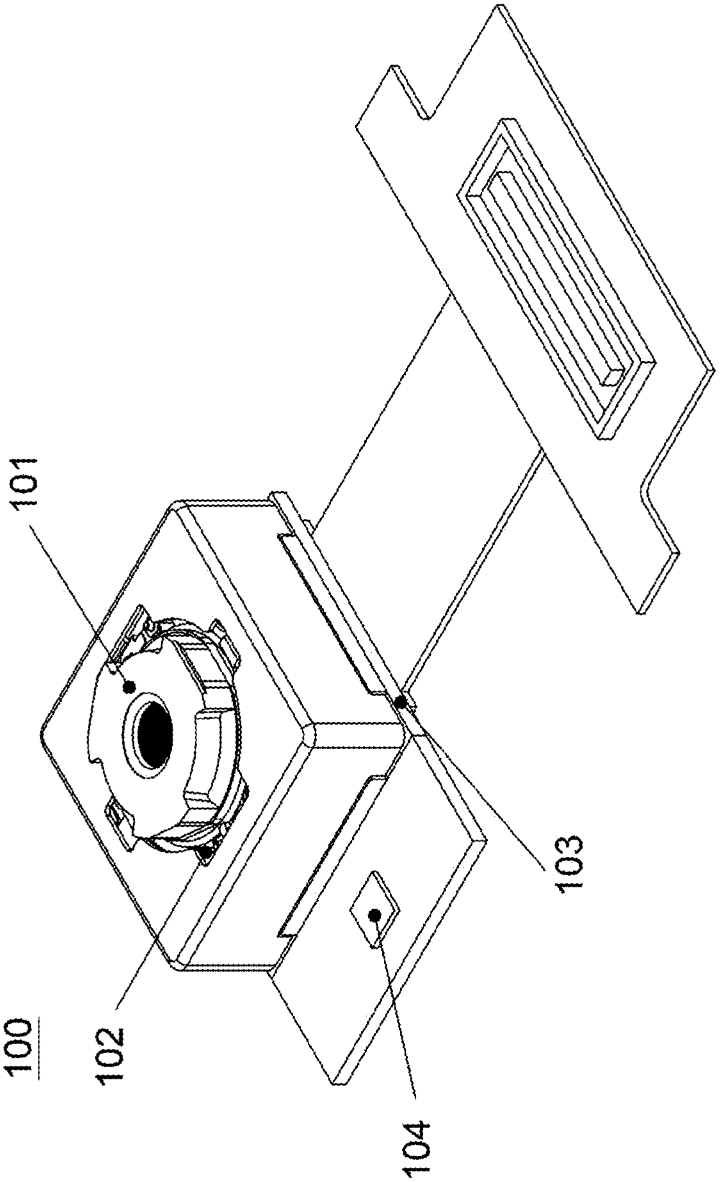
FIG. 20 is a perspective view of an imaging apparatus according to the 13th embodiment of the present disclosure.

Please refer to FIG. 20. FIG. 20 is a 3-dimensional schematic view of an imaging apparatus 100 according to the 13th embodiment of the present disclosure. In the present embodiment, the imaging apparatus 100 is a camera module. The imaging apparatus 100 includes a photographing optical lens system 101, a driving device 102, and an image sensor 103. The photographing optical lens system 101 includes the photographing optical lens system 1 of the 1st embodiment described above and a lens barrel (not otherwise herein labeled) for carrying the photographing optical lens system 1. The imaging apparatus 100 obtains an image from light convergence in the photographing optical lens system 101, and focusing by the driving device 102 so as to form the image on the image sensor 103 (the image sensor IS in the 1st embodiment), and outputs the image data thereafter.

The driving device 102 may be an auto-focus module that can be driven by a voice coil motor (VCM), a micro electro-mechanical system (MEMS), a piezoelectric system, shape memory alloys or other driving systems. The driving device 102 allows the photographing optical lens system 101 to obtain a better imaging position so as to obtain a clear image at different object distances.

The imaging apparatus 100 may be equipped with an image sensor 103 (e.g., CMOS, CCD) with high sensitivity and low noise on the image surface to provide accurate and satisfactory image quality from the photographing optical lens system 101.

In addition, the imaging apparatus 100 may further include an image stabilizer 104, which may be a motion sensing element such as an accelerometer, a gyro sensor or a Hall Effect sensor. The image stabilizer 104 in the 13th embodiment is a gyro sensor but is not limited thereto. By adjusting the photographing optical lens system 101 in different axial directions to provide compensation for image blurs due to motion during exposures, the image quality under dynamic and low-light circumstances can be further improved, and enhanced image compensation functions such as optical image stabilization (OIS) or electronic image stabilization (EIS) can also be provided.

The imaging apparatus 100 of the present disclosure is not limited to being applied to smartphones. The imaging apparatus 100 may be used in focus adjusting systems depending on the needs, while it features excellent aberration correction and provides satisfactory image quality. For example, the imaging apparatus 100 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual reality, motion devices, home intelligent auxiliary systems and other electronic devices.

14th Embodiment

Figure 21A:
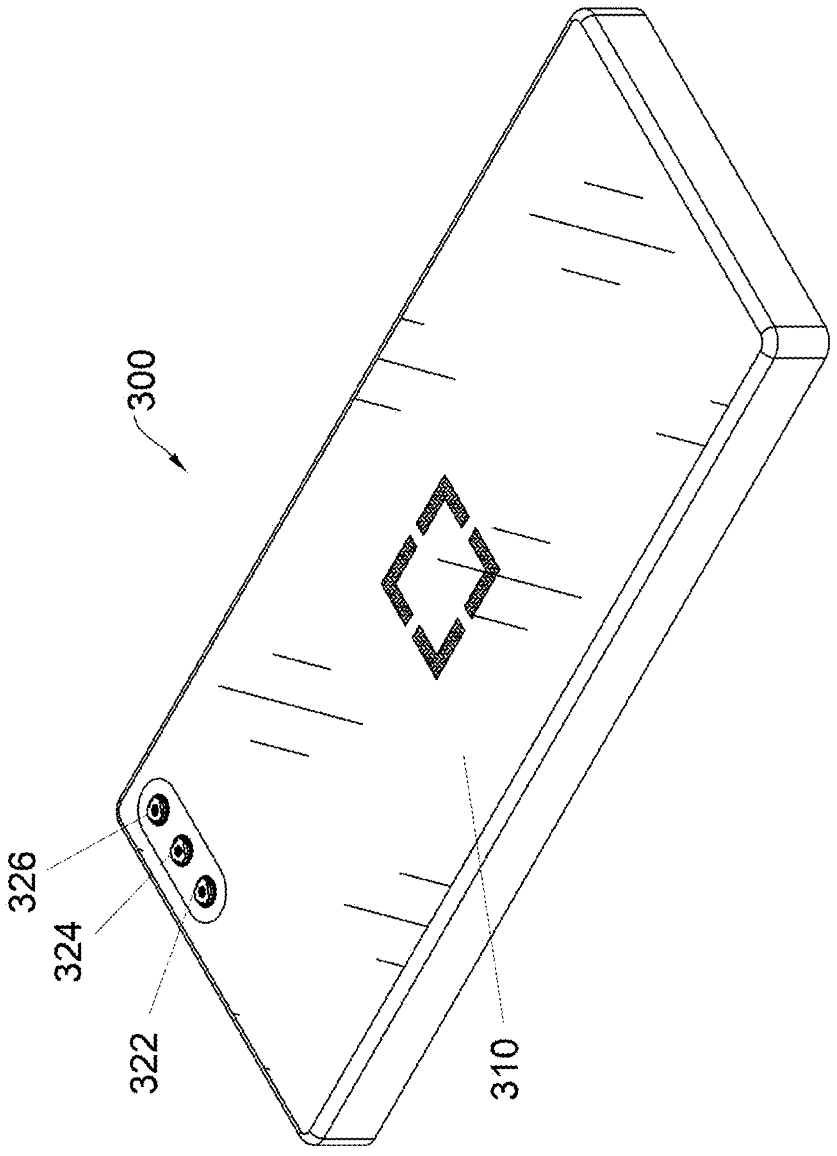
FIG. 21A is a front view of an electronic device according to the 14th embodiment of the present disclosure.
Figure 21B:
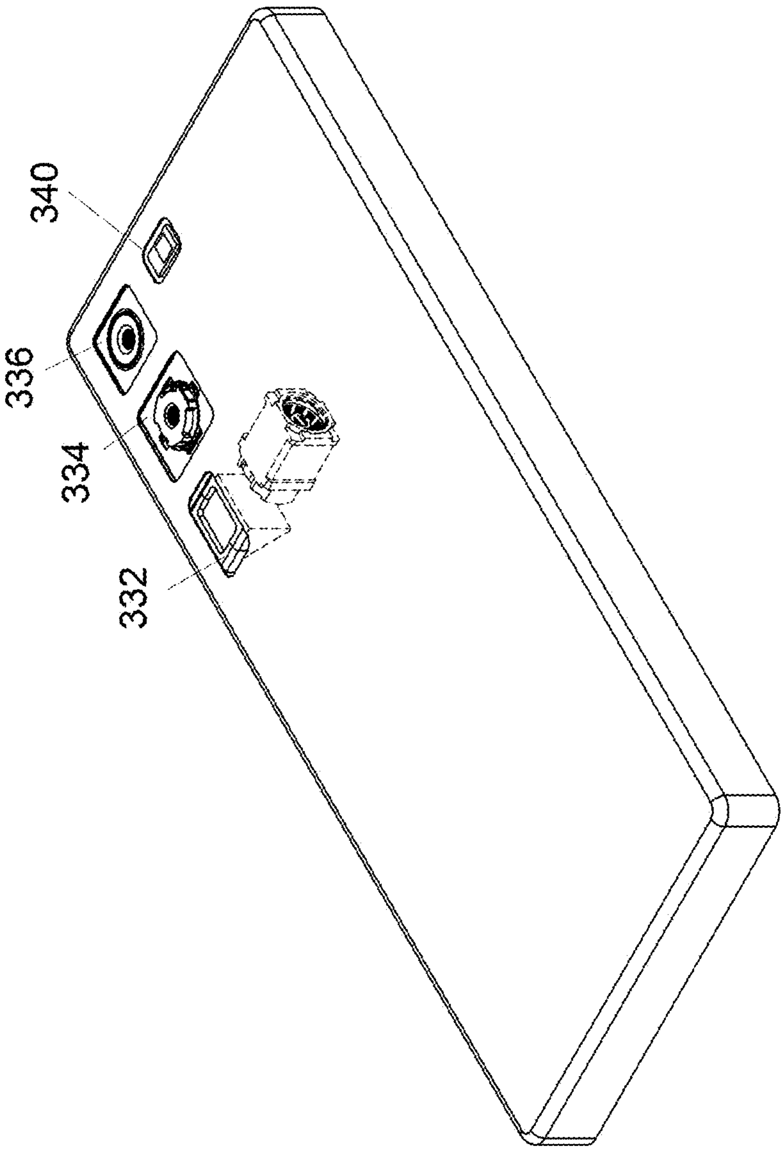
FIG. 21B is a rear view of the electronic device according to the 14th embodiment of the present disclosure.

Please refer to FIG. 21A and FIG. 21B. FIG. 21A is a front view of an electronic device 300. FIG. 21B is a rear view of the electronic device 300 according to the 14th embodiment shown in FIG. 21A. In the present embodiment, the electronic device 300 is a smartphone. As FIG. 21A shows, the electronic device 300 includes a display 310, an imaging apparatus 322, an imaging apparatus 324, and an imaging apparatus 326 on the front side of the electronic device 300. The imaging apparatus 322, the imaging apparatus 324, and the imaging apparatus 326 are located above the display 310, facing the same direction and arranged horizontally on the upper edge of the electronic device 300. The imaging apparatus 324 is an ultra-wide angle configuration, and the imaging apparatus 322 is a wide-angle configuration. The field of view of the imaging apparatus 324 is larger than that of the imaging apparatus 322 by at least 20 degrees.

As shown in FIG. 21B, the electronic device 300 includes a flash module 340, an imaging apparatus 332, an imaging apparatus 334, and an imaging apparatus 336 on the back side of the electronic device 300. The imaging apparatus 332, the imaging apparatus 334, and the imaging apparatus 336 face the same direction, and are vertically arranged on the upper edge of the back side of the electronic device 300, at the proximity of the imaging apparatus 336. The imaging apparatus 336 is an ultra-wide angle configuration, the imaging apparatus 334 is a wide-angle configuration, and the imaging apparatus 332 is a telephoto configuration that uses the photographing optical lens system with a reflective surface as illustrated in FIG. 13 The field of view of the imaging apparatus 336 is larger than that of the imaging apparatus 334 by at least 20 degrees, and the field of view of the imaging apparatus 334 is larger than that of the imaging apparatus 332 by at least 20 degrees, so that for the imaging apparatuses disposed on the back side of the electronic device 300, the largest field of view with the imaging apparatus 336 is larger than the smallest field of view with the imaging apparatus 332 by at least 40 degrees.

15th Embodiment

Figure 22A:
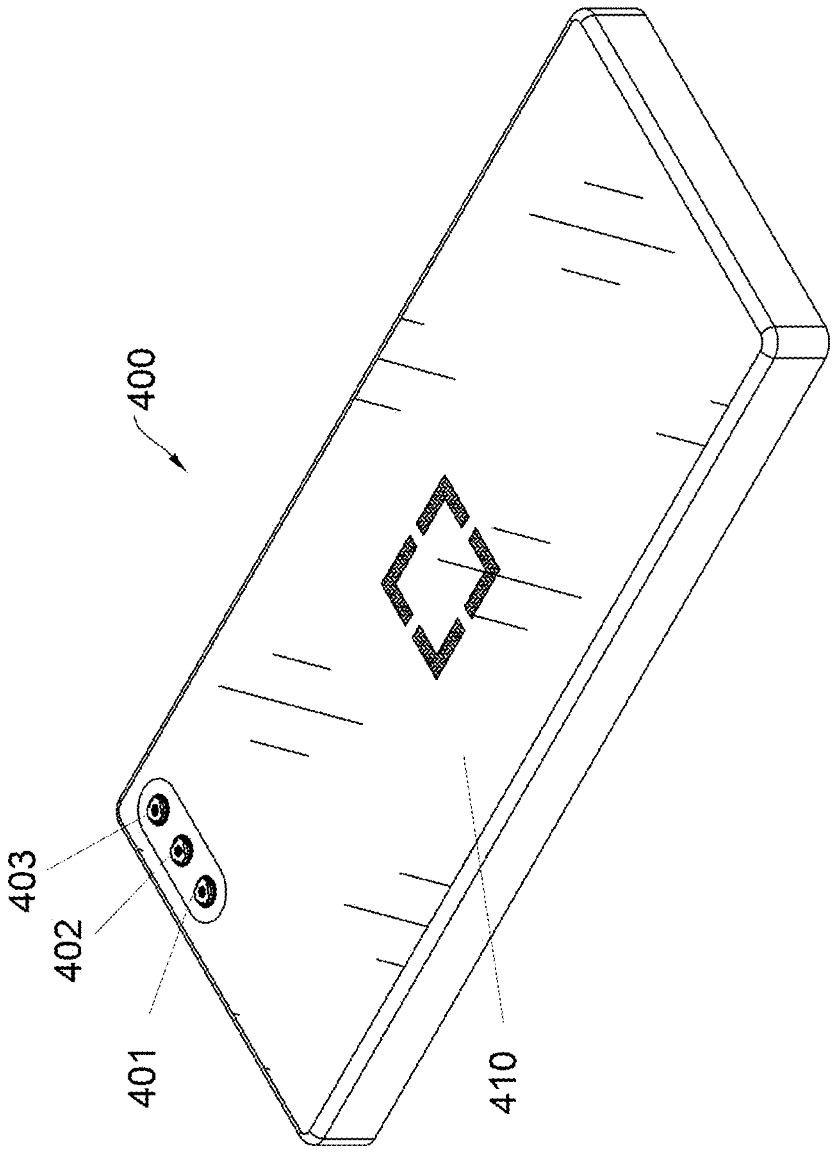
FIG. 22A is a front view of an electronic device according to the 15th embodiment of the present disclosure.
Figure 22B:
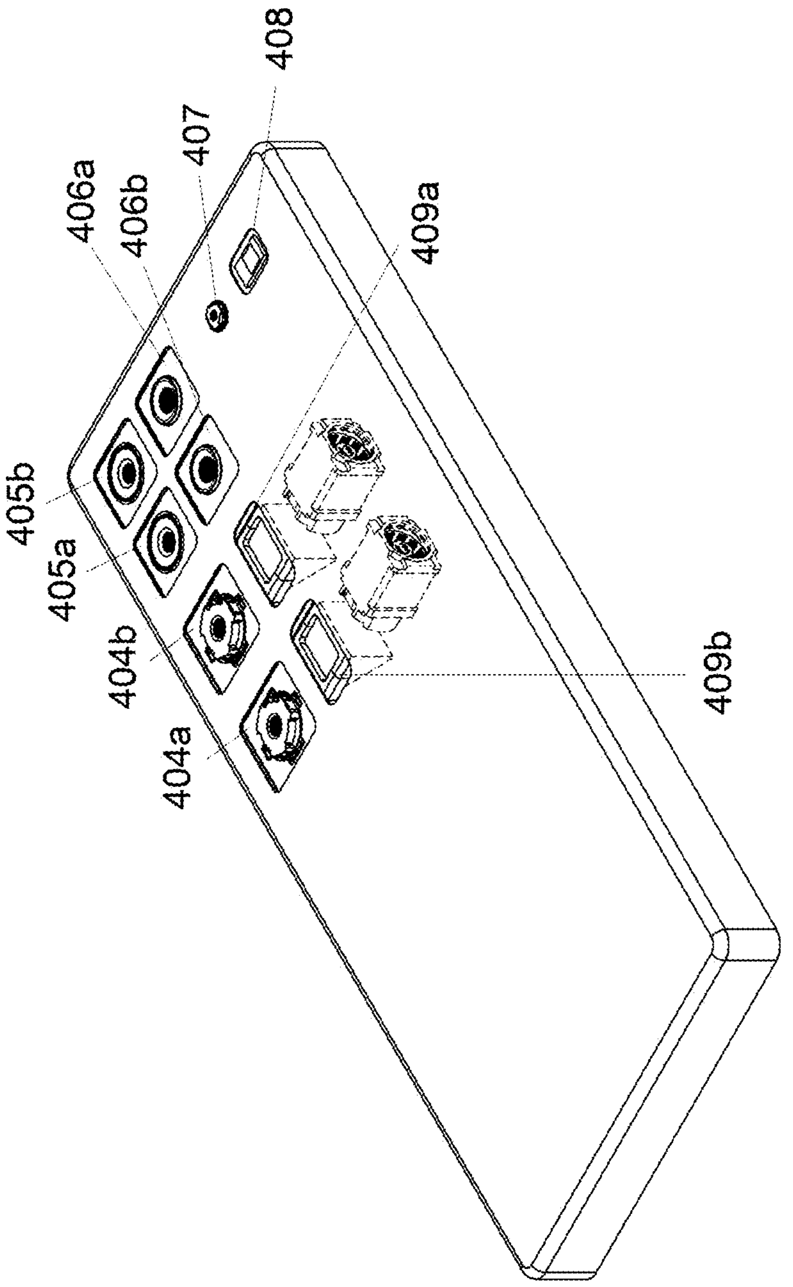
FIG. 22B is a rear view of the electronic device according to the 15th embodiment of the present disclosure

Please refer to FIG. 22A and FIG. 22B. FIG. 22A is a front view of an electronic device 400 according to the 15th embodiment. FIG. 22B is a rear view of the electronic device 400 shown in FIG. 22A. In the present embodiment, the electronic device 400 is a smartphone. As shown in FIG. 22A, the electronic device 400 includes a display 410, a TOF (Time of Flight) module 401, an imaging apparatus 402, and an imaging apparatus 403 on the front side of the electronic device 400. The imaging apparatus 402 and the imaging apparatus 403 are located above the display 410, facing the same direction and arranged horizontally on the upper edge of electronic device 400. The imaging apparatus 402 is an ultra-wide angle configuration, and the imaging apparatus 403 is a wide-angle configuration. The field of view of the imaging apparatus 402 is larger than that of the imaging apparatus 403 by at least 30 degrees.

As shown in FIG. 22B, the electronic device 400 includes a TOF (Time of Flight) module 407, a flash module 408, an imaging apparatus 404*a*, an imaging apparatus 404*b*, an imaging apparatus 405*a*, an imaging apparatus 405*b*, an imaging apparatus 406*a*, an imaging apparatus 406*b*, an imaging apparatus 409*a*, and an imaging apparatus 409*b* on the back side of the electronic device 400. The imaging apparatus 404*a*, the imaging apparatus 404*b*, the imaging apparatus 405*a*, the imaging apparatus 405*b*, the imaging apparatus 406*a*, the imaging apparatus 406*b*, the imaging apparatus 409*a*, and the imaging apparatus 409*b* face the same direction, and are divided into two rows vertically arranged on the back side of the electronic device 400. The TOF (Time of Flight) module 407 and the flash module 408 are disposed on the upper edge of the back side of the electronic device 400, at the proximity of the imaging apparatus 406*a*. The imaging apparatuses 405*a* and 405*b* are ultra-wide angle configurations. The imaging apparatuses 404*a* and 404*b* are wide-angle configurations utilizing the photographing optical lens system according to the 1st embodiment of the present disclosure. The imaging apparatuses 406*a* and 406*b* are telephoto configurations. The imaging apparatuses 409*a* and 409*b* are telephoto configurations with non-circular openings and containing an optical element which allows directional changes of the optical path. The fields of view of the imaging apparatuses 405*a*, 405*b* are larger than those of the imaging apparatuses 404*a*, 404*b* by at least 30 degrees. The fields of view of the imaging apparatuses 404*a*, 404*b* are larger than those of the imaging apparatuses 406*a*, 406*b*, 409*a*, and 409*b* by at least 30 degrees.

The aforementioned electronic apparatus is merely exemplary of practical use of the present disclosure and does not limit the scope of application of the imaging apparatus of the present disclosure. Preferably, the electronic device can further include a control unit, a display unit, a storage unit, a random access memory unit (RAM) or a combination thereof.

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising five lens elements, the five lens elements being, in order from an object side to an image side along an optical path: a first lens element, a second lens element, a third lens element, a fourth lens element and a fifth lens element:

wherein the third lens element has positive refractive power and the photographing optical lens system comprises at least one reflective element disposed on the object side of the first lens element along the optical path and has refractive power, and an object-side surface of the reflective element facing the object side is convex in a paraxial region thereof, a central thickness of the first lens element along the optical path is CT1, an axial distance between an object-side surface of the fourth lens element and an image-side surface of the fifth lens element along the optical path is Dr7r10, and the following condition is satisfied:

$$1.0 < CT1/Dr7r10.$$

2. The photographing optical lens system of claim 1, wherein the reflective element has positive refractive power, an object-side surface of the first lens element is convex in a paraxial region thereof and an image-side surface of the second lens element is concave in a paraxial region thereof.

3. The photographing optical lens system of claim 1, wherein an image-side surface of the fourth lens element is concave in a paraxial region thereof.

4. The photographing optical lens system of claim 1, wherein an object-side surface of the fifth lens element is convex in a paraxial region thereof and the image-side surface of the fifth lens element is concave in a paraxial region thereof.

5. The photographing optical lens system of claim 1, wherein the photographing optical lens system comprises a light blocking sheet having a non-circular opening, an axial distance between an object-side surface of the first lens element and the image-side surface of the fifth lens element along the optical path is Td, an axial distance between the image-side surface of the fifth lens element and an image surface along the optical path is BL, and the following condition is satisfied:

$$Td/BL < 2.0.$$

6. The photographing optical lens system of claim 1, wherein an object-side surface of the fifth lens element has at least one inflection point in an off-axis region thereof.

7. The photographing optical lens system of claim 1, wherein an axial distance between an object-side surface of the first lens element and the image-side surface of the fifth lens element along the optical path is Td, an axial distance between the image-side surface of the fifth lens element and an image surface along the optical path is BL, and the following condition is satisfied:

$$0.440 < Td/BL < 1.50;$$

wherein an Abbe number of a lens element is V, a refractive index of said lens element is N, and at least one said lens element satisfies the following condition:

$$5.0 < V/N < 12.0.$$

8. The photographing optical lens system of claim 1, wherein a focal length of the first lens element is f1, a focal length of the second lens element is f2, a minimum among Abbe numbers of the lens elements of the photographing optical lens system is Vmin, and the following conditions are satisfied:

$$-1.20 < f2/f1 < 0; \text{ and}$$

$$V\text{min} < 20.$$

9. The photographing optical lens system of claim 1, wherein an image-side surface of the fourth lens element has at least one convex critical point in an off-axis region thereof.

10. The photographing optical lens system of claim 1, wherein a focal length of the second lens element is f2, a focal length of the fifth lens element is f5, and the following condition is satisfied:

$$|f2/f5| < 0.50.$$

11. The photographing optical lens system of claim 1, wherein a maximum effective radius on an object-side surface of the first lens element is Y11, a maximum effective radius on the image-side surface of the fifth lens element is Y52, an absolute value of a curvature radius of the object-side surface of the first lens element in a paraxial region thereof is smaller than an absolute value of a curvature radius of the object-side surface of the reflective element facing the object side, and the following condition is satisfied:

$$0.50 < Y52/Y11 < 1.0.$$

12. The photographing optical lens system of claim 1, wherein at least one lens element includes at least two cut edges on an outer diameter thereof, a minimum outer diameter distance of the lens element is LDmin, a maximum outer diameter distance of the lens element is LDmax, and the following condition is satisfied:

$$0.30 < LD\text{min}/LD\text{max} < 0.90.$$

13. The photographing optical lens system of claim 1, wherein an absolute value of a focal length of the fifth lens element is larger than an absolute value of a focal length of the third lens element.

14. The photographing optical lens system of claim 1, wherein the first lens element has positive refractive power, the second lens element has negative refractive power and the fifth lens element has negative refractive power.

15. An imaging apparatus, comprising the photographing optical lens system of claim 1 and an image sensor.

16. An electronic device, comprising the imaging apparatus of claim 15.

17. A photographing optical lens system comprising five lens elements, the five lens elements being, in order from an object side to an image side along an optical path: a first lens element, a second lens element, a third lens element, a fourth lens element and a fifth lens element:

wherein the first lens element has positive refractive power, an object-side surface of the second lens element is convex in a paraxial region thereof, an image-side surface of the third lens element is convex in a paraxial region thereof, an object-side surface of the fourth lens element is convex in a paraxial region thereof, the fifth lens element has negative refractive power, an object-side surface of the fifth lens element is convex in a paraxial region thereof and an image-side surface of the fifth lens element is concave in a paraxial region thereof, an absolute value of a focal length of the fifth lens element is larger than an absolute value of a focal length of the third lens element, an axial distance between an object-side surface of the first lens element and the image-side surface of the fifth lens element along the optical path is Td, an axial distance between the image-side surface of the fifth lens element and an image surface along the optical path is BL, a focal length of the photographing optical lens system is f, a curvature radius of the object-side surface of the fifth lens element is R9, a curvature radius of the image-side surface of the fifth lens element is R10, a maximal image height of the photographing optical lens system is ImgH, an entrance pupil diameter of the photographing optical lens system is EPD, and the following conditions are satisfied:

$$Td/BL < 2.0;$$

$$3.50 < (f/R9) + (f/R10); \text{ and}$$

$$0.40 < ImgH/EPD < 0.70.$$

18. The photographing optical lens system of claim 17, wherein a curvature radius of the object-side surface of the first lens element is convex in a paraxial region thereof, and an image-side surface of the second lens element is concave in a paraxial region thereof.

19. The photographing optical lens system of claim 17, wherein an image-side surface of the first lens element is convex in a paraxial region thereof, half of the maximal field of view of the photographing optical lens system is HFOV, and the following condition is satisfied:

$$\tan(HFOV) < 0.30.$$

20. The photographing optical lens system of claim 17, wherein the axial distance between the object-side surface of the first lens element and the image-side surface of the fifth lens element along the optical path is Td, the axial distance between the image-side surface of the fifth lens element and the image surface along the optical path is BL, and the following condition is satisfied:

$$Td/BL < 1.50.$$

21. The photographing optical lens system of claim 20, wherein the axial distance between the object-side surface of the first lens element and the image-side surface of the fifth lens element along the optical path is Td, the axial distance between the image-side surface of the fifth lens element and the image surface along the optical path is BL, and the following condition is satisfied:

$$Td/BL \leqq 0.96.$$

22. The photographing optical lens system of claim 17, wherein an Abbe number of the second lens element is larger than an Abbe number of the fifth lens element.

23. The photographing optical lens system of claim 17, wherein an absolute value of a focal length of the fourth lens element is larger than an absolute value of a focal length of the third lens element.

24. The photographing optical lens system of claim 17, wherein the second lens element has negative refractive power.

* * * * *